(12) United States Patent
Sherwood et al.

(10) Patent No.: US 11,647,243 B2
(45) Date of Patent: May 9, 2023

(54) SYSTEM AND METHOD FOR USING AN APPLICATION ON A MOBILE DEVICE TO TRANSFER INTERNET MEDIA CONTENT

(71) Applicant: Seagate Technology LLC, Cupertino, CA (US)

(72) Inventors: Greg Sherwood, Inverness, IL (US); James J. Kosmach, Geneva, IL (US); Osama Al-Shaykh, San Diego, CA (US); Richard June, Groton, MA (US); Eva MacKay, North Andover, MA (US)

(73) Assignee: Seagate Technology LLC, Fremont, CA (US)

( * ) Notice: Subject to any disclaimer, the term of this patent is extended or adjusted under 35 U.S.C. 154(b) by 189 days.

(21) Appl. No.: 16/723,317

(22) Filed: Dec. 20, 2019

(65) Prior Publication Data

US 2020/0175222 A1 Jun. 4, 2020

Related U.S. Application Data

(60) Division of application No. 14/830,322, filed on Aug. 19, 2015, now Pat. No. 10,558,735, which is a
(Continued)

(51) Int. Cl.
*G06F 40/151* (2020.01)
*H04N 21/414* (2011.01)
(Continued)

(52) U.S. Cl.
CPC ....... *H04N 21/41407* (2013.01); *G06F 16/44* (2019.01); *G06F 16/9574* (2019.01);
(Continued)

(58) Field of Classification Search
None
See application file for complete search history.

(56) References Cited

U.S. PATENT DOCUMENTS

| 4,751,578 A | 6/1988 | Reiter et al. |
| 5,473,691 A | 12/1995 | Menezes et al. |
| | (Continued) | |

FOREIGN PATENT DOCUMENTS

| JP | 2003288286 | 10/2003 |
| JP | 2006209541 | 8/2006 |
| | (Continued) | |

OTHER PUBLICATIONS

International Search Report and Written Opinion for PCT/US2012/024700, dated May 23, 2012, 3 pages.

*Primary Examiner* — Ariel Mercado
(74) *Attorney, Agent, or Firm* — Mueting Raasch Group

(57) ABSTRACT

A system and a method use an application on a mobile device to transfer internet media content to a rendering device in a home network. The application may use an HTML rendering engine to display a web page to a user of the mobile device, and the web page may have controls for accessing the internet media content. The application may receive a user interaction signal which may indicate that a user invoked one of the controls for accessing the internet media content. In response, the application may initiate transfer of the internet media content to the rendering device in the home network and/or may queue the internet media content for later playback using the rendering device.

9 Claims, 13 Drawing Sheets

Related U.S. Application Data continuation-in-part of application No. 13/370,751, filed on Feb. 10, 2012, now abandoned, and a continuation-in-part of application No. 12/459,090, filed on Jun. 26, 2009, now Pat. No. 9,195,775.

(60) Provisional application No. 61/453,088, filed on Mar. 15, 2011.

(51) Int. Cl.

| | |
|---|---|
| H04N 21/61 | (2011.01) |
| H04N 21/436 | (2011.01) |
| H04N 21/4782 | (2011.01) |
| H04N 21/472 | (2011.01) |
| H04L 12/28 | (2006.01) |
| G06F 16/44 | (2019.01) |
| G06F 16/958 | (2019.01) |
| G06F 16/957 | (2019.01) |
| H04L 67/025 | (2022.01) |
| H04M 1/72469 | (2021.01) |
| H04M 1/72445 | (2021.01) |
| G06F 40/143 | (2020.01) |

(52) U.S. Cl.
CPC .......... *G06F 16/972* (2019.01); *G06F 40/143* (2020.01); *G06F 40/151* (2020.01); *H04L 12/281* (2013.01); *H04L 12/2809* (2013.01); *H04L 12/2812* (2013.01); *H04L 12/2836* (2013.01); *H04L 67/025* (2013.01); *H04M 1/72445* (2021.01); *H04M 1/72469* (2021.01); *H04N 21/43615* (2013.01); *H04N 21/4782* (2013.01); *H04N 21/47217* (2013.01); *H04N 21/6125* (2013.01); *H04N 21/6175* (2013.01); *H04L 2012/2849* (2013.01)

(56) References Cited

U.S. PATENT DOCUMENTS

| | | |
|---|---|---|
| 5,666,530 A | 9/1997 | Clark et al. |
| 5,790,848 A | 8/1998 | Wlaschin |
| 5,819,047 A | 10/1998 | Bauer et al. |
| 5,862,325 A | 1/1999 | Reed et al. |
| 5,937,038 A | 8/1999 | Bell et al. |
| 5,956,729 A | 9/1999 | Goetz et al. |
| 5,978,014 A | 11/1999 | Martin et al. |
| 6,141,682 A | 10/2000 | Barker |
| 6,161,132 A | 12/2000 | Roberts et al. |
| 6,167,092 A | 12/2000 | Lengwehasatit |
| 6,175,856 B1 | 1/2001 | Riddle |
| 6,182,287 B1 | 1/2001 | Schneidewend et al. |
| 6,304,969 B1 | 10/2001 | Wasserman et al. |
| 6,356,971 B1 | 3/2002 | Katz et al. |
| 6,407,680 B1 | 6/2002 | Lai et al. |
| 6,429,812 B1 | 8/2002 | Hoffberg |
| 6,498,865 B1 | 12/2002 | Brailean et al. |
| 6,529,552 B1 | 3/2003 | Tsai et al. |
| 6,647,269 B2 | 11/2003 | Hendrey et al. |
| 6,665,751 B1 | 12/2003 | Chen et al. |
| 6,742,028 B1 | 5/2004 | Wang et al. |
| 6,804,717 B1 | 10/2004 | Bakshi et al. |
| 6,826,272 B1 | 11/2004 | Dalrymple et al. |
| 6,856,612 B1 | 2/2005 | Bjelland et al. |
| 6,865,600 B1 | 3/2005 | Brydon et al. |
| 6,941,324 B2 | 9/2005 | Plastina et al. |
| 7,006,631 B1 | 2/2006 | Luttrell |
| 7,013,149 B2 | 3/2006 | Vetro |
| 7,080,400 B1 | 7/2006 | Navar |
| 7,107,017 B2 | 9/2006 | Koskelainen et al. |
| 7,139,279 B2 | 11/2006 | Jabri et al. |
| 7,328,030 B2 | 2/2008 | Laursen et al. |
| 7,493,106 B2 | 2/2009 | Espelien |
| 7,519,686 B2 | 4/2009 | Hong et al. |
| 7,634,076 B2 | 12/2009 | Lee et al. |
| 7,676,591 B2 | 3/2010 | Chan et al. |
| 7,680,490 B2 | 3/2010 | Bloebaum et al. |
| 7,808,988 B2 | 10/2010 | Neff |
| 7,900,818 B2 | 3/2011 | Espelien |
| 8,065,325 B2 | 11/2011 | Crossley et al. |
| 8,095,153 B2 | 1/2012 | Jenkins et al. |
| 8,630,512 B2 * | 1/2014 | Swenson .................. G09G 5/14 382/305 |
| 2001/0030959 A1 | 10/2001 | Ozawa et al. |
| 2002/0002044 A1 | 1/2002 | Naruse et al. |
| 2002/0016195 A1 | 2/2002 | Namba et al. |
| 2002/0033844 A1 | 3/2002 | Levy et al. |
| 2002/0042923 A1 | 4/2002 | Asmussen et al. |
| 2002/0129359 A1 | 9/2002 | Lichner |
| 2002/0131496 A1 | 9/2002 | Vasudevan et al. |
| 2002/0181495 A1 | 12/2002 | Requena et al. |
| 2002/0184195 A1 | 12/2002 | Qain |
| 2003/0009518 A1 | 1/2003 | Harrow et al. |
| 2003/0040962 A1 | 2/2003 | Lewis |
| 2003/0048855 A1 | 3/2003 | Klaghofer et al. |
| 2003/0067872 A1 | 4/2003 | Harrell et al. |
| 2003/0078061 A1 | 4/2003 | Kim |
| 2003/0093267 A1 | 5/2003 | Leichtling et al. |
| 2003/0110503 A1 | 6/2003 | Perkes |
| 2003/0115069 A1 | 6/2003 | Pence et al. |
| 2003/0115150 A1 | 6/2003 | Hamilton et al. |
| 2003/0140343 A1 | 7/2003 | Falvo et al. |
| 2003/0142744 A1 | 7/2003 | Wu et al. |
| 2003/0142751 A1 | 7/2003 | Hannuksela |
| 2003/0219006 A1 | 11/2003 | Har |
| 2003/0229900 A1 | 12/2003 | Reisman |
| 2003/0233399 A1 | 12/2003 | Prohel et al. |
| 2004/0015989 A1 | 1/2004 | Kaizu et al. |
| 2004/0068536 A1 | 4/2004 | Demers et al. |
| 2004/0070678 A1 | 4/2004 | Toyama et al. |
| 2004/0077313 A1 | 4/2004 | Oba et al. |
| 2004/0078807 A1 | 4/2004 | Fries et al. |
| 2004/0088369 A1 | 5/2004 | Yeager |
| 2004/0098447 A1 | 5/2004 | Verbeke et al. |
| 2004/0110464 A1 | 6/2004 | Pertman |
| 2004/0111755 A1 | 6/2004 | Pertman |
| 2004/0116067 A1 | 6/2004 | Karaoguz et al. |
| 2004/0128396 A1 | 7/2004 | Patrick et al. |
| 2004/0139468 A1 | 7/2004 | Kidd |
| 2004/0158645 A1 | 8/2004 | Morinaga et al. |
| 2004/0172478 A1 | 9/2004 | Jacobs et al. |
| 2004/0174817 A1 | 9/2004 | Jabri et al. |
| 2004/0193762 A1 | 9/2004 | Leon et al. |
| 2004/0210935 A1 | 10/2004 | Schein et al. |
| 2004/0218673 A1 | 11/2004 | Wang et al. |
| 2004/0243694 A1 | 12/2004 | Weast |
| 2004/0255029 A1 | 12/2004 | Manion et al. |
| 2004/0255336 A1 | 12/2004 | Logan et al. |
| 2004/0268386 A1 | 12/2004 | Logan et al. |
| 2005/0008030 A1 | 1/2005 | Hoffman et al. |
| 2005/0028208 A1 | 2/2005 | Ellis et al. |
| 2005/0047448 A1 | 3/2005 | Lee et al. |
| 2005/0085296 A1 | 4/2005 | Gelb et al. |
| 2005/0086606 A1 | 4/2005 | Biennerhasselt et al. |
| 2005/0086696 A1 | 4/2005 | Daniels |
| 2005/0095981 A1 | 5/2005 | Benco |
| 2005/0097595 A1 | 5/2005 | Lipsanen et al. |
| 2005/0138193 A1 | 6/2005 | Encamacion et al. |
| 2005/0144641 A1 | 6/2005 | Lewis |
| 2005/0182791 A1 | 8/2005 | Lim et al. |
| 2005/0228830 A1 | 10/2005 | Plastina et al. |
| 2005/0239547 A1 | 10/2005 | Haga et al. |
| 2005/0246451 A1 | 11/2005 | Silverman et al. |
| 2005/0288991 A1 | 12/2005 | Hubbard et al. |
| 2006/0002681 A1 | 1/2006 | Spilo et al. |
| 2006/0008256 A1 | 1/2006 | Khedouri et al. |
| 2006/0010472 A1 | 1/2006 | Godeny |
| 2006/0013148 A1 | 1/2006 | Burman et al. |
| 2006/0029041 A1 | 2/2006 | Jabri et al. |
| 2006/0031883 A1 | 2/2006 | Ellis et al. |
| 2006/0036554 A1 | 2/2006 | Schrock et al. |
| 2006/0047952 A1 | 3/2006 | Van Den Huevel et al. |
| 2006/0053080 A1 | 3/2006 | Edmonson et al. |

(56) References Cited

U.S. PATENT DOCUMENTS

| | | |
|---|---|---|
| 2006/0056336 A1 | 3/2006 | Dacosta |
| 2006/0056416 A1 | 3/2006 | Yang et al. |
| 2006/0095792 A1 | 5/2006 | Hurtado et al. |
| 2006/0101499 A1 | 5/2006 | Aravamudan et al. |
| 2006/0117379 A1 | 6/2006 | Bennett et al. |
| 2006/0133391 A1 | 6/2006 | Kang et al. |
| 2006/0143295 A1 | 6/2006 | Costa-Requena et al. |
| 2006/0146854 A1 | 7/2006 | Park |
| 2006/0159037 A1 | 7/2006 | Jabri et al. |
| 2006/0161635 A1 | 7/2006 | Lamkin et al. |
| 2006/0168342 A1 | 7/2006 | Budde et al. |
| 2006/0176877 A1 | 8/2006 | Jabri et al. |
| 2006/0195514 A1 | 8/2006 | Rogers et al. |
| 2006/0195790 A1 | 8/2006 | Beaupre et al. |
| 2006/0218642 A1 | 9/2006 | Kuppusamy et al. |
| 2006/0221190 A1 | 10/2006 | Limberis et al. |
| 2006/0242325 A1 | 10/2006 | Ramaswamy et al. |
| 2006/0259575 A1 | 11/2006 | Upendran et al. |
| 2006/0277565 A1 | 12/2006 | Long et al. |
| 2006/0288071 A1 | 12/2006 | Bigioi et al. |
| 2006/0288112 A1 | 12/2006 | Soelberg et al. |
| 2006/0294572 A1 | 12/2006 | Walter |
| 2007/0005727 A1 | 1/2007 | Edwards et al. |
| 2007/0011277 A1 | 1/2007 | Neff et al. |
| 2007/0027808 A1 | 2/2007 | Dooley et al. |
| 2007/0033225 A1 | 2/2007 | Davis |
| 2007/0047816 A1 | 3/2007 | Graham et al. |
| 2007/0049333 A1 | 3/2007 | Jeong et al. |
| 2007/0061363 A1 | 3/2007 | Ramer et al. |
| 2007/0076711 A1 | 4/2007 | Shuster |
| 2007/0076756 A1 | 4/2007 | Chan et al. |
| 2007/0093275 A1 | 4/2007 | Bloebaum et al. |
| 2007/0101024 A1 | 5/2007 | Doumuki et al. |
| 2007/0112935 A1 | 5/2007 | Espelien |
| 2007/0116036 A1 | 5/2007 | Moore |
| 2007/0124792 A1* | 5/2007 | Bennett ............... H04M 1/0233 348/E7.071 |
| 2007/0130210 A1 | 6/2007 | Park |
| 2007/0136778 A1 | 6/2007 | Birger et al. |
| 2007/0143806 A1 | 6/2007 | Pan |
| 2007/0156770 A1 | 7/2007 | Espelien |
| 2007/0157234 A1 | 7/2007 | Walker |
| 2007/0162571 A1 | 7/2007 | Gupta et al. |
| 2007/0167236 A1 | 7/2007 | Heckendorf, III et al. |
| 2007/0171841 A1 | 7/2007 | Witzel et al. |
| 2007/0186003 A1 | 8/2007 | Foster et al. |
| 2007/0189275 A1 | 8/2007 | Neff |
| 2007/0192810 A1 | 8/2007 | Pritchett et al. |
| 2007/0220561 A1 | 9/2007 | Girardeau et al. |
| 2007/0226315 A1 | 9/2007 | Espelien |
| 2007/0233701 A1 | 10/2007 | Sherwood et al. |
| 2007/0239820 A1 | 10/2007 | Zhong et al. |
| 2007/0239821 A1 | 10/2007 | Huetter et al. |
| 2007/0245399 A1 | 10/2007 | Espelien |
| 2007/0250901 A1* | 10/2007 | McIntire ............. G06F 16/7837 715/203 |
| 2007/0255809 A1 | 11/2007 | Chiba |
| 2007/0264989 A1 | 11/2007 | Palakkal et al. |
| 2007/0266047 A1 | 11/2007 | Cortes et al. |
| 2007/0271388 A1 | 11/2007 | Bowra et al. |
| 2007/0276864 A1 | 11/2007 | Espelien |
| 2007/0282907 A1 | 12/2007 | Chambers |
| 2007/0288478 A1 | 12/2007 | Dimaria et al. |
| 2007/0297352 A1 | 12/2007 | Jabri et al. |
| 2007/0297427 A1 | 12/2007 | Cho et al. |
| 2008/0021952 A1 | 1/2008 | Molinie et al. |
| 2008/0022003 A1 | 1/2008 | Alve |
| 2008/0027808 A1 | 1/2008 | Wilf |
| 2008/0034029 A1 | 2/2008 | Fang et al. |
| 2008/0037489 A1 | 2/2008 | Yitiz et al. |
| 2008/0039967 A1 | 2/2008 | Sherwood et al. |
| 2008/0050096 A1 | 2/2008 | Ryu |
| 2008/0052347 A1 | 2/2008 | Jung et al. |
| 2008/0052348 A1 | 2/2008 | Adler et al. |
| 2008/0090590 A1 | 4/2008 | Espelien |
| 2008/0092054 A1 | 4/2008 | Bhumkar et al. |
| 2008/0126543 A1 | 5/2008 | Hamada et al. |
| 2008/0133759 A1 | 6/2008 | Weel |
| 2008/0154696 A1 | 6/2008 | Spiegelman et al. |
| 2008/0235733 A1 | 9/2008 | Heie et al. |
| 2008/0250061 A1 | 10/2008 | Kim |
| 2008/0301280 A1 | 12/2008 | Chasen et al. |
| 2009/0019058 A1 | 1/2009 | Jung et al. |
| 2009/0044225 A1 | 2/2009 | Lin et al. |
| 2009/0052380 A1 | 2/2009 | Espelien |
| 2009/0070344 A1 | 3/2009 | Espelien |
| 2009/0083803 A1 | 3/2009 | Al-Shaykh et al. |
| 2009/0119766 A1 | 5/2009 | Huetter et al. |
| 2009/0125609 A1 | 5/2009 | Wood et al. |
| 2009/0138922 A1 | 5/2009 | Thomas et al. |
| 2009/0150480 A1 | 6/2009 | Xia et al. |
| 2009/0156182 A1 | 6/2009 | Jenkins et al. |
| 2009/0157680 A1 | 6/2009 | Crossley et al. |
| 2009/0193452 A1 | 7/2009 | Russ et al. |
| 2009/0193469 A1 | 7/2009 | Igarashi |
| 2009/0205003 A1 | 8/2009 | Benyamin |
| 2009/0232220 A1 | 9/2009 | Neff et al. |
| 2009/0234878 A1 | 9/2009 | Herz et al. |
| 2009/0248702 A1 | 10/2009 | Schwartz et al. |
| 2009/0320073 A1* | 12/2009 | Reisman ............... G06F 16/954 709/227 |
| 2009/0320077 A1 | 12/2009 | Gazdzinski |
| 2009/0322790 A1* | 12/2009 | Behar ................... G06F 3/0362 715/810 |
| 2009/0327894 A1* | 12/2009 | Rakib ................. H04N 21/4725 715/719 |
| 2010/0045705 A1 | 2/2010 | Vertegaal et al. |
| 2010/0058398 A1 | 3/2010 | Ojala et al. |
| 2010/0070646 A1 | 3/2010 | Chan et al. |
| 2010/0095332 A1 | 4/2010 | Gran et al. |
| 2010/0162328 A1 | 6/2010 | Karaoguz et al. |
| 2010/0169778 A1 | 7/2010 | Mundy et al. |
| 2010/0201870 A1 | 8/2010 | Luessi et al. |
| 2010/0222102 A1 | 9/2010 | Rodriguez ............ G06Q 30/02 715/764 |
| 2010/0332565 A1 | 12/2010 | Al-Shaykh et al. |
| 2011/0060998 A1 | 3/2011 | Schwartz et al. |
| 2012/0060100 A1 | 3/2012 | Sherwood et al. |
| 2012/0064917 A1 | 3/2012 | Jenkins et al. |
| 2012/0210241 A1 | 8/2012 | Wong ............... H04N 21/25891 715/739 |

FOREIGN PATENT DOCUMENTS

| | | |
|---|---|---|
| JP | 2009021933 | 1/2009 |
| JP | 2009504002 | 1/2009 |
| WO | 2010151284 | 12/2010 |
| WO | PCTUS2012024700 | 2/2012 |

* cited by examiner

SYSTEM AND METHOD FOR USING AN APPLICATION ON A MOBILE DEVICE TO TRANSFER INTERNET MEDIA CONTENT

RELATED APPLICATIONS

This application is a divisional of U.S. patent application Ser. No. 14/830,322, having a filing date of Aug. 19, 2015, now U.S. Pat. No. 10,558,735, which is a continuation-in-part of U.S. patent application Ser. No. 13/370,751, having a filing date of Feb. 10, 2012, which claims priority to U.S. Provisional Patent Application No. 61/463,088, having a filing date of Feb. 11, 2011, and this application is a continuation-in-part of U.S. patent application Ser. No. 12/459,090, having a filing date of Jun. 26, 2009, now U.S. Pat. No. 9,195,775. Each of the above-identified applications is hereby incorporated by reference in its entirety.

BACKGROUND OF THE INVENTION

The present invention generally relates to a system and a method for managing and/or rendering internet multimedia content in a network. More specifically, the present invention relates to a system and a method that utilize an application to render the internet multimedia content and locally stored multimedia content on one or more rendering devices in the network. The application may provide web browser functions, such as, for example, requesting, receiving, processing, decoding and/or rendering the internet multimedia content.

It is well known to use the internet to browse, find, retrieve and consume internet content using a web browser. Typically, the internet content may be a combination of web page formatting, such as, for example, HTML, xHTML; text; graphics; active content and/or applications, such as, for example, Flash (trademark of Adobe System, Inc.) and/or JavaScript (trademark of Sun Microsystems, Inc.); and/or multimedia content. The multimedia content may be audio content, video content, image content and/or the like. The audio content may be audio files, audio podcasts, audio streams, internet radio channels, ringtones, midi files and/or the like. The video content may be video files, video podcasts, video streams, video channels and/or the like. The image content may be digital photographs, bitmap images, vector graphics images and/or the like.

Typically, the web browser may be an application provided by a computing device, such as, for example, a desktop computer, a laptop computer and/or a mobile device, such as a PDA and/or a mobile telephone. The web browser may access content sources using the internet as generally illustrated in FIG. 1. The Internet content may be retrieved from the content sources using delivery protocols, such as, for example, Hypertext Transfer-Protocol ("HTTP") and/or Real Time Streaming Protocol ("RTSP"). The web browser may accept input from the user to search for and/or select content of interest to the user. The web browser may retrieve the content of interest and may present the content of interest to the user for consumption. Presentation of the content of interest may require one or more associated helper applications, such as, for example, a multimedia player and/or a scripting engine.

Typically, the user may use the web browser to find and/or access a web page of the internet content. The web page of the internet content may be found using a search engine; by selecting a "bookmark" previously created by the user; by typing a content location identifier, such as, for example, a Uniform Resource Locator ("URL"); and/or by using other means. The web page of the internet content may have and/or may provide multimedia content which may be decoded and/or may be rendered for the user. The video content may be displayed in an embedded video player which may render the video content in the web page with associated web page content and/or the formatting. Alternatively, the video content may be displayed in a separate video player which may appear on a separate web page or in a separate window dedicated to the video player. Similarly, the image content may be displayed as embedded in the web page or may be shown in a separate image viewer window. The audio content may be played by speakers and/or sent to an "audio out" port on the computing device.

FIG. 2 shows a typical prior art system in which the user interacts with the web browser using a web browser user interface ("UI") to find, retrieve and/or consume the internet content. The web browser UI may accept input from the user to navigate web pages and to discover and retrieve the internet content. The web browser UI may display and/or may render the internet content for the user. The web browser may use one or more multimedia players to process and render the multimedia content. The multimedia player may access the multimedia content using the web browser, as shown in FIG. 2, or the multimedia player may access the multimedia content using the internet without the multimedia content passing through the web browser.

Thus, the web browser may provide an interactive experience in which the user may find, retrieve and/or consume internet content, such as multimedia content. The web browser is currently the only means by which a user may access the complete collection of multimedia content available on the internet. However, the web browser is limited to rendering the internet content on the computing device which hosts the web browser.

The emergence of multimedia home networking technologies allows users to enjoy digital multimedia content on a variety of networked rendering devices in the home. The Universal Plug and Play (UPnP) Audio and Video (AV) standard defines a popular protocol by which media servers and media rendering devices may be connected, controlled and used to process and play multimedia content. The Digital Living Network Alliance (DLNA) specification provides additional details and conformance points to ensure UPnP AV-based home networking products correctly communicate with each other. Products based on the UPnP AV standard and/or the DLNA specification allow the user to access, control and render digital multimedia content files, such as, for example, audio files, video files, digital photographs and the like, within a multimedia-enabled home network.

Typically, the digital multimedia content files reside on one or more media servers in the home network. The digital multimedia content files may have been downloaded from the internet. For example, the user may have accessed an internet content store using the web browser to purchase and/or download the digital multimedia content files to one of the media servers in the home network. Alternatively, the digital multimedia content files may have been acquired without using the internet. For example, the user may have copied audio files from a CD or transferred video files from a camcorder and stored resulting audio and/or video files on one of the media servers in the home network. After the digital multimedia content files are stored on one of the media servers in the home network, user input may direct transmittal of the digital multimedia content files to one or more of the media rendering devices in the home network.

The home network may have various media rendering devices, such as, for example, networked stereos, televisions, personal computers, digital photo frames and other devices which have multimedia content rendering capabilities. The home network may also have control points which may be used to control the servers and the rendering devices so that the user may discover and/or may select from the digital multimedia content files and/or may control a rendering experience.

Thus, existing multimedia home networking technologies may enable selection, delivery and/or rendering of the digital multimedia content files which reside on the media servers in the home network. However, the digital multimedia content files must be downloaded and/or purchased by the user and must be placed on one of the media servers to be accessible to the rendering devices in the home network. Much of the multimedia content available on the internet was created for delivery to and/or display in a web browser and is typically not available in a downloadable form. Thus, the existing multimedia home networking technologies do not allow the user to access the complete collection of multimedia content available on the internet which has been created for delivery to and display within a web browser.

The user may have a media management and control application which enables the user to find, obtain, organize and play multimedia content. Typically, the media management and control application is provided by a personal computer or a laptop computer. For example, Twonky Media Manager (trademark of PacketVideo Corp.), SimpleCenter (trademark of Universal Electronics, Inc.) and iTunes (trademark of Apple Computer, Inc.) are media management and control applications provided by mobile devices. However, limited versions of a media management and control application may be provided by mobile devices, such as PDAs or mobile telephones.

The media management and control application may access an online content store to enable the user of the application to find, purchase and/or download multimedia content from the online content store. Thus, the application may allow the user to build a collection of multimedia content which may be played within the application, may be transferred to a mobile device and/or may be sent to one or more of the rendering devices in the home network. The application may act as a media server to transfer the multimedia content to the media rendering devices in the home network at the request of the user.

The media management and control application may have access to specific digital multimedia content files and/or multimedia content streams available from the internet. For example, the application may have the ability to relay internet radio channels. The user may select one of the internet radio channels. Then, the application may stream the selected internet radio channel from the internet to one or more of the rendering devices in the home network without storing the multimedia content on the media servers in the home network. The media management and control application may act as a media server and may reformat the content for compatibility with the target rendering device.

Therefore, media management and control applications may provide functions to obtain, purchase and/or organize multimedia content. The applications may also provide access to a limited subset of the multimedia content available on the internet. However, the applications do not have web browser functionality, and do not provide access to the complete collection of multimedia content available on the internet which has been created for delivery to and/or display within web browsers. Existing media management and control applications do not enable rendering of the complete collection of multimedia content available on the internet by the rendering devices in a home network.

An emerging class of consumer electronics device products known as bridge devices connect to the home network and to the rendering devices, in the home to allow direct display of streamed internet multimedia content on one or more of the rendering devices. Typically, bridge devices do not access the rendering device using the home network. Instead, bridge devices have a wired audio and/or video connection which attaches directly to the rendering device. Thus, a bridge device is coupled directly to a single rendering device, and the rendering device does not need to be capable of connecting to the home network.

The bridge devices do not provide web browser functionality and, therefore, are not capable of providing access to the complete collection of multimedia content available on the internet. The bridge devices are designed to accommodate a specific subset of internet multimedia content, often from one or a few content sites. Restriction of the use of the bridge device to a few content sites enables the bridge device to be inexpensive and to have a relatively simple user interface. An example of a bridge device is a "Netflix Ready" device (trademark of Netflix, Inc.), such as the "Roku Digital Video Player" that allows the user to access Netflix "instant watch" videos from the internet and display them on a television. The "Netflix Ready" device must have an internet connection, and the user must have a valid Netflix subscription. However, the "Netflix Ready" device cannot browse internet multimedia content other than the Netflix "instant watch" videos. The "Netflix Ready" device also must be connected to the television using wired audio and video cables, and the "Netflix Ready" device cannot connect wirelessly to the television and cannot connect to a DLNA television using the home network.

Another example of bridge devices are some cable set-top boxes and digital video recorders (DVRs) that provide access to "YouTube" internet content (trademark of Google Inc.). For example, TiVo's HD DVR is an example of a bridge device which supports "YouTube" internet content. These bridge devices allow a subset of YouTube's internet video content to be viewed directly on a television using wired audio and video cables. The set-top box or DVR must have an internet connection, and a monthly subscription fee may be required. However, these bridge devices cannot browse general internet multimedia content and, therefore, cannot provide access to the complete collection of multimedia content available on the internet.

Existing web browsers are limited to rendering the internet multimedia content on the computing device which hosts the web browser. Existing multimedia home networking technologies and bridge devices enable rendering of multimedia content on rendering devices in the home network but do not allow the user to access the complete collection of multimedia content available on the internet. Therefore, existing multimedia technology does not enable consumption of the complete collection of multimedia content available on the internet on rendering devices in the home network.

The present invention also generally relates to a system and method for using an application on a mobile device to transfer internet media content to a rendering device in a home network. More specifically, the application may use an HTML rendering engine to display a web page to a user of the mobile device, and the web page may have controls for accessing the internet media content. The application may initiate transfer of the internet media content to the rendering device in the home network and/or may queue the internet media content for later playback using the rendering device.

The internet has a large and still growing number of content sites which offer access to digital media content, such as digital photographs, digital music files and/or streams, digital video files and/or streams, and/or the like. Such internet media content is typically accessible through web pages provided by the content site or by a third party site, such as a search engine provider or a content indexing service. Therefore, end users typically access internet media content using a web browser to discover, select and/or play back the internet media content. The internet media content is typically played using media playback capabilities of the web browser. Alternatively, the internet media content may be played by a companion media player which may be a separate application or which may be added to the web browser in the form of a "browser plug-in."

For example, a user may access Flickr (trademark of Yahoo! Inc., domain at www.flickr.com) in a web browser to search for and view photographs uploaded by users of the Flickr photo sharing site. As another example, a user may visit YouTube (trademark of Google Inc., domain at www.youtube.com) to search for and view video content uploaded by users of the YouTube video sharing service. As another example, a user may pull up the Google search engine (trademark of Google Inc., domain at www.google.com) to perform a free-form search, and, as a result, the user may obtain a page of search results which includes and provides access to internet media content from various content sites. Accordingly, a user has many avenues to explore content sites and/or to discover digital media content available on the internet.

Web browsers were originally created for full-function personal computer devices, such as desktop and laptop PC's. However, as a result of the constant evolution of computing technology, a wide array of consumer electronics devices now have web browsers. For example, web browsers are currently present in mobile phones, smartphones, PDA's, tablet computing devices, televisions and gaming devices. Web browsers in such electronic devices often have browsing capabilities similar to the browsing capabilities of a PC browser. For example, the web browser in a modern smartphone may have full HTML rendering capabilities; may be capable of running scripting languages, such as JavaScript (trademark of Oracle America, Inc.) and Flash (trademark of Adobe Systems Inc.); may be capable of playing media content discovered through web pages; and/or similar web browsing capabilities.

However, web browsers on such electronic devices still lack the extensibility and flexibility of a typical PC browser. For example, web browsers for mobile phones, smartphones and PDA's typically do not have a "plug-in" architecture and, therefore, do not support the ability to accept external plug-ins or toolbars for adding new functionality to the web browser. There are practical reasons for this limitation. For example, such extensibility may present security concerns for the mobile device web browser. As another example, mobile devices often have limited screen size and user input facilities for which display of a toolbar or implementation of additional user interface functions for interaction with a plug-in may be impractical.

The discovery of and access to digital media content is, of course, not limited to web browsers. Multimedia home networking technologies, such as UPnP AV (trademark of UPnP Forum Non-Profit Corp.) and DLNA (trademark of Digital Living Network Alliance Corp.), allow users to consume digital media content through a growing array of consumer electronics devices. For example, a user may have a library of digital music files on a media server device in a home network, and the user may access and play back the digital music files using a DLNA-compliant networked stereo device. In a similar fashion, the user may have digital video files stored in the home network, and the user may access and play back the digital video files using a DLNA-compliant television attached to the home network. A DLNA-compliant rendering device may have an internal control point which enables the device to present a user interface by which the user may browse media servers and sources to discover, select, retrieve, and/or play back the media content available through the home network. Alternatively or additionally, a DLNA-compliant rendering device may support external control so that an external control point device and/or an external control point application may be used to send media content to the rendering device. Moreover, an external control point device and/or an external control point application may instruct the rendering device to retrieve media from a media server and/or may control the media playback on the rendering device.

A networked media controller product may reside in a home network and may provide control point functionality, media playback control, queued playback, and/or other media control functions. The networked media controller may enable other electronic devices, such as mobile devices, to access such media control functions through the home network using one or more control interfaces provided by the networked media controller. Embodiments of such a networked media controller product are disclosed in U.S. Pub. No. 2010/0095332, herein incorporated by reference in its entirety.

Many non-PC computing devices now support downloadable applications. For example, the "App Store" (trademark of Apple Inc.) provides downloadable applications for Apple devices such as the iPhone, iPad and iPod Touch (all trademarks of Apple Inc.). As another example, the Android Marketplace provides downloadable applications for use on Android OS devices, such as Android smartphones and tablets (trademark of Google Inc.). As a third example, the ability to download and execute applications is built into many devices, such as televisions, media player devices, Blu-ray players (trademark of Blu-ray Disc Association) and gaming consoles.

Operating systems, such as iOS (trademark of Apple Inc.) and the Android OS, provide a rich application development environment. As a result, the downloadable applications may access various OS-provided functions and services related to graphics display, user input, network access, rendering of web content, scripting, media playback, and/or the like. For example, the Android operating system has a WebView class which is capable of rendering web pages, executing JavaScript (trademark of Oracle America, Inc.) code, processing user interaction, and the like. However, current web browsers, such as the web browsers provided by iOS and the Android OS, do not have a plug-in architecture to enable the mobile device to use a plug-in product to transfer internet media content to a rendering device in a home network.

SUMMARY OF THE INVENTION

The present invention generally relates to a system and a method for managing and/or rendering internet multimedia content in a network. More specifically, the present invention relates to a system and a method that utilize an application to render the internet multimedia content and/or locally stored multimedia content on one or more rendering devices in the network. The application may provide web browser functions, such as, for example, requesting, receiving, processing, decoding and/or rendering the internet multimedia content. The application may have an enhanced user interface which may enable a user to select the internet multimedia content and a rendering device in the home network, send the internet multimedia content to the rendering device and/or control rendering of the internet multimedia content on the rendering device.

To this end, in an embodiment of the present invention, a method for rendering internet multimedia content in a network connected to the internet is provided. A rendering device is connected to the network. The method has the steps of retrieving the internet multimedia content from the internet using the network wherein the internet multimedia content is retrieved from the internet based on user input accepted by a user interface provided by a device connected to the network and further wherein the user interface displays a web page; transmitting the internet multimedia content to the rendering device; and rendering the internet multimedia content on the rendering device wherein rendering by the rendering device is controlled by the device that provides the user interface.

In an embodiment, the method has the step of processing the internet multimedia content before transmitting the internet multimedia content to the rendering device wherein processing of the internet multimedia content is based on capabilities of the rendering device.

In an embodiment, the method has the step of displaying controls based on properties of the internet multimedia content wherein the controls are displayed in the user interface and further wherein the internet multimedia content is transmitted to the rendering device in response to selection of at least one of the controls.

In an embodiment, the method has the step of displaying controls based on capabilities of the rendering device wherein the controls are displayed in the user interface and further wherein the internet multimedia content is transmitted to the rendering device in response to selection of at least one of the controls.

In an embodiment, the method has the step of transmitting a first message to the rendering device wherein the rendering device transmits a second message in response to the first message and further wherein the second message requests transmittal of the internet multimedia content to the rendering device.

In an embodiment, the method has the step of retrieving a restriction associated with the internet multimedia content before transmitting the internet multimedia content to the rendering device wherein the internet multimedia content is transmitted to the rendering device if the restriction does not prohibit transmittal to the rendering device.

In an embodiment, the method has the step of displaying a list of rendering devices that indicates that the rendering device and an additional rendering device are capable of rendering the internet multimedia content and further wherein the internet multimedia content is transmitted to the rendering device in response to selection of the rendering device from the list.

In an embodiment, the method has the step of creating a playlist that has the internet multimedia content and multimedia content files stored in a server connected to the network wherein the internet multimedia content and the multimedia content files stored in the server are rendered in response to selection of the playlist.

In an embodiment, the method has the step of storing the internet multimedia content as a digital multimedia content file on a server connected to the network in response to user input accepted by the user interface.

In an embodiment, the method has the step of rendering the internet multimedia content in the user interface in substantial synchronization with rendering of the internet multimedia content by the rendering device.

In an embodiment, the method has the step of displaying a graphic representation of the rendering device wherein the internet multimedia content is transmitted to the rendering device in response to selection of the graphic representation.

In an embodiment, the method has the step of creating a bookmark for the internet multimedia content wherein a default rendering device connected to the network is associated with the bookmark and further wherein selection of the bookmark using the user interface initiates rendering of the internet multimedia content on the default rendering device.

In an embodiment, the internet multimedia content is provided by a first web page and further wherein the rendering device continues to render the internet multimedia content after the user interface navigates from the first web page to a second web page that is a different web page than the first web page.

In an embodiment, the method has the step of transmitting advertising content associated with the internet multimedia content to the rendering device wherein the rendering device renders the advertising content.

In an embodiment, the method has the step of storing the internet multimedia content and advertising content associated with the internet multimedia content as a digital multimedia content file on a server connected to the network in response to user input accepted by the user interface.

In another embodiment of the present invention, a method for rendering internet multimedia content in a network connected to the internet is provided. A plurality of rendering devices are connected to the network and further wherein each of the plurality of rendering devices has rendering capabilities. The method has the steps of retrieving the internet multimedia content from the internet with a user interface provided on a device connected to the network wherein the internet multimedia content has properties and further wherein the user interface displays a web page; identifying at least one rendering device of the plurality of rendering devices wherein the rendering capabilities of the at least one rendering device correspond to the properties of the internet multimedia content; displaying a first set of controls in the user interface wherein each of the at least one rendering device is associated with one of the first set of controls; accepting user input that identifies a selected control of the first set of controls wherein the user input determines a target rendering device and further wherein the target rendering device is one of the at least one rendering device which is associated with the selected control; transmitting the internet multimedia content to the target rendering device; and rendering the internet multimedia content on the target rendering device.

In an embodiment, the method has the step of reviewing a restriction associated with the internet multimedia content wherein the at least one rendering device conforms to the restriction.

In an embodiment, the method has the step of displaying a restriction associated with the internet multimedia content in the user interface wherein the internet multimedia content is transmitted to the target rendering device in response to user input after display of the restriction.

In an embodiment, the method has the step of displaying a second set of controls that control rendering of the internet multimedia content on the target rendering device.

In an embodiment, the method has the step of transmitting messages from the plurality of rendering devices wherein the messages indicate the rendering capabilities and further wherein the at least one rendering device is identified using the messages.

In another embodiment of the present invention, a system for rendering internet multimedia content in a network connected to the internet is provided. A rendering device is connected to the network. The system has a renderer control component that detects that the rendering device is connected to the network and further wherein the renderer control component determines capabilities of the rendering device; a user interface that presents control options for the internet multimedia content wherein the internet multimedia content is selected using a web page associated with the internet multimedia content and further wherein the user interface is connected to the renderer control component wherein the control options are based on properties of the internet multimedia content and the capabilities of the rendering device and further wherein the user interface accepts user input selecting at least one of the control options; a transcoder that processes the internet multimedia content to generate processed internet multimedia content in response to the user input wherein the processed internet multimedia content is based on the capabilities of the rendering device; and a media server component that receives the processed internet multimedia content from the transcoder and transmits the processed internet multimedia content to the rendering device.

In an embodiment, the renderer control component, the user interface, the transcoder and the media server component are provided by a plug-in application that connects to a primary application executed by a device connected to the network and further wherein the primary application provides a web browser used to retrieve the web page.

In an embodiment, the system has a web browser component connected to the user interface wherein the web browser component retrieves the web page and further wherein the web browser component, the renderer control component, the user interface, the transcoder and the media server component are provided by an application executed by a device connected to the network.

In an embodiment, the system has a media player attached to the user interface wherein the media player, the renderer control component, the user interface, the transcoder and the media server component are provided by an application executed by a device connected to the network and further wherein the media player renders the internet multimedia content on. The device that provides the application.

In an embodiment, the system has a server accessible using the internet wherein the server provides a restriction for the internet multimedia content and further wherein the internet multimedia content is transmitted to the rendering device if transmittal to the rendering device complies with the restriction.

In an embodiment, the system has a first device connected to the network wherein the first device provides the renderer control component, the user interface, the transcoder and the media server component and further wherein the media server component indicates availability of the internet multimedia content to a second device connected to the network that is a different device than the first device.

In an embodiment, the system has a content management component connected to the user interface wherein the content management component creates a playlist that has the internet multimedia content and multimedia content files stored in a server connected to the network and further wherein the internet multimedia content and the multimedia content files stored in the server are rendered in response to selection of the playlist.

In an embodiment, the renderer control component acts as a UPnP AV Control Point.

In an embodiment, the transcoder generates the processed internet multimedia content to conform to a digital rights management protection associated with the internet multimedia content.

In an embodiment, the renderer control component transmits a first message to the first rendering device in response to the user input and further wherein the first rendering device transmits a second message to the media server component in response to the first message further wherein the second message requests transmittal of the processed internet multimedia content to the first rendering device.

It is, therefore, an advantage of the present invention to provide a system and a method for managing and/or rendering internet multimedia content in a network.

Another advantage of the present invention is to provide a system and a method for managing and/or rendering internet multimedia content in a network that enable rendering devices in the network to access the complete collection of internet multimedia content.

And, another advantage of the present invention is to provide a system and a method for managing and/or rendering internet multimedia content in a network that render the internet multimedia content in a home network without downloading the internet multimedia content to a media server in the home network.

Yet another advantage of the present invention is to provide a system and a method for managing and/or rendering internet multimedia content in a network that access the complete collection of the internet multimedia content using a web browser interface.

Still further, an advantage of the present invention is to provide a system and a method for managing and/or rendering internet multimedia content in a network that enable the user to send the internet multimedia content to any compatible rendering device in the network.

And, another advantage of the present invention is to provide a system and a method for managing and/or rendering internet multimedia content in a network that implement a user interface which combines web browsing tasks with the tasks of selecting, managing and controlling rendering devices in the network.

Yet another advantage of the present invention is to provide a system and a method for managing and/or rendering internet multimedia content in a network that organize and manage both the internet multimedia content and locally stored multimedia content to provide access to all multimedia content of interest to the user.

Still further, an advantage of the present invention is to provide a system and a method for managing and/or rendering internet multimedia content in a network that may be implemented as a "plug-in" to an existing web browser.

And, another advantage of the present invention is to provide a system and a method for managing and/or rendering internet multimedia content in a network that interpret and apply digital rights management technology for explicitly protected multimedia content.

Still further, an advantage of the present invention is to provide a system and a method for managing and/or rendering internet multimedia content in a network that detect, display and enforce terms of use associated with the internet multimedia content.

Another advantage of the present invention is to provide a system and a method for managing and/or rendering internet multimedia content in a network which detect advertising content associated with the internet multimedia content and/or ensure that the advertising content is displayed effectively and/or appropriately in the network.

Yet another advantage of the present invention is to provide a system and a method for managing and/or rendering internet multimedia content in a network that find, retrieve, bookmark and/or organize the internet multimedia content in a web browser and provide access to the internet multimedia content to rendering devices, control points and/or multimedia clients.

Moreover, an advantage of the present invention is to provide a system and a method for managing and/or rendering internet multimedia content in a network that determine which of the rendering devices in the network are capable of rendering specific multimedia content.

Additional features and advantages of the present invention are described in, and will be apparent from, the detailed description of the presently preferred embodiments and from the drawings.

The present invention generally also relates to a system and method for using an application on a mobile device to transfer internet media content to a rendering device in a home network. More specifically, the application may use an HTML rendering engine to display a web page to a user of the mobile device, and the web page may have controls for accessing the internet media content. The application may receive a user interaction signal which may indicate that a user invoked one of the controls for accessing the internet media content. In response, the application may initiate transfer of the internet media content to the rendering device in the home network and/or may queue the internet media content for later playback using the rendering device.

It is, therefore, an advantage of the present invention to provide a system and a method for using an application on a mobile device to transfer internet media content to a rendering device in a home network.

Another advantage of the present invention is to provide a system and a method for using an application on a mobile device to transfer internet media content to a rendering device in a home network which use a standard HTML rendering engine to render a web page on the mobile device and provide controls in the rendered web page for accessing the internet media content.

And, another advantage of the present invention is to provide a system and a method for using an application on a mobile device to transfer internet media content to a rendering device in a home network which analyze web content to identify controls for accessing the internet media content.

A further advantage of the present invention is to provide a system and a method for using an application on a mobile device to transfer internet media content to a rendering device in a home network which modify web content to insert additional media controls into the web content and use a standard HTML rendering engine to render the modified web content.

Another advantage of the present invention is to provide a system and a method for using an application on a mobile device to transfer internet media content to a rendering device in a home network which provide script fragments for processing a standard representation of a web page.

Yet another advantage of the present invention is to provide a system and a method for using an application on a mobile device to transfer internet media content to a rendering device in a home network which enable the application to receive a user interaction signal from a standard HTML rendering engine and respond by instructing the rendering device to render the internet media content.

A further advantage of the present invention is to provide a system and a method for using an application on a mobile device to transfer internet media content to a rendering device in a home network which present playback mode selection controls for selecting a playback mode which determines media playback behavior for internet media content selected in a rendered web page.

Another advantage of the present invention is to provide a system and a method for using an application on a mobile device to transfer internet media content to a rendering device in a home network which have a media transcoder component provided by the application for transcoding the internet media content based on capabilities of the rendering device.

Yet another advantage of the present invention is to provide a system and a method for using an application on a mobile device to transfer internet media content to a rendering device in a home network which have a media server component provided by the application for proxying the transfer of internet media content to the rendering device.

Another advantage of the present invention is to provide a system and a method for using an application on a mobile device to transfer internet media content to a rendering device in the home network which transfer the internet media content using a rendering control component in the home network which is separate from the mobile device and the rendering device.

And, another advantage of the present invention is to provide a system and a method for using an application on a mobile device to transfer internet media content to a rendering device in a home network which retrieve and render a web page on the mobile device and retrieve an alternative version of the web page having controls for accessing a different version of the internet media content of the web page.

Yet another advantage of the present invention is to provide a system and a method for using an application on a mobile device to transfer internet media content to a rendering device in a home network which do not require that the mobile device browser has a plug-in architecture.

A further advantage of the present invention is to provide a system and a method for using an application on a mobile device to transfer internet media content to a rendering device in a home network which enable web browsing to occur with enhanced multimedia functions for the internet media content.

Another advantage of the present invention is to provide a system and a method for using an application on a mobile device to transfer internet media content to a rendering device in a home network which use an HTML rendering engine external to the application.

And, another advantage of the present invention is to provide a system and a method for using an application on a mobile device to transfer internet media content to a rendering device in a home network which render the internet media content in the home network without downloading the internet media content to a media server in the home network.

Another advantage of the present invention is to provide a system and a method for using an application on a mobile device to transfer internet media content to a rendering device in a home network which enable the user to send the internet multimedia content to any compatible rendering device in the home network.

Yet another advantage of the present invention is to provide a system and a method for using an application on a mobile device to transfer internet media content to a rendering device in a home network which implement a user interface which combines web browsing tasks with the tasks of selecting, managing and controlling rendering devices in the home network.

Additional features and advantages of the present invention are described in, and will be apparent from, the detailed description of the presently preferred embodiments and from the drawings.

DETAILED DESCRIPTION OF THE INVENTION

The present invention generally relates to a system and a method for managing and/or rendering internet multimedia content in a network. More specifically, the present invention relates to a system and a method that utilize an application to render the internet multimedia content and/or locally stored multimedia content on one or more rendering devices in the network. The application may provide web browser functions, such as, for example, requesting, receiving, processing, decoding and/or rendering the internet multimedia content. The application may send the internet multimedia content to one or more rendering devices in a home network for rendering. The application may have an enhanced user interface which may enable a user to select the internet multimedia content and a rendering device in the home network, send the internet multimedia content to the rendering device and/or control rendering of the internet multimedia content on the rendering device. The application may manage both the internet multimedia content and the locally stored multimedia content in the network.

The present invention also generally relates to a system and method for using an application on a mobile device to transfer internet media content to a rendering device in a home network. More specifically, the application may use an HTML rendering engine to display a web page to a user of the mobile device, and the web page may have controls for accessing the internet media content. The web page may be based on web content retrieved from a content source. The application may analyze the web content to identify the controls for accessing the internet media content, and/or the application may modify the web content to insert additional media controls. The application may receive a user interaction signal which may indicate that a user invoked one of the controls for accessing the internet media content and/or one of the additional media controls. In response, the application may initiate transfer of the internet media content to the rendering device in the home network and/or may queue the internet media content for later playback using the rendering device.

Figure 1:
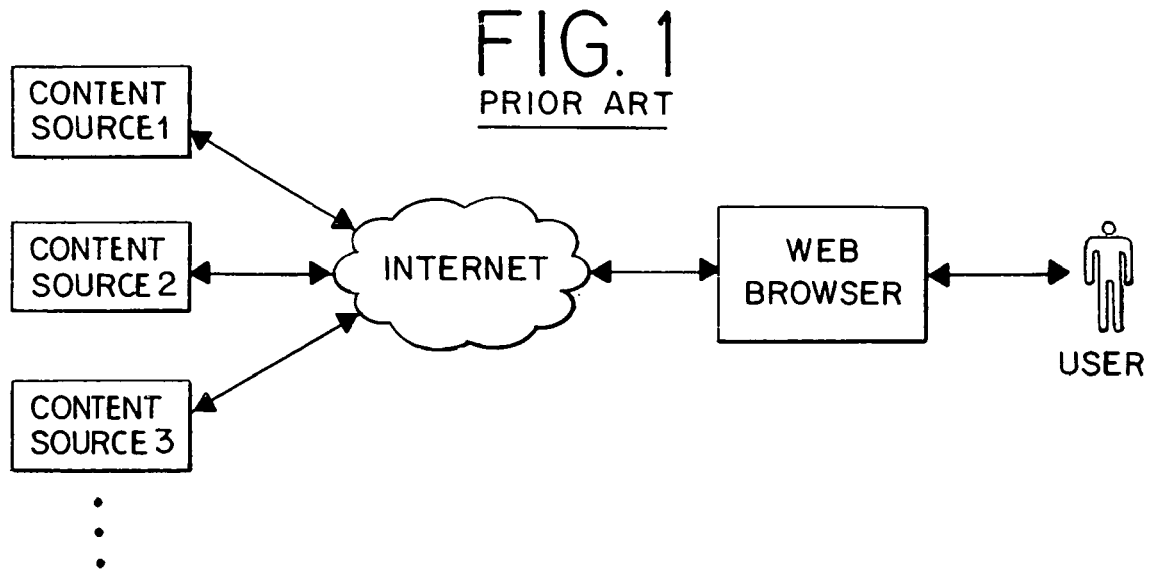
FIG. 1 illustrates a prior art system for rendering internet multimedia content.
Figure 2:
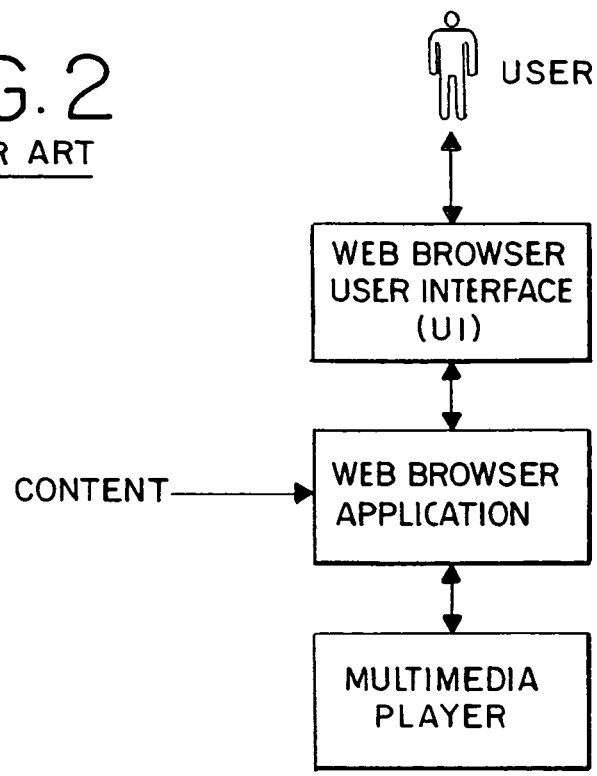
FIG. 2 illustrates a prior art system for rendering internet multimedia content.
Figure 3:
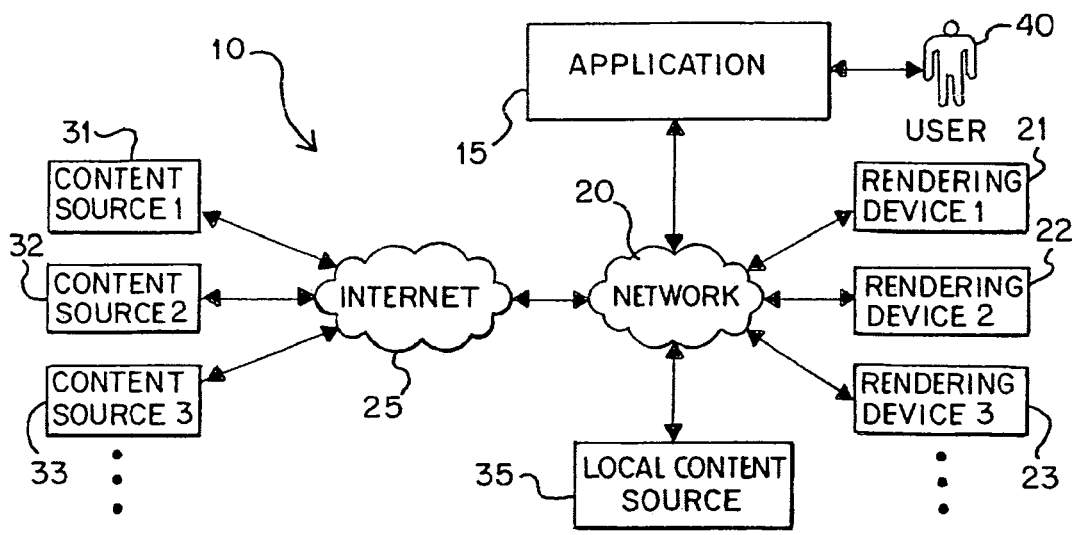
FIG. 3 illustrates a system for managing and/or rendering internet multimedia content in a network in an embodiment of the present invention.

Referring now to the drawings wherein like numerals refer to like parts, FIG. 3 generally illustrates a system 10 for managing and/or rendering internet multimedia content in a network. The system 10 may have an application 15 which may be connected to the internet 25 by a network 20. In a preferred embodiment, the network 20 may be a home network. The network 20 may have connections that are wired or wireless. For example, the network 20 may be based on one or more of the following technologies: Ethernet/wired LAN, IEEE 1394 ("Fire Wire") and/or IEEE 802.11 ("WiFi"). The network 20 may utilize other technologies not listed herein. The present invention is not limited to a specific embodiment of the network 20.

The application 15 may use the network 20 and/or the internet 25 to access one or more internet content sources, such as, for example, a web server, a multimedia server and/or any source of internet multimedia content. For example, the internet content sources may provide the internet multimedia content to the application 15 using well-known internet delivery protocols, such as, for example, Hypertext Transfer Protocol ("HTTP"), Real Time Streaming Protocol ("RTSP"), Transmission Control Protocol ("TCP"), User Datagram Protocol ("UDP") and/or Real-time Transport Protocol ("RTP"). For example, the application 15 may access a first internet content source 31, a second internet content source 32 and/or a third internet content source 33 (collectively "the internet content sources 31, 32, 33").

The application 15 may use the network 20 to access one or more local content sources, such as, for example, a personal computer; a laptop computer; a Network Attached Storage ("NAS") device which may have server capability; a Digital Video Recorder which may have server capability; a portable computing device which may have server capability, such as a mobile telephone or a personal digital assistant; and/or a media capture device, such as a digital still camera or a camcorder, which may have server capability. For example, the application 15 may access a local content source 35. The present invention is not limited to a specific embodiment of the internet content sources or the local content sources or a specific number of the internet content sources or the local content sources. The system 10 does not have an upper limit to a number of internet content sources or local content sources which may be accessed by the application 15.

The application 15 may be connected to one or more rendering devices by the network 20. The rendering devices may be capable of receiving multimedia content using the network 20 and/or rendering the multimedia content for a user 40. The rendering devices may be, for example, a DLNA-compliant television, a DLNA-compliant set-top box connected to a television which may or may not be DLNA-compliant, a DLNA-compliant stereo system, a DLNA-compliant audio adapter device connected to a stereo system which may or may not be DLNA-compliant, a DLNA-compliant photo frame, a personal computer, a laptop computer, a mobile device, a mobile telephone, a personal digital assistant, a video game console, a UPnP AV rendering device and/or the like. For example, a first rendering device 21, a second rendering device 22 and/or a third rendering device 23 (collectively "the rendering devices 21, 22, 23") may be connected to the application 15 by the network 20. The multimedia content may be and/or may have audio content, video content, audiovisual content, digital photos and/or the like. For example, the multimedia content may be the internet multimedia content and/or multimedia content locally stored in the network 20. The present invention is not limited to a specific embodiment of the rendering devices or the multimedia content.

The application 15 may be provided by and/or stored by a computer readable medium, such as, for example, a compact disc, a DVD, a computer memory, a hard drive and/or the like. The computer readable medium may enable the network 20 to execute the application 15. The application 15 may reside on a device connected to the network 20, such as, for example, a personal computer, a laptop computer, a mobile device, a dedicated stand alone device, a network-capable television, a network-capable set-top box, a network-capable stereo system that may have a user interface screen, a network-capable audio adapter device that may have a user interface screen and/or the like. The network 20 may have more than one device that may execute the application 15. The present invention is not limited to a specific embodiment of the device on which the application 15 may reside.

The user 40 may access the application 15 for web browsing tasks using a user interface. Thus, the user 40 may use the user interface of the application 15 to search for the internet multimedia content, to retrieve and display web pages, to navigate within the web pages, to select links within the web pages, to retrieve and/or play the internet multimedia content which may be accessible from the web pages, and/or other common web browser tasks and functionalities which are known to one having ordinary skill in the art. If the application 15 renders the internet multimedia content within the user interface of the application 15, the internet multimedia content may be rendered within a web page, or the internet multimedia content may be rendered in a separate multimedia player window.

The application 15 may display playback controls to allow the user 40 to control rendering of the internet multimedia content. For example, the playback controls may enable the user 40 to play, pause, seek forward, seek backward, replay from the beginning and/or the like. The playback controls may enable the application 15 to support rendering and/or control of internet multimedia content similar to a typical web browser.

The application 15 may identify the internet multimedia content which the user 40 may be accessing and/or may be consuming using the user interface of the application 15. The application 15 may present enhanced multimedia options for the internet multimedia content. The enhanced multimedia options may enable the user to distribute the internet multimedia content to one or more of the rendering devices 21, 22, 23 in the network 20. The enhanced multimedia options may enable the user 40 to view which of the rendering devices 21, 22, 23 may be available and/or to select an available rendering device from the rendering devices 21, 22, 23 to transfer the internet multimedia content to the selected rendering device.

The application 15 may establish one or more of the rendering devices 21, 22, 23 as a default rendering device. The internet multimedia content may be transferred to the default rendering device without selecting from the rendering devices 21, 22, 23. The application 15 may allow the user 40 to establish a default rendering device for different content types. For example, the first rendering device 21 may be established as the default rendering device for audio content, and/or the second rendering device 22 may be established as the default rendering device for video content.

The enhanced multimedia options may enable the user 40 to add the internet multimedia content to a list of bookmarks so that a specific multimedia content object may be retrieved later by the user 40. The application 15 may enable the user 40 to add multimedia content files stored in the network 20 to the list of bookmarks. For example, the application 15 may add multimedia content files stored in the local content source 35 to the list of bookmarks. As a further example, the multimedia content files added to the list of bookmarks may be stored by devices connected to the network 20, such as, for example, file servers and/or personal computers. The application 15 may enable the user 40 to organize the bookmarks into categories, areas, folders and/or the like without regard to whether individual bookmarks refer to the internet multimedia content or to the multimedia content files stored in the network 20. The application 15 may enable the user 40 to associate a default rendering device with one or more of the bookmarks so that selection of the bookmark may initiate rendering of the associated multimedia content by the default rendering device without selection from the rendering devices 21, 22, 23. The application 15 may enable the user 40 to associate a default rendering device to a bookmark category, area, folder and/or the like so that selection of any bookmark in the associated category, area and/or folder may direct rendering of the associated multimedia content by the default rendering device without selection from the rendering devices 21, 22, 23.

The application 15 may enable the user 40 to create one or more playlists based on the bookmarks. The playlist may enumerate a list of multimedia content objects which may be, for example, the internet multimedia content and/or the multimedia content files stored in the network 20. The list of multimedia content objects may be played back in sequence on one or more of the rendering devices 21, 22, 23 in the network 20. The playlist may refer to the internet multimedia content, the multimedia content files stored in the network 20 and/or a combination of the internet multimedia content objects and the multimedia content files stored in the network 20. The application 15 may enable the user to play the multimedia content objects of the playlist within the user interface of the application 15. The application 15 may enable the user 40 to direct the multimedia content objects of the playlist to one or more of the rendering devices 21, 22, 23 in the network 20. The application 15 may enable the user 40 to associate a default rendering device with the playlist so that later rendering of the multimedia content objects of the playlist may be directed to the default rendering device without selection from the rendering devices 21, 22, 23.

Figure 4:
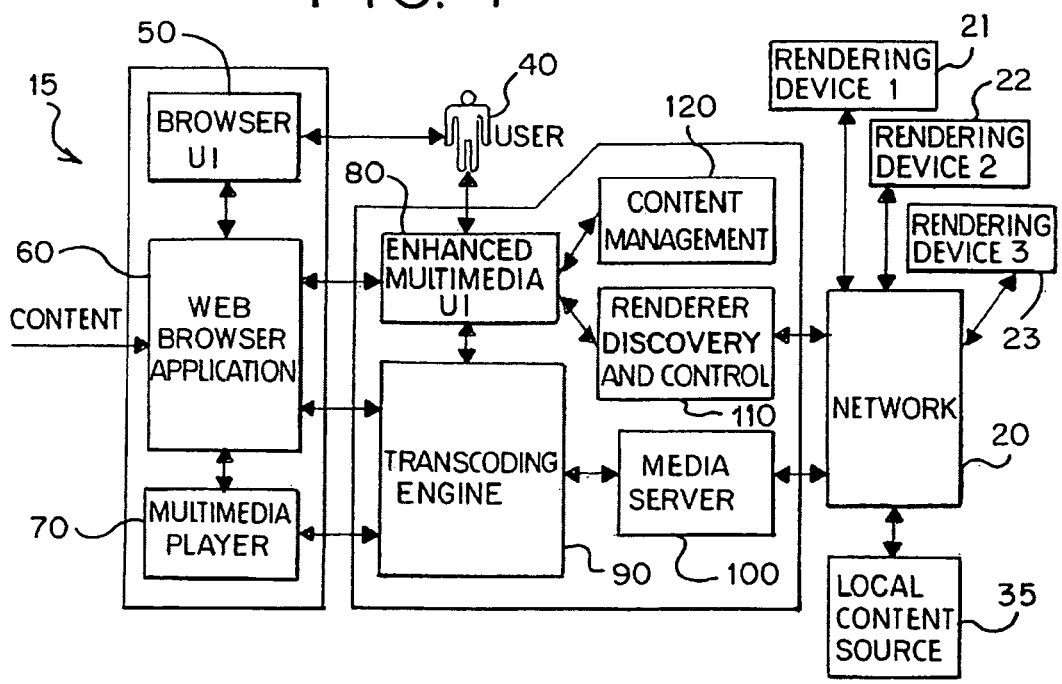
FIG. 4 illustrates an application for managing and/or rendering internet multimedia content in a network in an embodiment of the present invention.

FIG. 4 illustrates a black-box-diagram of the application 15 in an embodiment of the present invention. The application 15 may have web browser components. For example, the components of the application 15 may be a browser user interface 50, a web browser application 60 and/or one or more multimedia players 70. The browser user interface 50 may present browser controls that may enable the user 40 to perform web browser tasks using the application 15. For example, the browser user interface 50 may enable the user 40 to search for internet content, to retrieve and display web pages, to navigate within the web pages, to select. links within the web pages, to retrieve and play the internet multimedia content which may be accessible from the web pages and/or other common web browser tasks and functionalities known to one having ordinary skill in the art. The browser user interface 50 may accept user input using input means associated with the device on which the application 15 resides. For example, the input means may be a keyboard, a keypad, a mouse, a 4-way navigation pad, a click wheel, a joystick, a touch screen, a set of programmable "soft keys," a series of buttons on a remote control associated with a television or a set-top box and/or the like. The "soft keys" may be buttons which may perform a function dependent on text shown on a display screen adjacent to the buttons. The present invention is not limited to a specific embodiment of the input means.

The web browser application 60 may retrieve the internet content from remote servers, such as, for example, the internet content sources 31, 32, 33; may process and/or may interpret the internet content; may display the internet content to the user 40 using the browser user interface 50; and/or may perform other web browser tasks known to one having ordinary skill in the art. The web browser application 60 may retrieve, may process, may decode and/or may render the internet multimedia content. The browser user interface 50 may render the internet multimedia content retrieved, processed and/or decoded by the web browser application 60.

The multimedia player 70 that may be connected to and/or may be associated with the web browser application 60 may receive, may process, may decode and/or may render the internet multimedia content. In an embodiment, the internet multimedia content and/or the multimedia content files stored in the network 20 may be received, by the web browser application 60. The web browser application 60 may transmit the internet multimedia content and/or the multimedia content files stored in the network 20 to the multimedia player 70 which may process and/or may decode the internet multimedia content and/or the multimedia content files stored in the network 20. The multimedia player 70 may transmit decoded multimedia content to the web browser application 60 which may render the decoded multimedia content using the browser user interface 50.

The present invention is not limited to a specific arrangement of the web browser application 60 and the multimedia player 70. One having ordinary skill in the art may recognize alternative embodiments. For example, the multimedia content may be received directly by the multimedia player 70 without passing through the web browser application 60. As another example, the multimedia player 70 may directly pass the decoded multimedia content to the browser user interface 50, to a display of the device on which the application 15 resides and/or to an additional device associated with the device on which the application 15 resides. The present invention is not limited to the arrangement of the components of the application 15 illustrated in FIG. 4.

As FIG. 4 generally illustrates, an embodiment of the application 15 may have additional components which may provide enhanced multimedia functionality of the application 15. The application 15 may have an enhanced multimedia user interface 80 which may enable the user 40 to control the enhanced multimedia functionality of the application 15. The application 15 may have a transcoding engine 90 which may transcode, may reformat and/or may repurpose the internet multimedia content for compatibility with one or more of the rendering devices 21, 22, 23 in the network 20. The application 15 may have a media server component 100 which may transfer the multimedia content to one or more of the rendering devices 21, 22, 23 in the network 20.

The application 15 may have a renderer discovery and control component 110 (hereafter "the RDC component 110") which may determine available rendering-30-devices in the network 20, such as, for example, the rendering devices 21, 22, 23. The RDC component 110 may determine capabilities of the available rendering devices in the network 20, such as, for example, capabilities of the rendering devices 21, 22, 23. The RDC component 110 may communicate with the available rendering devices in the network 20 to initiate, maintain and/or control delivery of the multimedia content to and/or rendering of the multimedia content by the available rendering devices. The application 15 may have a content management component 120 which may enable the user 40 to organize and/or to manage the internet multimedia content and/or the multimedia content files stored in the network 20. The content management component 120 may organize and/or may manage bookmarks, playlists, preferences and settings which may be associated with the multimedia content.

The enhanced multimedia user interface 80 of the application 15 may present enhanced multimedia options associated with an active multimedia object. The active multimedia object may be the internet multimedia content which the user 40 may be accessing, using and/or consuming using the application 15. For example, the active multimedia object may be the internet multimedia content which the user 40 may be accessing, using and/or consuming on the browser user interface 50 and/or the multimedia player 70. Thus, for each of the active multimedia objects, the enhanced multimedia options presented by the application 15 may be appropriate for the active multimedia object.

In an embodiment, the enhanced multimedia options may be presented using elements of the enhanced multimedia user interface 80 that may be co-located with the active multimedia object. For example, the enhanced multimedia options may be superimposed over a video object and/or an image object of the active multimedia object. As a further example, the enhanced multimedia options may appear as a graphic button, a graphic tab and/or the like located in proximity to the video object and/or the image object of the active multimedia object. The enhanced multimedia options may be integrated with the playback controls for the active multimedia object. The enhanced multimedia options may utilize a drop-down menu, a pull-out drawer, a sequence of buttons and/or icons, a carousel of buttons and/or icons and/or any other user interface elements for displaying and selecting options as known to one skilled in the art.

The enhanced multimedia options may be, for example, "Redirect," "Bookmark," "Record," "Properties" and/or "Manage" as described in further detail hereafter. In response to selection of the enhanced multimedia option "Redirect," the application 15 may direct one or more of the available rendering devices to render the active multimedia object. For example, the application 15 may control delivery of the active multimedia object to one or more of the rendering devices 21, 22, 23. In response to selection of the enhanced multimedia option "Bookmark," the application 15 may create a bookmark for the active multimedia object. In response to selection of the enhanced multimedia option "Record," the application 15 may store the active multimedia object as a digital multimedia content file on a local server in the network 20, such as, for example, the local content source 35. In response to selection of the enhanced multimedia option "Properties," the application 15 may display detailed information about the active multimedia object. In response to selection of the enhanced multimedia option "Manage," the application 15 may provide a menu that has additional content management options as discussed in further detail hereafter.

The application 15 may present a plurality of "Redirect" options so that each of the plurality of "Redirect" options may correspond to one or more of the available rendering devices in the network 20, such as, for example, one or more of the rendering devices 21, 22, 23. The application 15 may determine which of the available rendering devices may be capable of rendering the active multimedia object, and/or the plurality of "Redirect" options may correspond to the available rendering devices which may be capable of rendering the active multimedia object. User input may define a selected "Redirect" option of the plurality of "Redirect" options, and the rendering device associated with the selected "Redirect" option may initiate rendering of the active multimedia object. In response to selection of one of the plurality of "Redirect" options, the application 15 may initiate repurposing and/or transmitting the active multimedia object to the rendering device associated with the selected "Redirect" option, and/or the rendering device associated with the selected "Redirect" option may begin rendering the active multimedia object.

The application 15 may present additional controls to enable the user 40 to control rendering of the active multimedia content on the associated rendering device. The application 15 may discontinue local rendering of the active multimedia object within the browser user interface 50, or the application 15 may continue to render the active multimedia object within the browser user interface 50 in approximate synchronization with rendering of the active content object by the rendering device associated with the selected "Redirect" option.

The enhanced multimedia option "Bookmark" may create a bookmark for the active multimedia object so that subsequent selection of the bookmark may enable the active multimedia object to be retrieved, repurposed and/or redirected to one or more of the available rendering devices in the network 20, such as, for example, one or more of the rendering devices 21, 22, 23. The application 15 may enable the user 40 to establish a default rendering device for the bookmark, such as, for example, when the bookmark is created. The application 15 may establish the default rendering device for the bookmark as the rendering device to which the user 40 redirects the active multimedia object using one of the plurality of "Redirect" options.

In response to selection of the enhanced multimedia option "Record," the application 15 may store the active multimedia object as a digital multimedia content file on a local server in the network 20, such as, for example, the local content source 35. The enhanced multimedia option "Record" may enable the user 40 to select a location for storage of the active multimedia object as the digital multimedia content file. The enhanced multimedia option "Record" option may enable the user 40 to create a filename, a full name, a summary comment and/or other properties of the digital multimedia content file stored on the local server. The application 15 may determine if the active multimedia object may be appropriate for recording. The active multimedia object may not be appropriate for recording, such as, for example, an active multimedia object protected by digital rights management technology (hereafter "ORM technology"). As a further example, an active content object lacking definite timeline boundaries may not be appropriate for recording. An internet radio channel may not have definite timeline boundaries, for example. The application 15 may present the enhanced multimedia option "Record" for the active multimedia objects which may be appropriate for recording.

The enhanced multimedia option "Properties" may enable the user 40 to view properties of the active multimedia object. The properties may be content properties, such as, for example, an object title, an object classification and/or genre, an associated artist, an associated television—series, an associated music album and/or the like. The properties may be file properties, such as, for example, a file size, a file format, a playback duration, one or more media codecs, one or more media encoding parameters and/or the like. The properties may be legal properties, such as, for example, an indication of protection of the active multimedia object by ORM technology, an indication of protection of the active multimedia object by terms of use, a list of one or more usage restrictions and/or the like.

The enhanced multimedia option "Manage" may enable the user to access the additional content management options, such as, for example, a bookmark management option, a playlist management option, a file management option and/or the like. The user 40 may select the bookmark management option to organize, arrange, classify, create, modify, rename, delete and/or invoke bookmarks associated with multimedia content objects. The user 40 may select the playlist management option to create, modify, rename, delete and/or use playlists. The user 40 may select the file management option to browse, organize, arrange, classify, rename, delete, and/or use the multimedia content files which may be stored on the local server. For example, the multimedia content files stored in the network 20 may be the digital multimedia content files created using the enhanced multimedia option "Record" of the application 15 and/or multimedia content files stored in the network 20 by other means.

Figure 5:
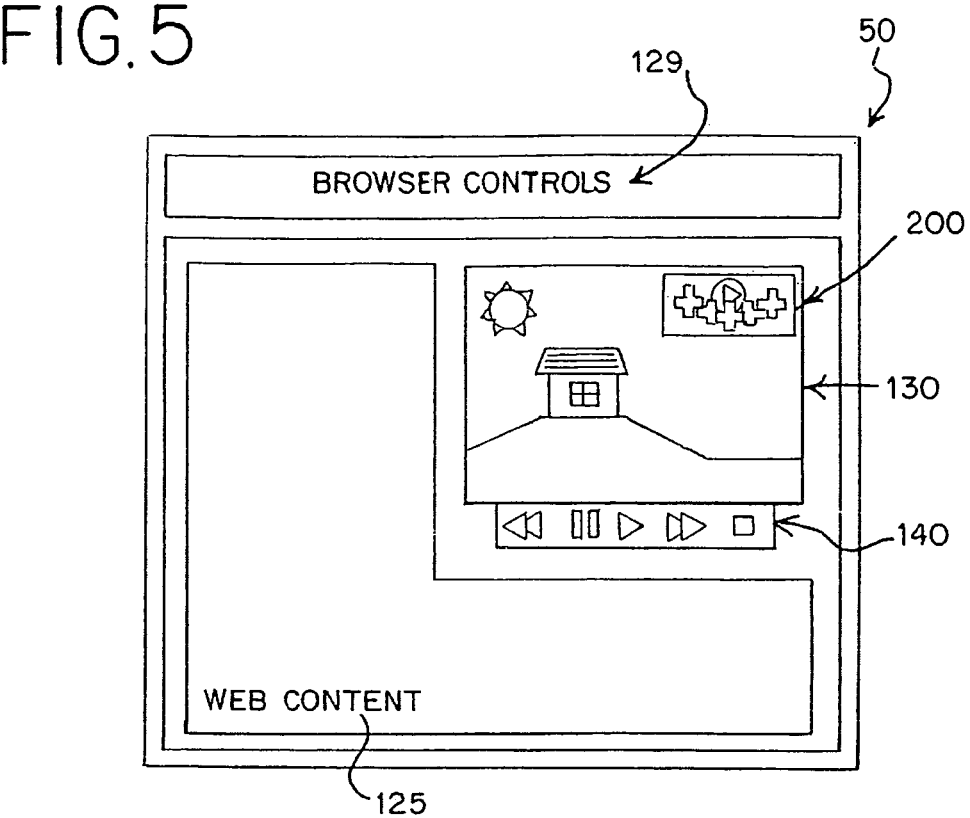
FIG. 5 illustrates a browser user interface in an embodiment of the present invention.
Figure 6:
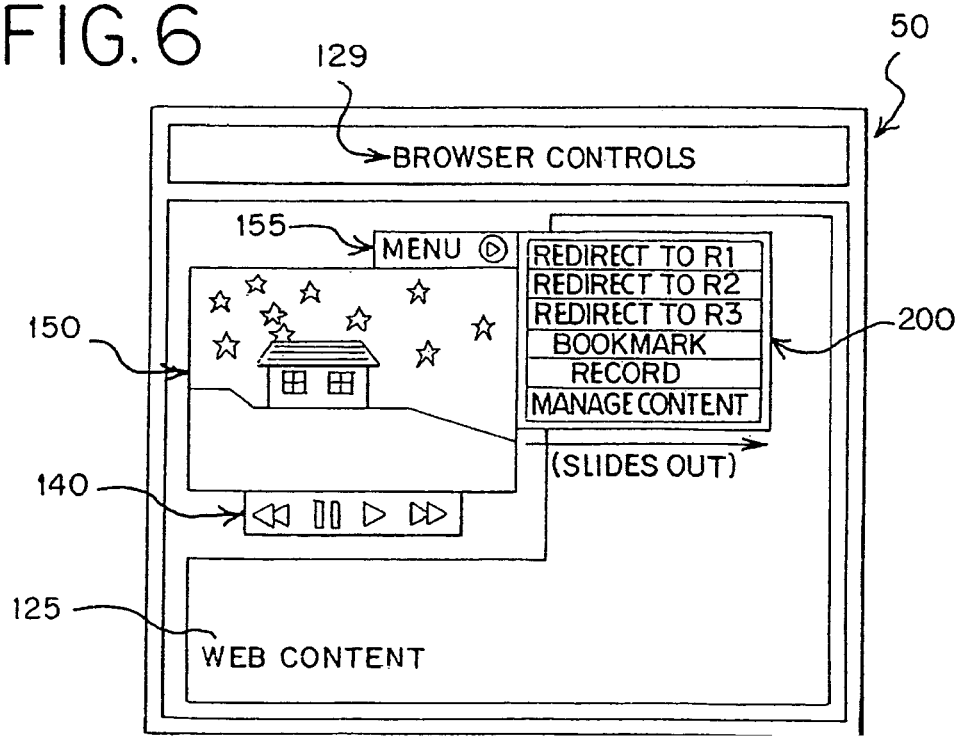
FIG. 6 illustrates a browser user interface in an embodiment of the present invention.
Figure 7:
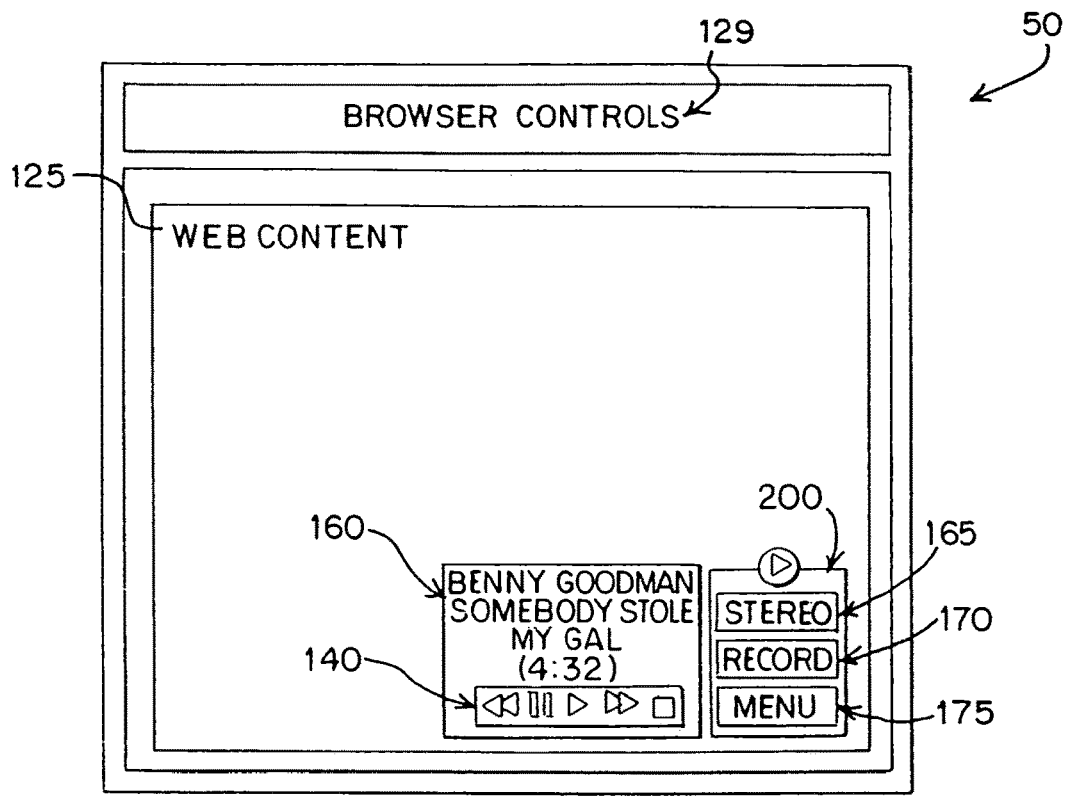
FIG. 7 illustrates a browser user interface in an embodiment of the present invention.

FIGS. 5-7 generally illustrate presentation of the enhanced multimedia options to the user 40 in embodiments of the present invention. FIG. 5 generally illustrates the browser user interface 50 having the enhanced multimedia controls 200 for an active video object 130 in an embodiment of the present invention. The browser user interface 50 of the application 15 may display the browser controls 129 and/or the internet content 125. The internet content 125 may include the active video object 130. The user 40 may view the active video object 130 in the browser user interface 50 of the application 15. The user 40 may control rendering of the active video object 130 using the playback controls 140 associated with the active video object 130. Thus, the active video object 130 may be viewed and/or may be controlled using the browser user interface 50 of the application 15.

The application 15 may display the enhanced multimedia controls 200 in association with the active video object 130. The enhanced multimedia controls 200 may be displayed as an overlay on the active video object 130 as generally illustrated in FIG. 5. The enhanced multimedia controls 200 may be continuously present, or, alternatively, the enhanced multimedia controls may be displayed and/or may be provided after a specific action by, the user 40. For example, the enhanced multimedia controls 200 may be displayed and/or may be provided after the user 40 initiates rendering of the active video object 130 using the playback controls 140. As another example, the enhanced multimedia controls 200 may be displayed and/or may be provided after the user 40 positions an arrow or other pointing icon within boundaries of the active video object.

The enhanced multimedia controls 200 may be displayed as graphic icons which may represent the enhanced multimedia options of the application 15. The graphic icons may be displayed as a flat list of icons, a rotating carousel of icons, a rectangular arrangement of icons and/or any other arrangement known to one having ordinary skill in the art. The present invention is not limited to a specific arrangement or a specific presentation of the graphic icons.

The user 40 may select and/or may activate one or more of the graphic icons to invoke a corresponding enhanced multimedia option 200 of the application 15. For example, one or more of the graphic icons may represent the enhanced multimedia option "Redirect" for directing the active video object to one of the rendering devices 21, 22, 23, such as, for example, a living room television. One of the graphic icons may be an image representing the living room television. The user 40 may select and/or may activate the graphic icon representing the living room television to direct the living room television to render the active video object. The application 15 may transmit the active video object to the living room television.

The enhanced multimedia controls 200 may have a plurality of graphic icons. Each of the plurality of graphic icons may correspond to one of the plurality of "Redirect" options and/or one or more of the rendering devices 21, 22, 23. The enhanced multimedia controls 200 may have graphic icons which may represent other enhanced multimedia options of the application 15, such as, for example, the enhanced multimedia option "Bookmark," the enhanced multimedia option "Record," the enhanced multimedia option "Properties" and/or the enhanced multimedia option "Manage." The enhanced multimedia options which may be displayed may vary based on the embodiment of the application 15. The present invention is not limited to a specific embodiment of which enhanced multimedia options may be displayed.

FIG. 6 generally illustrates the browser user interface 50 having the enhanced multimedia controls 200 for an active image object 150 in an embodiment of the present invention. The browser user interface 50 of the application 15 may display the browser controls 129 and/or the internet content 125. The internet content 125 may include the active image object 150. The active image object 150 may represent a collection of images which may be viewed within the browser user interface 50 of the application 15 as a sequence of images known as a slideshow. The user 40 may control rendering of the collection of images by using the playback controls 140 associated with the active image object 150. Thus, the active image object 150 may be viewed and/or may be controlled using the browser user interface 50 of the application 15.

The application 15 may display the enhanced multimedia controls 200 in association with the active image object 150. The enhanced multimedia controls 200 may be displayed as a menu which may appear to slide out of the active image object 150 as illustrated in FIG. 6. The application 15 may present an activation control 155 in association with the active image object. The activation control 155 may control appearance and/or disappearance of the menu providing the enhanced multimedia controls 200. For example, the activation control 155 may be a "Menu" button. Selection of the "Menu" button may cause the menu of the enhanced multimedia controls 200 to appear, such as, for example, by appearing to slide out from the active image object, or disappear, such as, for example, by appearing to slide into the active image object. The application 15 may provide access to the enhanced multimedia controls 200 for the active image object while minimizing disturbance to the internet content that may surround the active image object.

One having ordinary skill in the art may recognize other means of displaying the menu of the enhanced multimedia controls in the browser user interface 50. For example, the menu may appear to "pop up" in response to "right-clicking" of the mouse on the active image object by the user 40. The present invention is not limited to a specific embodiment of means of accessing and/or activating the menu of the enhanced multimedia controls 200.

The enhanced multimedia controls 200 may be provided by options displayed in the menu. The user 40 may select and/or may activate one or more of the options to invoke a corresponding one of the enhanced multimedia options of the application 15. As illustrated in FIG. 6, the application 15 may. display the plurality of "Redirect" options that may correspond to the rendering devices 21, 22, 23 in the network 20. The application 15 may limit the plurality of "Redirect" options to only correspond to the rendering devices 21, 22-, 23 which may be capable of rendering the active image object. The user 40 may select and/or may activate one or more of the plurality of "Redirect" options to direct the corresponding rendering device to render the active image object.

For example, in FIG. 6, R1 may represent the first rendering device 21 which may be the living room television, R2 may represent the second rendering device 22 which may be a digital photo frame in the bedroom and/or R3 may represent the third rendering device 23 which may be a personal computer in the den. In this case, the user 40 may select the "Redirect to R2" option to initiate rendering of the active image object on the digital photo frame in the bedroom. The enhanced multimedia controls may have other enhanced multimedia options of the application 15, such as, for example, the enhanced multimedia option "Bookmark," the enhanced multimedia option "Record," the enhanced multimedia option "Properties" and/or the enhanced multimedia option "Manage." The present invention is not limited to a specific embodiment of which enhanced multimedia options may be displayed.

FIG. 7 generally illustrates the browser user interface 50 having the enhanced multimedia controls 200 for an active audio object. The browser interface 50 of the application 15 may display the browser controls 129 and/or the internet content 125. The internet content 125 may have the playback controls 140 and/or a status display 160 corresponding to the active audio object. The active audio object may represent a single digital music file, a set of digital music files, an internet radio channel, a music stream and/or the like. Audio corresponding to the active audio object may be rendered by a local audio device, associated with the application 15, such as, for example, a personal computer sound card, headphones, speakers and/or the like. The user 40 may control rendering of the audio by using the playback controls 140 associated with the active audio object. Thus, the active audio object may be rendered and/or may be controlled using the browser user interface 50 of the application 15.

The application 15 may display the enhanced multimedia controls 200 in association with the active audio object. The enhanced multimedia controls may be displayed as a set of buttons and/or graphic icons located in proximity to the playback controls and/or the status display for the active audio object as illustrated in FIG. 7. The application 15 may present a central set of the enhanced multimedia controls 200 which may apply to any active audio object. For example, the application 15 may display a "drop-down menu" for the audio. The central set of the enhanced multimedia controls 200 may appear within the browser controls 129 and/or may be used to invoke the enhanced multimedia functions of the application 15 for the active audio object which the local audio device may be rendering.

The enhanced multimedia controls 200 may provide and/or may display one or more of the enhanced multimedia option "Redirect" to direct an audio rendering device of the rendering devices 21, 22, 23 in the network 20 to render the active audio object. In the embodiment depicted in FIG. 7, the enhanced multimedia option "Redirect" 165 may be associated with a specific stereo system in the network 20. A graphic icon which may correspond to the enhanced multimedia option "Redirect" 165 may indicate the specific stereo system using a text label, a graphic depiction of the specific stereo system and/or the like. The user 40 may select and/or may activate the enhanced multimedia option "Redirect" 165 to initiate rendering of the active audio object by the specific stereo system.

The central set of the enhanced multimedia controls 200 may provide and/or may display other functions, such as, for example, the enhanced multimedia option "Record" 170 and/or the enhanced multimedia option "Menu" 175. Selection of the enhanced multimedia option "Record" 170 may enable the user 40 to store a portion or an entirety of the audio content corresponding to the active audio object. The portion and/or the entirety of the audio content may be stored as one or more audio files, such as, for example, in the local server of the network 20. For example, the audio file may be stored in the local content source 35.

Selection of the enhanced multimedia option "Menu" 175 may enable the user 40 to access a menu that may have one or more of the additional enhanced multimedia options of the application 15, such as, for example, the enhanced multimedia option "Bookmark," the enhanced multimedia option "Properties," the enhanced multimedia option "Manage," and/or additional "Redirect" options corresponding to additional rendering devices in the network 20. The application 15 may display limited options to enable access to the enhanced multimedia options that may be most commonly used for the active audio object. The enhanced Multimedia option "Menu" may access the additional enhanced multimedia options. The present invention is not limited to a specific embodiment of which enhanced multimedia options may be displayed or an arrangement of the enhanced multimedia options.

If the application 15 directs a target rendering device of the available rendering devices in the network 20 to render the active multimedia object, the application 15 may enable the user 40 to control delivery and/or rendering of the active multimedia object on the target rendering device. For example, the target rendering device may be one or more of the rendering devices 21, 22, 23. The application 15 may present additional playback controls which may enable the user 40 to remotely control the playback of the content on the target rendering device. The additional playback controls may have and/or may be, for example, "Play," "Pause," "Stop," "Rewind," "Fast Forward," "Seek to a specific time," "Volume Up," "Volume Down," "Previous object," "Next object" and/or other playback controls known to one having ordinary skill in the art. In an embodiment, the additional playback controls may be only displayed during rendering of the active multimedia object on the target rendering device.

Alternatively, the application 15 may not display and/or may not provide the additional playback controls. The application 15 may enable the user 40 to control the rendering by the target rendering device using the playback controls 140 which may be used to control rendering of the active multimedia object within the browser user interface 50 of the application 15. The application 15 may continue to display and/or to render the active multimedia object within the browser user interface 50 of the application 15 while substantially simultaneously and/or substantially synchronously rendering the active multimedia object on the target rendering device. For example, the playback controls 140 of the browser user interface 50 may be used to control rendering of the active multimedia object by both the browser user interface 50 and the target rendering device.

During rendering of the active multimedia object on the target rendering device, the user 40 may use the browser user interface 50 of the application 15 to navigate to a different web page from the web page having and/or providing the multimedia content. In an embodiment, the application 15 may terminate the rendering of the active multimedia object on the target rendering device in response to navigation from the web page having and/or providing the active multimedia object. In another embodiment, the application 15 may continue to render the active multimedia object on the target rendering device. The application 15 may display and/or may continue to display the additional playback controls so that the user 40 may continue to control the rendering of the active multimedia object by the target rendering device.

Referring again to FIG. 4, the application 15 may have the RDC component 110. The RDC component 110 may determine the available rendering devices in the network 20, such as, for example, the rendering devices 21, 22, 23. The RDC component 110 may determine the capabilities of the available rendering devices in the network 20 such as, for example, the capabilities of the rendering devices 21, 22, 23. The available rendering devices in the network 20 may transmit messages in the network 20 to communicate availability and/or the capabilities to other devices in the network 20. The RDC component 110 may receive the messages from the available rendering devices. The RDC component 110 may use the network 20 to communicate with the available rendering devices to determine a current status of the available rendering devices and/or to determine additional capability details for the available rendering devices.

The RDC component 110 may create, may maintain and/or may update an internal list of the available rendering devices in the network 20. The internal list may have the capabilities of the available rendering devices. The capabilities of the available rendering devices may have and/or may be, for example, media types, such as, for example, audio, video and/or image; multimedia codecs, such as, for example, AAC Audio codec, H.264 video codec and/or the like; profiles and/or levels associated with the multimedia codecs; transport methods; and/or ORM technologies which may be supported by the available rendering devices. The present invention is not limited to a specific embodiment of the capabilities which may be determined by the RDC component 110. The RDC component 110 may be and/or may act as a UPnP AV Control Point and/or a DLNA Control Point.

In response to user input directing the target rendering device to render the active multimedia object, such as, for example, selection of the enhanced multimedia option "Redirect," the RDC component 110 may communicate with the target rendering device. The RDC component 110 may instruct the target rendering device to request, to retrieve, to process and/or to render the active multimedia object. The RDC component 110 may communicate with the target rendering device to control the rendering of the active multimedia object. For example, the RDC component 110 may control the rendering of the active multimedia object by the target rendering device in accordance with the playback controls which may be selected by the user 40. The RDC component 110 may transmit rendering control instructions to the target rendering device. The rendering control instructions may correspond to the additional playback controls, such as, for example, "Play," "Pause," "Stop," "Rewind," "Fast Forward," "Seek to a specific time," "Volume Up," "Volume Down," "Previous object," "Next object" and/or the other playback controls known to one having ordinary skill in the art.

The application 15 may have the transcoding engine 90 which may transcode, may reformat and/or may repurpose the internet multimedia content for compatibility with one or more of the available rendering devices in the network 20, such as, for example, the rendering devices 21, 22, 23. The transcoding engine 90 may receive instructions from the enhanced multimedia user interface 80 regarding selection of the internet multimedia content to render and/or the target rendering device. The transcoding engine 90 may communicate with the RDC component 110 to determine the capabilities of the target rendering device. The transcoding engine 90 may access the internet multimedia content using the web browser application 60 and/or the multimedia player 70. The transcoding engine 90 may access the internet multimedia content directly using the Internet. The transcoding engine 90 may process the internet multimedia content to prepare the internet multimedia content for delivery to the target rendering device.

The transcoding engine 90 may transcode the internet multimedia content based on the capabilities of the target rendering device. For example, the transcoding engine 90 may transcode the internet multimedia content to produce transcoded internet multimedia content which may conform to media codecs, profiles and/or levels which may be supported by the target rendering device. The transcoding engine 90 may reformat the internet multimedia content. For example, the transcoding engine 90 may reformat the internet multimedia content to produce reformatted internet multimedia content which may have a delivery format appropriate for the target rendering device.

The transcoding engine 90 may examine digital rights management protection (hereafter "the ORM protection"), if any, of the internet multimedia content to determine restrictions for transferring the internet multimedia content to and/or rendering the content on the target rendering device. The transcoding engine 90 may determine that the restrictions may require secure transfer of the internet multimedia content to the target rendering device. The transcoding engine 90 may reformat the internet multimedia content for secure transfer to the target rendering device, and/or the transcoding engine 90 may inform the media server component 100 that the secure transfer may be required. The reformatting for and/or the communication about the secure transfer may reflect a specific method of secure transfer which may be required by the restrictions.

The transcoding engine 90 may determine that the restrictions for the internet multimedia content do not permit transferring the internet multimedia content to and/or rendering the internet multimedia content on the target rendering device. The transcoding engine 90 may not permit transfer of the internet multimedia content to the target rendering device. The application 15 may inform the user 40 that rendering of the internet multimedia content by the target rendering device may not be allowed due to the restrictions.

The application 15 may have the content management component 120 which may enable the user 40 to create, edit, delete, organize, and/or manage bookmarks, playlists, the internet multimedia content recorded by the application 15 and/or other locally stored multimedia content. Functions of the content management component 120 may be accessible using the enhanced multimedia option "Bookmark" and/or the enhanced multimedia option "Manage" as previously described.

The application 15 may have the media server component 100 which may receive transcoded, reformatted and/or repurposed internet multimedia content from the transcoding engine 90. The media server component 100 may be a web server, an RTSP media server, a UPnP AV media server, a DLNA compliant media server and/or any media server known to one having ordinary skill in the art. The present invention is not limited to a specific embodiment of the media server component 100. The media server component 100 may deliver the transcoded, reformatted and/or repurposed internee multimedia content to the target rendering device using the network 20. The media server component 100 may store and/or may buffer a portion and/or an entirety of the transcoded, reformatted and/or repurposed internet multimedia content received from the transcoding engine 90.

The media server component 100 may be visible to and/or may be accessible to rendering devices, other devices, control points- and/or multimedia clients in the network 20. The media server component 100 may identify, may indicate availability of and/or may provide access to the multimedia content identified by the application 15, such as, for example, the internet multimedia content bookmarked by the user 40; the internet multimedia content recorded by the user 40; the internet multimedia content retrieved, browsed and/or consumed by the user 40; the multimedia content files stored in the network 20; and/or the playlists created by the user 40.

The media server component 100 may indicate the availability of the multimedia content based on categories, areas and/or folders which the user 40 may have created using the content management component 120 of the application 15. The media server component 100 may indicate the availability of the multimedia content and/or may provide access to the multimedia content to the rendering devices, the other devices, the control points and/or the multimedia clients in the network 20. For example, the media server component 100 may indicate the availability of the multimedia content and/or may provide the access to the multimedia content regardless of whether the application 15 is being actively used and/or controlled by the user 40 using the browser user interface 50 and/or the enhanced multimedia user interface 80. Thus, the user 40 may discover, may select and/or may access the multimedia content, such as, for example, the internet multimedia content, directly from devices in the network 20.

For example, the user 40 may discover internet multimedia content using the browser user interface 50 of the application 15. The user 40 may bookmark the internet multimedia content using the enhanced multimedia user interface 80 and/or the content management component 120 of the application 15. The media server component 100 of the application 15 may act as a UPnP AV media server to indicate availability of the bookmarked internet multimedia content to UPnP compliant devices in the network 20. At a later time, the user 40 may watch video content on a UPnP AV compliant television in the network 20. The user 40 may access the media server component 100 of the application 15 using a user interface provided by the UPnP AV compliant television. The availability of the bookmarked internet multimedia content may be indicated to the user 40 by the media server component 100, and/or the user 40 may select a specific bookmark to view the associated multimedia content on the UPnP AV compliant television. In response to selection of the specific bookmark, the UPnP AV compliant television may request the associated multimedia content from the media server component 100 of the application. The application 15 may request the associated multimedia content from a content source that provides the multimedia content associated with the bookmark. The application 15 may receive the multimedia content associated with the bookmark from the content source. The transcoding engine 90 may transcode, may reformat and/or may repurpose the multimedia content for compatibility with the UPnP AV compliant television. The application 15 may begin transmitting the transcoded, reformatted and/or repurposed multimedia content to the UPnP AV compliant television for rendering as the transcoding engine 90 transcodes, reformats and/or repurposes the multimedia content.

The media server component 100 may receive request messages from the target rendering device which may request the transcoded, reformatted and/or repurposed internet multimedia content. The request messages from the target rendering device may request specific portions of the transcoded, reformatted and/or repurposed internet multimedia content. The media server component 100 may receive instructions from the transcoding engine 90 and/or from other components of the application 15. The instructions may direct the media server component 100 to transmit the transcoded, reformatted and/or repurposed internet multimedia content. The instructions may direct the media server component 100 to transmit specific portions of the transcoded, reformatted and/or repurposed internet multimedia content. In response to the request messages and/or the 'instructions, the media server component 100 may transmit the transcoded, reformatted and/or repurposed internet multimedia content and/or the specific portions to the target rendering device.

In an embodiment, the application 15 may be a self-contained software application for a personal computer, a laptop personal computer, a POA, a mobile phone and/or another computing device which is capable of running software applications. In another embodiment, the application 15 may be a "plug-in" to an existing web browser. As known to one having ordinary skill in the art, a "plug-in" may be a secondary application that interacts with a host application to provide additional functions to the host application. If the application 1.5 may be a "plug-in," the application 15 may have the enhanced multimedia user interface 80, the transcoding engine 90, the media server component 100, the ROC component 110 and/or the content management component 120. The application 15 may connect to an existing web browser which may support a standard plug-in architecture as known to one having ordinary skill in the art. For example, the application 15 may connect as a "plug-in" to a web browser of Internet Explorer (trademark of Microsoft Corp.), Firefox (trademark of Mozilla Foundation), Opera (trademark of Opera Software ASA Norway), Google Chrome (trademark of Google Inc.) and/or the like.

The multimedia content object, such as, for example, the internet multimedia con tent and/or the multimedia content files stored in the network 20, may have the ORM protection. The ORM protection may make the multimedia content object subject to the restrictions for transfer and/or rendering. The restrictions may vary with the ORM protection and/or with a specific content license which a content provider may have created for the multimedia content. For example, the ORM protection may restrict rendering of the multimedia content object to a specific user and/or to a specific rendering device. The ORM protection may allow unlimited rendering of the multimedia content object, may allow the multimedia content object to be rendered only a limited number of times and/or may allow the multimedia content object to be rendered only during a certain time interval. The ORM protection may allow rendering only on a specific type and/or class of rendering device. The ORM protection may prohibit transmittal to and/or rendering by one or more rendering devices in the network 20. The ORM protection may allow transmittal to and/or rendering by one or more rendering devices in the network 20 but may impose conditions for the transmittal to and/or the rendering by the one or more rendering devices in the network 20. For example, the ORM protection may require a specific type of secure transfer of the content to be used when content is redirected to the target rendering device. The present invention is not limited to a specific embodiment of the ORM protection.

In a first example, the application 15 may encounter internet multimedia content protected by a first ORM protection such that the restrictions allow the user 40 of the application 15 to access, to view and/or to consume the internet multimedia content in a web browser on a specific personal computer. The first ORM protection may allow the user 40 of the application 15 to render the internet multimedia content on an external rendering device if transfer of the internet multimedia content is protected by Digital Transmission Content Protection ("DTCP"). The first ORM protection may define specific compliance rules associated with a DTCP-protected transfer. The user 40 may request the application 15 to render the internet multimedia content on the external rendering device. The application 15 may examine the first ORM protection of the internet multimedia content to determine that the user 40 may be allowed to render the internet multimedia content on the external rendering device. The application 15 may examine the ORM protection for the internet multimedia content to determine that a DTCP-protected export may be required. The application 15 may determine the capabilities of the target rendering device to determine that the target rendering device supports transfer of DTCP-protected content. The application 15 may establish a DTCP-protected channel between the application 15 and the target rendering device which may meet known compliance rules for DTCP-protected export for the first ORM protection. The application 15 may transfer the internet multimedia content to the target rendering device using the OTCP-protected channel.

In a second example, the application 15 may encounter internet multimedia content protected by a second ORM protection. The second ORM protection may prohibit use, display and/or rendering of the internet multimedia content on devices other than personal computers and mobile devices. The application 15 may examine the second ORM protection for the internet multimedia content to determine specific devices and/or device types on which rendering may be allowed. The application 15 may examine a list of the available rendering devices and/or the capabilities of the available rendering devices to determine the available rendering devices for which the second ORM protection may allow rendering of the of the internet multimedia content. For this example, the application 15 may determine that a specific laptop computer and a specific mobile device are the available rendering devices which fulfill the restrictions of the second ORM protection. The application 15 may provide and/or may display "Redirect" options corresponding to the specific laptop computer and the specific mobile device in the enhanced multimedia controls associated with the internet multimedia content. Thus, the application 15 may allow the user 40 to render the internet multimedia content having the second ORM protection to the available rendering devices for which transfer to and/or rendering of the multimedia content object may be allowed under the second ORM protection.

In a third example, the application 15 may encounter internet multimedia content protected by a third ORM protection. The third ORM protection may allow a specific user unlimited rights to render the internet multimedia content on devices owned by the specific user. The third ORM protection may not have rules, restrictions or policies regarding transfer of the internet multimedia content to a location outside of the web browser. Based on the third ORM protection, the application 15 may determine that the internet multimedia content may rendered by the devices owned by the specific user. Based on the list of the available rendering devices and/or the capabilities of the available rendering devices, the application 15 may determine which of the available rendering devices may be capable of rendering the internet multimedia content. The application 15 may provide and/or may display "Redirect" options corresponding to the available rendering devices capable of rendering the internet multimedia content. For example, the application 15 may provide and/or may display the "Redirect" options in the enhanced multimedia controls associated with the internet multimedia content. Thus, the application 15 may allow the user 40 to render the internet multimedia content having the third ORM protection to the available rendering devices for which transfer to and/or rendering of the multimedia content object may be allowed under the third ORM protection. The application 15 may control the rendering to follow the rules, the restrictions and/or the policies associated with the third ORM protection.

In a fourth example, the application 15 may encounter internet multimedia content protected by a fourth ORM protection. The policies of the fourth ORM protection may require the internet multimedia content protected by the fourth ORM protection to be rendered by a specific multimedia player provided by the content provider. Based on the policies of the fourth ORM protection, the application 15 may determine that "Redirect" options are not allowed for the internet multimedia content protected by the fourth ORM protection. The application 15 may not provide and/or may not display the "Redirect" options in the enhanced multimedia controls associated with the internet multimedia content. The application 15 may display a symbol, an icon and/or a notification message in the enhanced multimedia controls to inform the user 40 that the "Redirect" options are not available due to the fourth ORM protection of the internet multimedia content.

The preceding examples generally illustrate how the application 15 may determine which of the available rendering devices in the network 20 may render internet multimedia content based on the ORM protection associated with the internet multimedia content. The application 15 may examine the ORM protection of the internet multimedia content to determine whether the enhanced multimedia option "Record" may be allowed for the internet multimedia content. The application 15 may provide and/or may display the enhanced multimedia option "Record" in the enhanced multimedia controls if the application 15 determines that the ORM protection allows storage of a local copy of the internet multimedia content in the network 20.

The internet multimedia content may be protected by an implicit legal agreement. As known to one having ordinary skill in the art, the legal agreement may be terms of use. The user 40 of the application 15 may implicitly agree to be bound by the terms of use when the user 40 accesses, browses, and/or retrieves the internet multimedia content from a web page. Typically, the terms of use may be accessible to users of the web page and may be a legal agreement readable by the user 40. Thus, the application 15 may not be capable of directly accessing, reading, interpreting and/or applying the terms of use.

An embodiment of the application 15 may encourage the user 40 to read and/or to follow the terms of use. The application 15 may parse and/or may examine the web page and/or the internet multimedia content to identify a displayed link that may provide the terms of use. If the application 15 identifies the terms of use, such as, for example, by identifying the displayed link, the application 15 may provide and/or may display a "Terms of Use" control. For example, the application 15 may display the "Terms of Use" control in the enhanced multimedia controls associated with the internet multimedia content. If the user 40 selects the "Terms of Use" control, the application 15 may display a message that may indicate that the web page and/or the internet multimedia internet content has the terms of use. The message may indicate responsibility of the user 40 to respect the terms of use for rendering and/or recording the internet multimedia content using the enhanced multimedia controls of the application 15.

The application 15 may provide access to the terms (of use so that the user 40 may examine, may read, may understand and/or may follow the terms of use. The application 15 may enable and/or may require the user 40 to indicate that the user 40 has read the terms of use and/or that the user 40 agrees to abide by the terms of use when using the enhanced multimedia controls of the application 15. If the user 40 indicates that the user 40 has read the terms of use and/or that the user 40 agrees to abide by the terms of use, the application 15 may remove the "Terms of Use" control from the enhanced multimedia controls associated with the internet multimedia content. If different internet multimedia content and/or a different web page are accessed, the application may provide and/or may display the "Terms of Use" control. In an embodiment, the application 15 may not allow rendering and/or recording of the internet multimedia content by the user 40 until the user 40 indicates agreement to the terms of use associated with the internet multimedia content. The user 40 may indicate agreement generally, such as, for example, during a first use of the application 15 and/or without regard to the specific web page, and/or may indicate agreement for each unique web page accessed by the user 40.

In an embodiment, the terms of use for the web page and/or the internet multimedia content may be encoded to a machine-readable terms of use protocol which may be accessed by the application 15. The application 15 may restrict presentation and/or use of the enhanced multimedia controls of the application 15 in accordance with the machine-readable terms of use protocol. The machine-readable terms of use protocol may indicate properties and/or restrictions which may be associated with the terms of use for the web page and/or the internet multimedia content. The properties and/or the restrictions may be, for example, whether the internet multimedia content may be stored using the enhanced multimedia option "Record," whether the user 40 may share local copies of the internet multimedia content, whether the internet multimedia content may be transferred to other rendering devices using the "Redirect" option, whether the internet multimedia content may be transcoded for rendering, whether the internet multimedia content may be reformatted for rendering and/or the like. For each of the properties and/or the restrictions, the application 15 may determine if the property and/or the restriction is "Yes," "No," or "Not Indicated."

The machine-readable terms of use protocol may indicate other allowed uses and/or usage restrictions for the internet multimedia content. The other allowed uses and/or usage restrictions may be indicated in the terms of use for the web page. For example, the machine-readable terms of use protocol may indicate specific rendering device types and/or properties restricted for the "Redirect" option. For example, the terms of use for a web page may allow rendering on a television but may limit an allowed display size. The present invention is not limited to a specific embodiment of the terms of use, representation of the terms of use by the application 15 or encoding of the machine-readable terms of use protocol.

Figure 8:
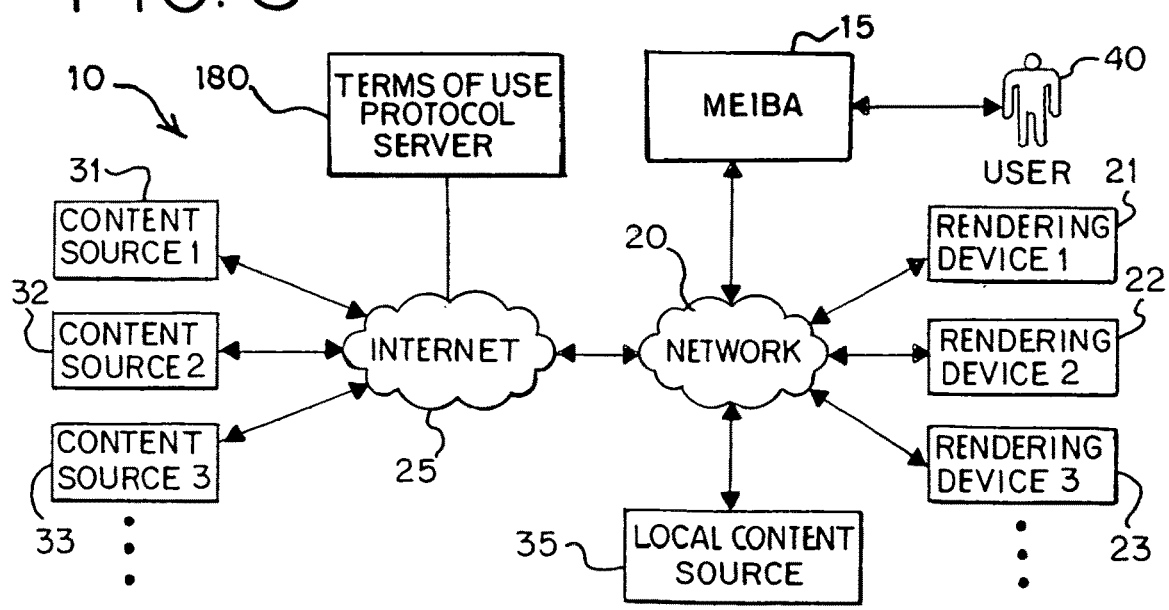
FIG. 8 illustrates a system for managing and/or rendering internet multimedia content in a network in an embodiment of the present invention.

The machine-readable terms of use protocol may be provided by the web page and/or may be delivered to the application 15 with the internet multimedia content associated with the web page. Alternatively, as generally illustrated in FIG. 8, the machine-readable terms of use protocol may be available from a terms of use server 180 which may be accessible by the application 15 using the network 20 and/or the internet 25. The internet content sources 31, 32, 33 may be different sources of the internet multimedia content. Each of the internet content sources 31, 32, 33 may have corresponding terms of use. Each of the internet content sources 31, 32, 33 may use a standard web browser to provide the terms of use which may be the legal agreement readable by the user 40. Each of the content sources 31, 32, 33 may provide different machine-readable terms of use protocols. The machine-readable terms of use protocols may be collected and/or stored on the terms of use server 180. The terms of use server 180 may store a table which may associate the machine-readable terms of use protocols with corresponding web pages.

In an embodiment, one or more of the internet content sources 31, 32, 33 may not provide the machine-readable terms of use protocol. A third party provider may access the web page to obtain the terms of use which may be the legal agreement readable by the user 40. The third party provider may use the terms of use which may be the legal agreement readable by the user 40 to prepare the machine-readable terms of use protocol. The third party provider may transfer the machine-readable terms of use protocol to the terms of use server 180, and/or the third party provider may store the machine-readable terms of use protocol on the terms of use server 180. Thus, the application 15 may access and/or may use the machine-readable terms of use protocols for various web pages which may correspond to the terms of use and/or the legal agreements readable by the user 40.

An embodiment of the application 15 may encounter the internet multimedia content on a web page. The application 15 may contact the terms of use server 180 to determine if the machine-readable terms of use protocol may be available for the web page. The application 15 may retrieve the machine-readable terms of use protocols corresponding to the web page. The application 15 may parse and/or may examine the machine-readable terms of use protocol to ensure that the terms of use for the web page are followed by the application 15. For example, the application 15 may conform presentation, display and/or use of the enhanced multimedia controls to the terms of use.

The application 15 may determine that the machine-readable terms of use protocol may be unavailable for the web page. If the machine-readable terms of use protocol may be unavailable, the application 15 may display the "Terms of Use" control in the enhanced multimedia controls of the application 15. The terms of use server 180 may record failed attempts to retrieve the machine-readable terms of use protocol. An operator of the terms of use server 180 may investigate web pages corresponding to the failed attempts so that the machine-readable terms of use protocols may be obtained, created and/or stored by the terms of use server 180.

Advertising content may be associated with the internet multimedia content. The advertising content may have and/or may be image content, video content, audio content, graphics, animations, video clips, text, web formatting, links to URLs and/or the like. The advertising content may be displayed with and/or in the active video object 130 and/or the active image object 150. For example, the advertising content may be video content displayed in the active video object 130 before display of the internet multimedia content, as known to one having ordinary skill in the art as a "pre-roll" advertisement. As another example, the advertising content may be video content displayed in the active video object 130 at various times during rendering of the internet multimedia content. Thus, the advertising content may interrupt the internet multimedia content for "commercial breaks."

Alternatively, the advertising content may be displayed in the web content 125 which may be located outside of the active video object 130 and/or the active image object 150. For example, the advertising content may be an image and/or a link to an associated URL. The image and/or the link may be displayed in the web content adjacent to the active video object 130. The advertising content and presentation of the advertising content are not limited to the examples presented herein, and the advertising content may be any advertising content known to one having ordinary skill in the art.

The application 15 may detect and/or identify the advertising content. For example, a source of the internet multimedia content, a source of the advertising content and/or a third party may provide machine-readable tags which may identify the advertising content. The machine-readable tags may be delivered as part of the advertising content and/or the internet content 125. Alternatively, the machine-readable tags may be available on a server accessible to the application 15 using the internet 25. The server may provide the machine-readable tags in response to a request from the application 15.

The machine-readable tags may enable the application 15 to distinguish the advertising content from non-advertising portions of the internet multimedia content and/or the internet content 125. Further, the machine-readable tags may indicate requirements for processing, displaying, rendering and/or controlling rendering of the advertising content when the internet multimedia content is transmitted to and/or rendered by one or more of the available rendering devices in the network 20. The machine-readable tags may indicate the requirements for processing and/or recording the advertising content when the internet multimedia content is recorded by the application 15.

The application 15 may ensure that the advertising content is displayed to the user 40 when the internet multimedia content is transmitted to and/or rendered by one or more of the available rendering devices in the network 20. Further, the application 15 may transcode, may reformat and/or may repurpose the advertising content to effectively and/or appropriately display the advertising content on one or more of the available rendering devices in the network 20.

As a first example, the application 15 may identify advertising content having an animated Graphics Interchange Format ("GIF") image displayed in the internet content 125 adjacent to the active video object 130 in the browser user interface 50 of the application 15. If the user 40 transmits the internet multimedia content associated with the active video object 130 to a DLNA-compliant television in the network 20, the application 15 may transcode and/or may reformat the animated GIF image to generate a short video advertisement appropriate for display on the DLNA-compliant television. The application 15 may transmit the short video advertisement to the DLNA-compliant television before transmittal of the internet multimedia content to the DLNA-compliant television. The DLNA-compliant television may render the short video advertisement as a "pre-roll" advertisement before rendering the internet multimedia content. Identification of the advertising content and/or conversion of the advertising content to the short video advertisement may be based on machine-readable tags that may be associated with the advertising content.

As a second example, the application 15 may identify video advertising segments displayed in the active video object 130 in the browser user interface 50 of the application 15. For example, the application 15 may identify video advertising segments. Each of the video advertising segments may have a twelve second duration, for example. The video advertising segments may be displayed as "commercial breaks" at known times T1, T2 and T3 during display of the internet multimedia content in the active video object 130. If the internet multimedia content is transmitted to one or more of the available rendering devices in the network 20, the application 15 may ensure that the video advertising segments are transmitted to and/or rendered by the rendering device in the network 20 at the known times T1, T2 and T3. The application 15 may disable some or all of the playback controls during rendering of the video advertising segments. For example, the application 15 may not allow the user to pause, to fast forward or to seek forward during rendering of the video advertising segments. The application 15 may not allow the user to view, to access and/or to seek to a portion of the internet multimedia content before viewing and/or rendering of a preceding video advertising segment. Identification of the advertising content and/or disabling of the playback controls may be based on machine-readable tags that may be associated with the advertising content.

As a third example, the application 15 may identify advertising content having an advertising image associated with advertising text displayed in the internet content 125 on the same web page as the active video object 130. The user 40 may use the enhanced multimedia controls 200 to select the enhanced multimedia option "Record" for the internet multimedia content associated with the active video object 130. For example, the internet multimedia content may be recorded as a digital multimedia content file stored on the local server. In an embodiment, the application 15 may transcode, may repurpose and/or may reformat the advertising content for inclusion in the digital multimedia file stored on the local server. For example, the digital multimedia file may be a video file which displays the advertising image for the first five seconds, displays the advertising text for the next five seconds, and displays the internet multimedia content for a remainder of the digital multimedia file. Identification of the advertising content and/or inclusion of the advertising content in the digital multimedia file stored on the local server may be based on machine-readable tags associated with the advertising content.

Figure 9:
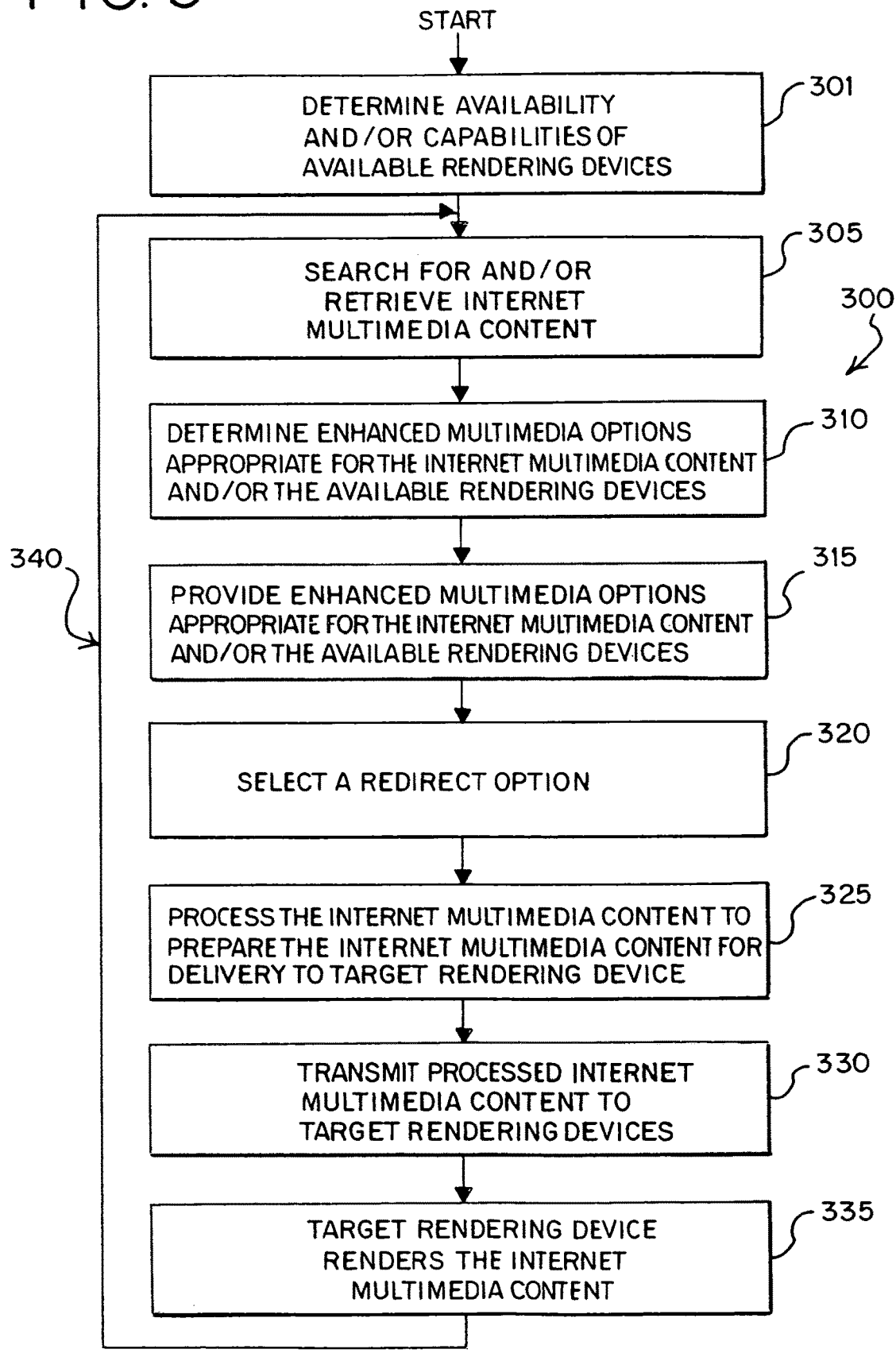
FIG. 9 illustrates a flowchart of a method for managing and/or rendering internet multimedia content in a network in an embodiment of the present invention.

FIG. 9 generally illustrates a flowchart of a method 300 for rendering internet multimedia content and/or locally stored multimedia content in a network in an embodiment of the present invention. As generally shown at step 301, the application 15 may determine availability and/or capabilities of the available rendering devices in the network 20 such as, for example, the rendering devices 21, 22, 23. For example, the RDC component 110 may determine the availability and/or the capabilities of the available rendering devices in the network 20. The application 15 may create, may maintain and/or may update an internal list of the available rendering devices in the network 20. The internal list may have the capabilities of the available rendering devices. For example, the RDC component 110 may create, may maintain and/or may update the internal list.

As generally shown at step 305, the application 15 may enable the user 40 to search for and/or retrieve the internet multimedia content. The application 15 may search for and/or may retrieve the internet multimedia content based on user input provided by input means associated with the device on which the application 15 resides. For example, the browser user interface 50 may accept the user input and/or may retrieve and render the internet multimedia content. The application 15 may retrieve the internet multimedia content from remote servers, such as, for example, the internet content sources 31, 32, 33. For example, the web browser application 60 may retrieve the internet multimedia content from the remote servers. The internet multimedia content may be rendered by the application 15, such as, for example, by the browser user interface 50 and/or the multimedia player 70.

As generally shown at step 310, the application 15 may determine the enhanced multimedia options appropriate for the internet multimedia content and/or the available rendering devices. Determination of the enhanced multimedia options appropriate for the internet multimedia content and/or the available rendering devices may be based on the properties and/or the restrictions of the internet multimedia content and/or the capabilities of the available rendering devices. As generally shown at step 315, the application 15 may provide and/or may display the enhanced multimedia options appropriate for the internet multimedia content and/or the available rendering devices. For example, the enhanced multimedia user interface 80 may display the enhanced multimedia options appropriate for the internet multimedia content and/or the available rendering devices.

As generally shown at step 320, the user 40 may select one of the "Redirect" options. The selected "Redirect" option may correspond to one or more of the available rendering devices, such as, for example, one or more of the rendering devices 21, 22, 23. As generally shown at step 325, the application 15 may process the internet multimedia content to prepare the internet multimedia content for delivery to the target rendering device. For example, the transcoding engine 90 may process the internet multimedia content. The application 15 and/or the transcoding engine 90 may transcode and/or may reformat the internet multimedia content based on the capabilities of the target rendering device.

As generally shown at step 330, the application 15 may transmit the transcoded, reformatted and/or repurposed internet multimedia content to the target rendering device using the network 20. For example, the media server component 100 may receive the transcoded, reformatted and/or repurposed internet multimedia content from the transcoding engine 90. The media server component 100 may transmit the transcoded, reformatted and/or repurposed internet multimedia content to the target rendering device using the network 20. The media server component 100 may store and/or may buffer a portion and/or an entirety of the transcoded, reformatted and/or repurposed internet multimedia content received from the transcoding engine 90.

As generally shown at step 335, the target rendering device may render the internet multimedia content. For example, the target rendering device may render the transcoded, reformatted and/or repurposed internet multimedia content received from the media server component 100. The application 15 may enable the user 40 to control the rendering by the target rendering device. The application 15 may discontinue rendering of the internet multimedia content within the browser user interface 50. Alternatively, the application 15 may continue to render the internet multimedia content within the browser user interface 50 in approximate synchronization with rendering of the active content object by the target rendering device.

As generally shown at step 340, the application 15 may enable the user 40 to search for and/or retrieve different internet multimedia content. In an embodiment, the application 15 may terminate the rendering of the internet multimedia content on the target rendering device in response to navigation from the web page having and/or providing the internet multimedia content. In another embodiment, the application 15 may continue to render the internet multimedia content on the target rendering device. The application 15 may display and/or may continue to display rendering controls so that the user 40 may continue to control the rendering of the internet multimedia content by the target rendering device.

Figure 10:
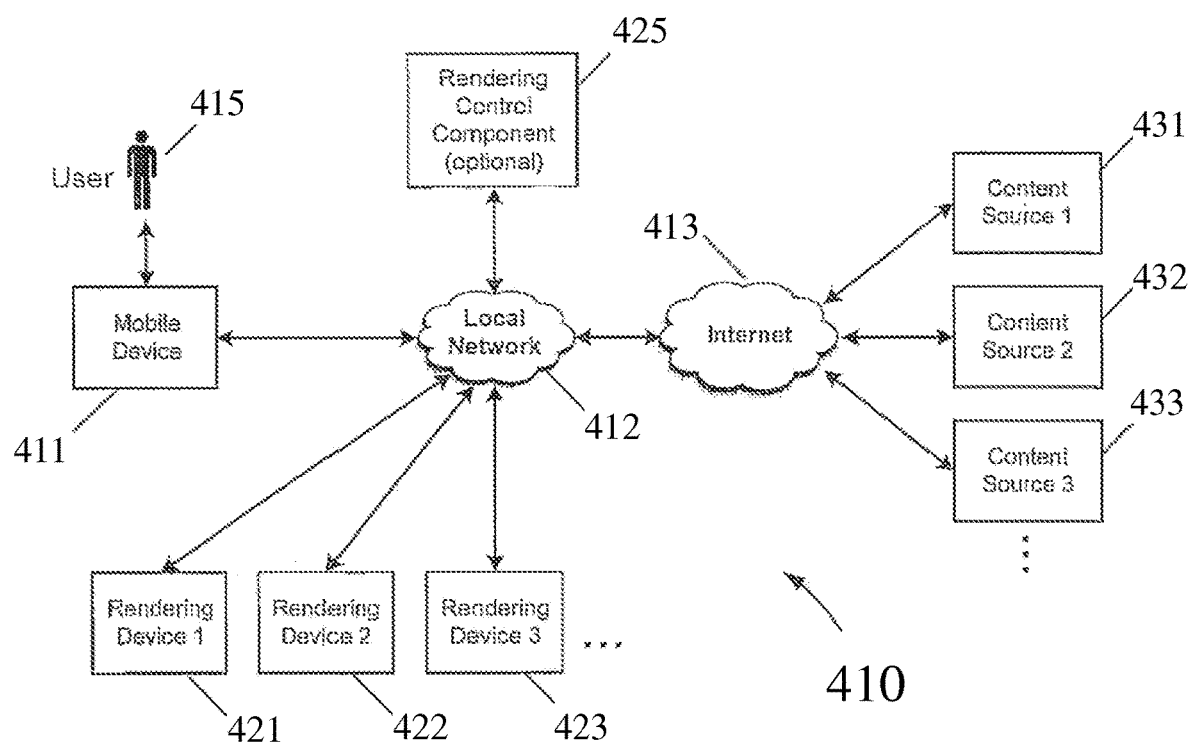
FIGS. 10-13 and 15 illustrate black box diagrams of systems for using an application on a mobile device to transfer internet media content to a rendering device in a home network in embodiments of the present invention.

Referring now to FIG. 10, a network configuration 410 in which an embodiment of the present invention may operate is generally illustrated. The network configuration 410 may have a mobile device 411 connected to a local network 412 which may have one or more rendering devices. For example, the local network 412 may have a first rendering device 421, a second rendering device 422, and/or a third rendering device 423 (collectively hereafter "the rendering devices 421, 422, 423"). The present invention is not limited to a specific number of rendering devices, and the local network 412 may have any number of rendering devices.

The local network 412 may be, for example, a local area network, a home network, an office network, and/or the like. The local network 412 may be based on one or more network technologies such as IEEE 802.11 ("WiFi"), Ethernet, Firewire (trademark of Apple Inc.), Multimedia over Coax ("MoCa"), Bluetooth, and/or the like. The local network 412 is not limited to these examples, and the local network 412 may incorporate any network connection technology known to one skilled in the art. The local network 412 may incorporate various connection technologies using wires, routers, network adapter devices, antennas and/or the like.

The local network 412 may be connected to and/or may be in communication with the internet 413 and/or a similar wide area network which provides access to content sources. For example, the local network 412 may use a cable modem, a DSL modem, a home networking router, and/or a similar device which provides an internet connection. The present invention is not limited to a specific technique for connecting the local network 412 to the internet 413, and the local network 412 may be connected to the internet 413 using any means known to one skilled in the art.

The mobile device 411 may be a mobile phone, a smartphone, a personal digital assistant, a laptop PC, a tablet device, a portable gaming device, a portable media player, and/or the like. The mobile device 411 may be a general purpose computing device with capability to execute applications. The mobile device 411 may have pre-installed applications. Further, the mobile device 411 may enable a user 415 of the mobile device 411 to download and/or install applications which may be subsequently accessed and used on the mobile device 411. The mobile device 411 may have web browsing capabilities, media playback capabilities, networking capabilities, and/or the like.

As previously set forth, the local network 412 may have and/or may be connected to one or more rendering devices, such as, for example, the rendering devices 421, 422, 423. Each of the one or more rendering devices may be a networked television device, a networked stereo device, a digital photo frame device, a desktop PC, a laptop PC, another mobile device, a gaming console, and/or the like. One or more of the rendering devices may be compatible with multimedia networking standards, such as, for example, UPnP AV and/or OLNA. The one or more rendering devices may have rendering capabilities; for example, the one or more rendering devices may be capable of rendering multimedia content of a particular format, multimedia content encoded using particular codecs, multimedia content encoded using a particular set of properties, multimedia content encoded using particular profiles and/or levels, multimedia content protected by a particular ORM technology, multimedia content transported using a particular streaming format, and/or the like.

The rendering devices may be capable of advertising and/or communicating the rendering capabilities to other devices. For example, the rendering devices may communicate the rendering capabilities based on UPnP discovery and device description processes and/or based on other techniques, such as exchange of an SOP session description. The present invention is not limited to these example techniques, and the rendering devices may communicate the rendering capabilities using any technique known to one skilled in the art.

The user 415 may use the mobile device 411 to browse the web, to view and interact with web pages, and to access and play back internet multimedia content discovered using the web pages. The mobile device 411 may request and/or may retrieve web content from one or more content sources available through the internet 413. For example, the mobile device 411 may use the internet 413 to request and/or retrieve web content from a first content source 431, a second content source 432 and/or a third content source 433 (collectively hereafter "the content sources 431, 432, 433"). The present invention is not limited to a specific number of content sources, and the mobile device 411 may use the internet 413 to request and/or retrieve web content from any number of content sources.

The mobile device 411 may display the web content as one or more web pages to the user 415. The user 415 may interact with the web pages to search for, discover and/or select internet multimedia content. The mobile device 411 may play back internet multimedia content selected from the web pages by the user 415. Further, the mobile device 411 may present enhanced multimedia functions, such as, for example, transferring the selected internet multimedia content to one of the rendering devices in the local network 412, and/or adding the selected internet multimedia content to a playback queue. For example, the mobile device 411 may transfer the selected internet multimedia content to one of the rendering devices 421, 422, 423.

The content sources, such as, for example, the content sources 431, 432, 433, may provide various types of internet content. For example, the content sources may provide web content, web pages, search results, text, web formatting, images, graphics, style sheets, URLs, digital audio files, digital audio streams, digital video files, digital video streams, scripting code, embedded media players, and/or the like. The scripting code may be, for example, JavaScript (trademark of Oracle America, Inc.), ECMAScript, Flash (trademark of Adobe Systems Inc.) and/or the like. Each of the content sources may be, for example, a web server, a media server, a search engine, a content service, a media sharing site, a social networking site, a news site, a sports site, and/or the like. One or more of the content sources may be multiple independent servers; for example, a content source may be a server farm with well-known properties, such as load balancing and failover.

A single web page may reference and/or may embed elements from various servers and/or content sources. Thus, retrieval and/or display of a single web page may require that the mobile device 411 requests and/or retrieves elements from multiple different web servers, media servers and/or content sources. Therefore, actions for requesting and/or retrieving a web page, as discussed in more detail hereafter, have all necessary requests and retrievals required to obtain the various elements necessary to construct and/or to render the web page.

The local network 412 may have and/or may be connected to a rendering control component 425 which may be external to the mobile device 411. If available, the rendering control component 425 may provide various rendering control functions to other devices in the local network 412. For example, the rendering control component 425 may provide standard UPnP AV and/or DLNA functions, such as device discovery, capability exchange, and/or control point functions. The rendering control component 425 may instruct a rendering device in the local network 412, such as one of the rendering devices 421, 422, 423, to request, retrieve, and/or render media content. The rendering control component 425 may control how a rendering device in the local network 412 renders the media content. For example, the rendering control component 425 may raise or lower the playback volume. Further, the rendering control component 425 may move playback forward or backward in a media object and/or in a playlist of media objects. The rendering control component 425 may provide queued playback to a rendering device in the local network 412. For example, the rendering control component 425 may internally maintain a queue state which tracks media objects which the rendering control component 425 is directing a rendering device to play back in sequence.

The rendering control component 425 may provide an interface by which another device, such as the mobile device 411, may access, invoke, and/or control the various rendering control functions provided by the rendering control component 425. In an embodiment, the rendering control component 425 may be the "Control Element 100" of U.S. Patent Application Pub. No. 2010/0095332, herein incorporated by reference in its entirety. The present invention is not limited to a specific embodiment of the rendering control component 425, and the rendering control component 425 may be any known component for providing rendering control functions to other devices in the local network 412.

The rendering control component 425 may have additional functionality. For example, the rendering control component 425 may have a media server element capable of proxying internet media content and/or making proxied internet media content available to a rendering device in the local network 412. The media server element may support well-known server protocols; for example, the media server element it may be a UPnP AV compliant media server. The rendering control component 425 may have a media transcoder element capable of transcoding the internet media content for compatibility with the rendering capabilities of a rendering device.

In an embodiment, the mobile device 411 may utilize the rendering control component 425 to transcode and/or to proxy the internet media content before the internet media content is transferred to a rendering device in the local network 412. In another embodiment, the mobile device 411 may transcode and/or may proxy the internet media content, and, as a result, the mobile device 411 may provide such functions without relying on the rendering control component 425.

Figure 11:
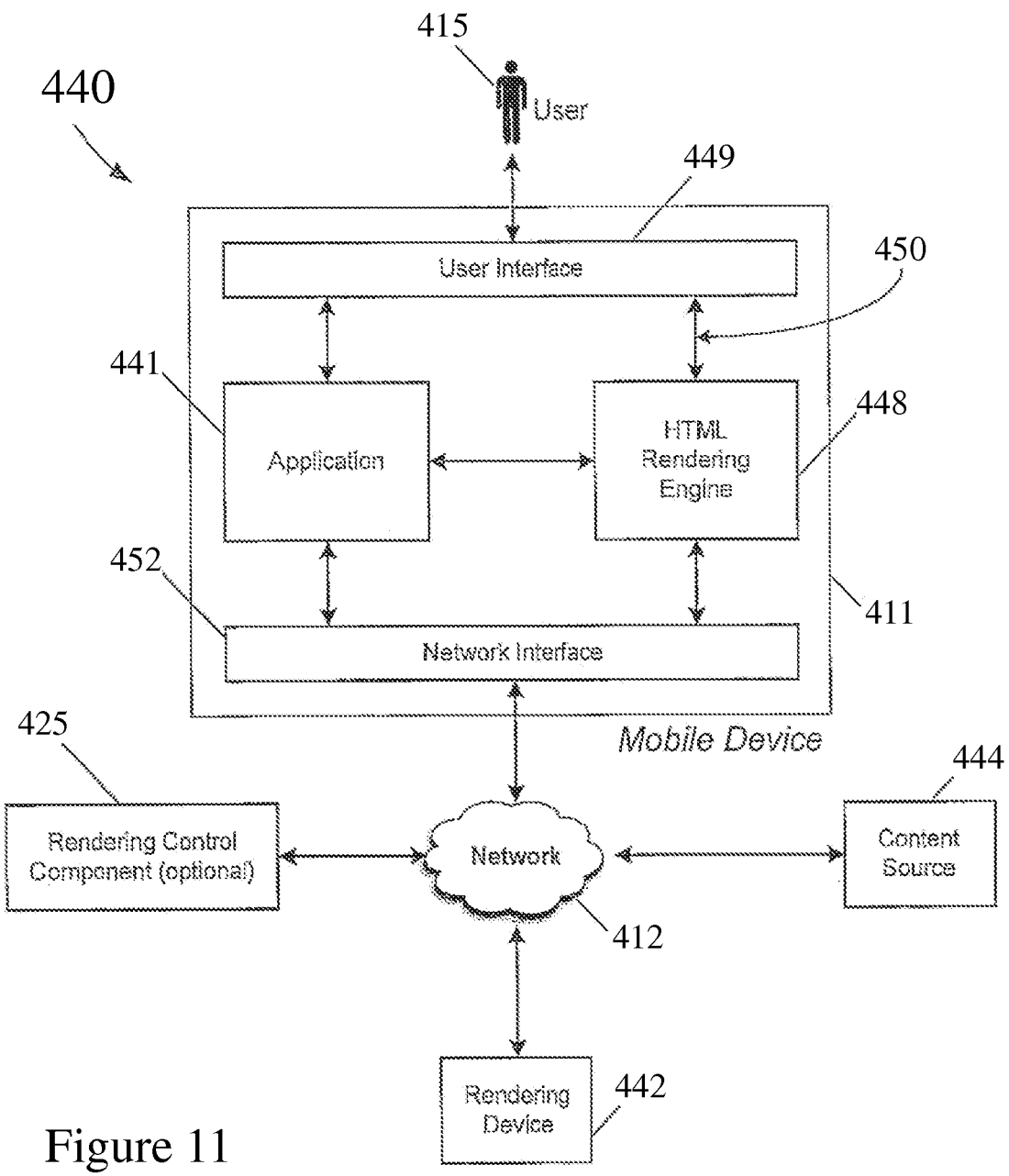

FIG. 11 generally illustrates a system 440 for using an application 441 executed by the mobile device 411 to transfer internet media content to a rendering device 442 in the local network 412. In an embodiment, the local network 412 may be a home network. The rendering device 442 may be, for example, one of the rendering devices 421, 422, 423. The application 441 may use a HTML rendering engine 448 to present enhanced media functions to the user 415 of the mobile device 411. In an embodiment, the HTML rendering engine 448 may be a separate element provided by the mobile device 411 relative to the application 441. For example, the HTML rendering engine 448 may be provided by the operating system of the mobile device 411. The enhanced media functions may enable the user 415 to initiate transfer of selected internet media content to the rendering device 442 in the local network 412, to control the rendering of the internet media content, to add the internet media content to a playback queue, and/or the like.

The application 441 may be pre-installed on the mobile device. For example, the application 441 may be installed on the mobile device 411 before the mobile device 411 is purchased by the user 415. Alternatively, the application 441 may be installed at the direction of the user 415. For example, the application 441 may be downloaded from an application store at the direction of the user 415. The application 441 may be provided by a non-transitory computer-readable medium, such as register memory, processor cache and Random Access Memory (RAM), which may have program instructions executed by the mobile device.

The user 415 may interact with the application 441 and/or the HTML rendering engine 448 through one or more user interface components of the mobile device 411, such as a user interface 449 of the mobile device 411. In an embodiment, the application 441 may be used for web browsing instead of the default web browser of the mobile device 411. As discussed in more detail hereafter, the user interface 449 may be the user interface facilities provided by the operating system of the mobile device 411.

The HTML rendering engine 448 may be capable of rendering web content. For example, the HTML rendering engine 448 may process web content to create a rendered web page. Then, the rendered web page may be displayed to the user 415 of the mobile device 411.

The HTML rendering engine 448 may have additional functionality related to the rendering of web content. For example, the HTML rendering engine 448 may retrieve the web content corresponding to a web page from one or more web servers, media servers, and/or content sources. For example, the HTML rendering engine 448 may retrieve the web content corresponding to a web page from a content source 444, and the content source 444 may be one of the content sources 431, 432, 433. The HTML rendering engine 448 may construct, may maintain and/or may provide access to a structured representation of the web page and elements related to the web page. For example, the HTML rendering engine 448 may support a Document Object Model ("DOM") as known to one skilled in the art. As a result, the HTML rendering engine 448 may enable the application 441 to use the DOM to access the web page and/or elements related to the web page. As another example, the HTML rendering engine 448 may have one or more scripting engines. As a result, the HTML rendering engine 448 may execute scripting code, such as Javascript, ECMAscript, Flash and/or the like. The scripting code may be included in the web page as originally retrieved from a content source. Alternatively, the scripting code may be added to the web page by the application 441 an/or may be directly communicated to the HTML rendering engine 448 by the application 441.

The HTML rendering engine 448 may provide a rendered web page for display on the mobile device 411. The rendered web page may be displayed within a larger application user interface created and/or maintained by the application 441, and the application user interface may be displayed in the user interface 449 of the mobile device 411. Various communication models known to one skilled in the art may support display of the rendered web page within a larger application user interface. As a first example, the application 441 may designate a portion of a screen area for use by the HTML rendering engine 448, and subsequently the HTML rendering engine 448 may be responsible for rendering the rendered web page in the designated portion of the screen area as needed. The HTML rendering engine 448 may communicate directly with the user interface 449 of the mobile device 411 to display the rendered web page.

As a second example, the application 441 may request the rendered web page directly from the HTML rendering engine 448 as needed, and the application 441 may subsequently create and/or maintain an application user interface which provides the rendered web page. In a preferred embodiment, the user interface 449 of the mobile device 411 may provide the application user interface. The present invention is not limited to a specific means for displaying the rendered web page to the user 415 of the mobile device 411. The division of responsibility for displaying the application user interface and/or the data flow by which the rendered web page is displayed may depend on the user interface facilities available from the operating system of the mobile device 411.

The HTML rendering engine 448 may support user interaction. For example, the HTML rendering engine 448 may detect user selection of a particular control, icon, button and/or link within the web page. As a result, the HTML rendering engine 448 may communicate to the application 441 that the user 415 selected the control, the icon, the button and/or the link. Alternatively or additionally, the HTML rendering engine 448 may detect lower level user interaction events. For example, the HTML rendering engine 448 may detect that the user 415 pressed a physical button on the mobile device 411, moved a pointing device, touched a particular location and/or area of a touchscreen display, rotated the mobile device 411 from one display orientation to another, and/or the like. As a result, the HTML rendering engine 448 may communicate such lower level user interaction events to the application 441.

The HTML rendering engine 448 may support additional browsing functions. For example, the HTML rendering engine 448 may maintain a browsing history to enable the user 415 and/or the application 441 to access history functions, such as a "Go Back" function to return to the previous web page and/or a "Go Forward" function to move to the next web page in the browsing history. The HTML rendering engine 448 may support functions to add the current web page to a favorites list. The HTML rendering engine 448 may support in-page navigation techniques, such as panning, vertical scrolling, zooming the page view in and out, and/or the like. The HTML rendering engine 448 may support standard browsing interaction techniques, such as tables, text boxes, and/or form submission.

The HTML rendering engine 448 may support, may facilitate and/or may enable playback on the mobile device 411 of internet media content selected from a web page by the user 415. The HTML rendering engine 448 may access a default media player and/or another media playback resource to support the playback of the selected internet media content. The HTML rendering engine 448 may be provided by the operating system of the mobile device 411. Alternatively, the HTML rendering engine 448 may be provided by another component of the mobile device 411 and/or may be accessible to the application 441. For example, the HTML rendering engine 448 may provide one or more classes, function calls, application programming interfaces ("APIs"), libraries and/or the like by which the application 441 may access the functionality of the HTML rendering engine 448.

The HTML rendering engine 448 may be any collection of one or more components, services, classes, libraries and/or APIs which provide the functionality described herein for the HTML rendering engine 448. The present invention does not require that a single component, service, class, library or API implements all of the functionality of the HTML rendering engine 448. For example, the operating system of the mobile device 411 may have one service which renders web content and may have a different service which handles user interaction for the displayed web content, and each of the two services may be a portion of the HTML rendering engine 448.

The operating system of the mobile device 411 may have a collection of classes, functions, API's, libraries, services and/or the like for displaying the user interface 449 of the mobile device 411 and/or for enabling the user 415 to interact with the user interface 449. The application 441 may communicate with the user interface 449 to display the application user interface. For example, the application 441 may display text, graphics, controls and/or the like which are not part of the rendered web page. As previously set forth, the application 441 may be responsible for obtaining the rendered web page from the HTML rendering engine 448 and/or communicating the rendered view to the user interface 449 for display to the user 415. Alternatively, the HTML rendering engine 448 may directly communicate the rendered web page to the user interface 449 through a communication connection 450 as shown FIG. 11. Examples of the user interface 449 in embodiments of the present invention are detailed in FIGS. 16 and 17.

Referring again to FIG. 11, the application 441 may communicate with the HTML rendering engine 448 to request the retrieval of a new web page, analyze web content for the current web page, modify the web content of the current web page, receive user interaction signals, and/or the like. Specific examples of such communication are provided in subsequent figures.

The mobile device 411 may have a network interface 452. The application 441 and/or the HTML rendering engine 448 may use the network interface 452 to communicate with the local network 412 and/or the internet 413. The application 441 and/or the HTML rendering engine 448 may communicate with one or more content sources through the network, such as, for example, the content sources 421, 422, 423. For example, the application 441 and/or the HTML rendering engine 448 may request web content from a content source, and the content source may respond by transmitting the web content to the application 441 and/or the HTML rendering engine 448 through the local network 412 and/or the internet 413.

The application 441 may use the network interface 452 and/or the local network 412 to communicate with the rendering control component 425 and/or the rendering device 442, such as one of the rendering devices 421, 422, 423. For example, the application 441 may instruct the rendering control component 425 to initiate rendering of media content on the rendering device 442. As another example, the application 441 may instruct the rendering control component 425 to add media content to a playback queue maintained by the rendering control component 425. As yet another example, the application 441 may directly instruct the rendering device 442 to initiate rendering of media content and/or may directly communicate with the rendering device 442 to control the rendering of media content.

Figure 12:
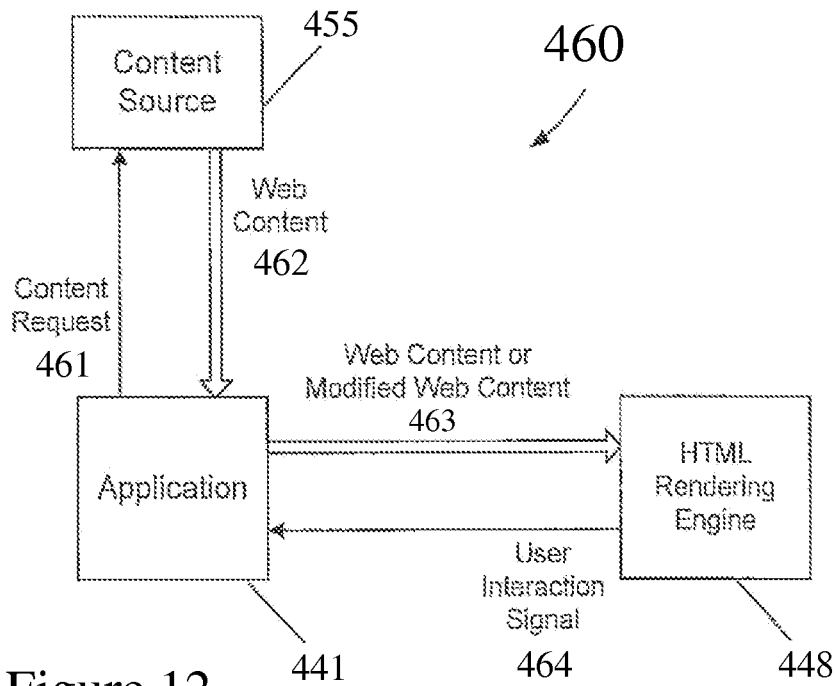

FIG. 12 generally illustrates a system 460 for using the application 441 to retrieve, analyze and/or modify web content for the purpose of transferring internet media content to a rendering device in an embodiment of the present invention. The system 460 may use the structure and connections previously described for FIG. 11.

Referring again to FIG. 12, the application 441 may use a content request transmission 461 to send a content request to a content source 455. The content source 455 may be, for example, one of the content sources 431, 432, 433 and the content source 444. In response, the application 441 may receive a web content transmission 462 from the content source 455. The web content transmission 462 may provide the web content requested by the application 441. In this way, the application 441 may send one or more content requests to one or more content sources to obtain the web content corresponding to a web page.

Each content request may be an HTTP GET request or a similar request as known to one skilled in the art. Each content request may have a requester identification field which may identify the mobile device 411, the web browser, the software client, and/or the application sending the content request. For example, the content request may identify the mobile device 411 and/or the application 441. In an embodiment, the requester identification field may be a "user-agent" field. The content source 455 may adapt the web content based on the requester identification field. For example, the content source 455 may format a web page differently depending on whether the requester identification field indicates a mobile device web browser targeting a small screen on a mobile device, or a PC web browser targeting a high resolution computer monitor. Therefore, the application 441 may use a requester identification field associated with the mobile device 411 and/or a mobile device web browser to obtain a version of the web content suitable for display on the mobile device 411.

The application 441 may analyze the web content to identify media controls for accessing internet media content. The media controls may enable the user 415 to select, access, retrieve and/or play back the internet media content using a standard web browser. For example, the application 441 may search the web content for HTML "<a>" tags which link to media content files available from an internet content source. As another example, the application 441 may search the web content for scripting code which is capable of accessing media content from an internet content source. The application 441 may identify the media controls which may be links, active thumbnail images, icons, buttons, regions of the displayed web page, scripting code segments, and/or the like.

The application 441 may modify the web content to insert additional media controls. The additional media controls may be provided using links, graphic images, icons, buttons, scripting code, and/or the like. The application 441 may insert the additional media controls in proximity to corresponding media controls identified during the web content analysis described above. Moreover, the application 441 may create and/or may insert the additional media controls so that the additional media controls are displayed in proximity to the corresponding media controls when the web page is displayed by the HTML rendering engine 448.

For example, the application 441 may analyze the web content to detect a first media control for accessing first internet media content. The first media control may enable the user 415 to play back the first internet media content in the web browser and/or using a media player helper application selected by the web browser. After detecting the first media control, the application 441 may modify the web content to insert a first additional media control and/or a second additional media control for display in proximity to the first media control. For example, the first additional media control may correspond to transferring the internet media content to an external rendering device, and/or the second external media control may correspond to adding the internet media content to a playback queue. The first additional media control and/or the second additional media control may have, may include and/or may correspond to a link which the user 415 may invoke in the web page rendered from the web content, and the link may reference a URL created by and/or known to the application 441. Alternatively, the first additional media control and/or the second additional media control may correspond to scripting code which may respond to user input in the web page rendered from the web content. For example, the scripting code may interact with the application using a function call, a class instance, an API, and/or a similar mechanism in response to user input in the web page rendered from the web content.

These steps for analyzing and modifying the web content may utilize information about organizational and/or formatting properties of a content site and/or a search engine. For example, a content site may provide access to a library of video content and may have a particular way of organizing, formatting and/or presenting search results in order to present active links to the video content relevant to the search. For example, a specific content site may provide web pages with twenty video results per page, and the controls for accessing the individual video contents may be JPEG thumbnail images which are active links pointing to HTTP URLs with a .flv (Flash Video File) extension. The application 441 may use this information when analyzing web content retrieved from the specific content site. As a result, the application 441 may identify the various JPEG thumbnail images which form the media controls for accessing internet video content from the specific content site.

Moreover, the application 441 may have information regarding how to optimally insert additional media controls into the web content provided by a specific content site. The information may be, for example, a graphical style for the additional media controls, an absolute or relative location for placement of the additional media controls, a parameter for sizing the additional media controls, a list of the additional media controls relevant to the specific content site, and/or a rule for determining the location to place the additional media controls within web content, such as HTML code and/or scripting code. The information may enable the application 441 to insert the additional media controls with minimal impact to the graphical layout and appearance of the resulting web page. The information may be programmed into the application 441 and/or may be retrieved by the application 441 from a database of information corresponding to specific content sites. Thus, the information corresponding to popular internet content sites may be maintained in the database and/or may be updated based on changes to the organizational and/or formatting properties of the specific content sites. The database may be accessible to the application 441 through the local network 412 and/or the internet 413.

For the specific content site of the preceding example, the application 441 may identify the HTML <a> tag which contains the JPEG thumbnail image for accessing a particular internet video content stream. The application 441 may have information for the particular content site, and the information may have a predetermined rule for inserting two additional HTML <a> tags which reference and display graphic button images corresponding to the first additional media control and/or the second additional media control. The application 441 may process the web content corresponding to the complete search result page in a similar manner. As a result, the application 441 may identify each of the twenty JPEG thumbnail images present in the web content of the search result page from the particular content site. Then, the application 441 may modify the web content by inserting forty additional HTML <a> tags representing the additional media controls, namely the graphic button images which expose enhanced media functionality provided by the application 441.

The application 441 may access a database which may have scripting code fragments. Each of the scripting code fragments may correspond to a content source. In an embodiment, each of the scripting code fragments may analyze web content provided by the corresponding content source to identify media controls for accessing internet media content available from the content source. The application 441 may query the database for scripting code fragments corresponding to a particular content source and may retrieve one or more scripting code fragments from the database to analyze web content from the particular content source. In an embodiment, the database may have scripting code fragments which modify web content provided by the content source to insert additional media controls. The application 441 may retrieve one or more scripting code fragments from the database to insert media controls into the web content from a particular content source. In an embodiment, the database may be accessible to the application using the internet 413.

The application 441 may not have information regarding the organizational properties and/or the formatting properties of a particular content site. For example, the information may be missing from a database built into the application 441 and/or a remote information database accessible to the application 441. In this case, the application 441 may have default logic for analyzing the web content to identify the media controls for accessing internet media content and/or for modifying the web content to insert the additional media controls. For example, the application 441 may search the web content for structures commonly used to access internet media content. Such structures may be HTML <a> tags which link to objects which have a MIME type or a file extension associated with internet media content. Further, such structures may be embedded scripting code which matches code known to access internet media content. The application 441 may have a default approach to inserting the additional media controls in web content from content sites for which the application has no information. For example, the application 441 may have default button images which correspond to the additional media controls and/or which may be inserted into the web content in proximity to the identified media controls.

In an embodiment, the application 441 may access, may examine and/or may analyze a description of the web page to identify the media controls for accessing internet media content. The description of the web page may have a page source which may include a markup source, links, scripts and/or active objects. The markup source may include, for example, HTML, xHTML, XML and/or the like. The links may be, for example, URLs which may reference additional markup source, scripts, active objects and/or media content. The scripts and/or the active objects may include, for example, JavaScript, ECMAScript, VB Script, Flash ActionScript, and/or code written in other scripting languages which may be executed during interaction with and/or rendering of the web page. Alternatively, the description of the web page may be an internal representation of a previously retrieved and/or parsed web page. For example, the description of the web page may be a Document Object Model ("DOM") representation of a web page accessed using a standard API provided by a web browser as known to one having ordinary skill in the art. The DOM representation may enable the application 441 to access the structure, the content, the links, the scripts and/or the active objects of the web page. The present invention is not limited to a specific embodiment of the description of the web page, and the present invention may utilize any description of the web page known to one having ordinary skill in the art.

The identification of the media controls for accessing internet media content may utilize a set of known media types, file types, file extensions and/or MIME types relevant to media content to identify the internet media content.

Relevant image file types may be, for example, bitmap files, JPEG files, TIFF files, PNG files, SVG files and/or the like. Relevant audio file types may be, for example, MP3 files, AAC audio files, Windows Media Audio files, FLAG files, Ogg audio files and/or the like. Relevant video types may be, for example, Flash Video files, MP4 files, 3GPP media files, 3GPP2 media files, Windows Media Video files, AVI files, ASF files, QuickTime files, Ogg video files and/or the like. The identification of the web content is not limited to file detection, and streaming representations of the various media types may be detected. For example, "rtsp" links that direct to streams representing audio content and/or video content may be identified.

The relevant media types may be detected using known file extensions. For example, JPEG image files typically have a ".jpg" extension, MP3 audio files typically have a ".mp3" extension, and QuickTime files typically have a ".mov" extension. Alternatively, the relevant media types may be detected using known MIME type associations as defined by the Internet Assigned Numbers Authority (IANA). For example, JPEG image files may be associated with a "image/jpeg" description, MP3 audio files may be associated with an "audio/mpeg" description, and MP4 video files may be associated with a "video/mp4" description. Therefore, the application 441 may analyze the description of the web page for web content, links and/or references which have the known media types, file types, file extensions and/or MIME types associated with the web content.

In an embodiment, protocol exchanges with a remote web server and/or media server may be observed, may be initiated and/or may be analyzed. The protocol exchanges may be observed, may be initiated and/or may be analyzed to recognize the media types, the file types, the file extensions and/or the MIME types. For example, the MIME type associated with media content may be returned in response to a HTTP GET message requesting the media content. Thus, header information in an HTTP GET protocol exchange may be analyzed to determine whether the MIME type of the media content sent in response corresponds to a known media type.

In an embodiment, a portion of a media content object of the web page may be requested using a link and/or a reference to the media content object identified using the description of the web page. Analysis of the portion of the object may be used to determine whether to identify the media content object as a whole as internet media content. For example, most media content types have up-front identifiers, known to one having ordinary skill in the art as "Magic Numbers," placed at and/or near the front of the media content file. The up-front identifiers may be sufficient to identify the object as a media content file. For example, a Flash video file may begin with an up-front identifier of an ASCII representation of "FLV." As a further example, leading portions of an MP4 or 3GPP file may have an up-front identifier of an "ftyp" atom having recognizable brands represented in ASCII form as "3gp4," "3gp5," "isom," "mp41" and/or other brands. The definition of the recognizable brands may be found in standard specifications from ISO/IEC, 3GPP and/or other standards organizations, and such brands are known to one having ordinary skill in the art. Thus, the identification of the media controls for accessing internet media content may involve requesting a portion of a media content object to enable the portion of the media content object to be parsed and/or analyzed to determine whether up-front identifiers and/or other identifying information are present.

The identification of the media controls for accessing internet media content may use media publication and/or syndication standards, such as, for example, RSS, to detect the media controls. For example, if the web page has and/or references an RSS feed, the identification of the media controls for accessing internet media content may involve analysis of the RSS feed to detect the internet media content in the RSS feed. The present invention may make use of one or more of the methods disclosed herein for identifying the media controls for accessing internet media content; however, the present invention is not limited to these methods and may employ other methods for identifying the media controls for accessing internet media content known to one having ordinary skill in the art.

The application 441 may provide the web content and/or the modified web content to the HTML rendering engine 448 in a web content and/or modified web content transmission 463. In an embodiment, the application 441 modifies the web content to insert the additional media controls; in another embodiment, the application 441 does not modify the web content to insert the additional media controls. The HTML rendering engine 448 may use the web content and/or the modified web content received in the web content and/or modified web content transmission 463 to create a rendered web page which may be displayed to the user 415 of the mobile device 411. If the application 441 modified the web content, the rendered web page may have the additional media controls.

The user 415 may interact with the rendered web page. For example, the user 415 may select, may point at, may touch, may invoke, and/or may click on one of the media controls or the additional media controls. In response, the HTML Rendering Engine 448 may generate a user interaction signal 464 and/or may communicate the user interaction signal 464 to the application 441. The user interaction signal 464 may indicate that the user 415 selected, pointed at, touched, invoked, and/or clicked on an object, image, button and/or link in the rendered web page. The user interaction signal 464 may identify the object, the image, the button and/or the link. The user interaction signal 464 may identify and/or may provide a URL corresponding to the object, the image, the button and/or the link. The application 441 may use the user interaction signal 464 and/or the URL to determine that the user 415 invoked one of the media controls previously identified by the application 441 and/or that the user 415 invoked one of the additional media controls inserted by the application 441.

Alternatively, the user interaction signal 464 may convey a lower level user interaction event. For example, the user interaction signal 464 may indicate that the user 415 selected, pointed at, touched and/or clicked on a particular location within the rendered web page. In this case, the application 441 may compare the particular location to the known locations of the media controls previously identified by the application 441 and/or the additional media controls inserted by the application 441. As a result, the application 441 may use the user interaction signal 464 to determine the particular control invoked by the user 415.

Still further, the user interaction signal 464 may cause a portion of the application 441 to execute. For example, one of the additional media controls may be scripting code capable of interacting with the application 441 in response to user input in the rendered web page. In this case, the scripting code may invoke the application 441 using a particular function, class, API and/or library associated with the application. Therefore, the user interaction signal 464 may be a direct invocation of the application 441 or part of the application 441 by the additional media controls, and/or the application 441 or the part of the application 441 may be in the form of scripting code executed by the HTML rendering engine 448.

As an example, the following JavaScript code fragment is suitable for addition to mobile device web pages provided by the YouTube video sharing service (domain at ww.youtube.com). The application 441 may insert the code fragment into web content retrieved from the YouTube video sharing service and/or may provide the code fragment to the HTML rendering engine 448. The HTML rendering engine 448 may execute the code fragment in a scripting engine of the HTML rendering engine 448. The code fragment may process a touch event invoked by the user 415 touching a location (x,y) on the touchscreen of the mobile device 411. The code fragment may examine the web content to determine whether the touched location corresponds to a media control for playing YouTube video content accessible from the corresponding web page. If the touched location corresponds to a media control, the code fragment may invoke the application 441 using a function provided by the application 441, namely mediaControlClicked( ). As a result, the mediaControlClicked( ) function and/or the application 441 may initiate an appropriate media action.

```
function processTouchEvent_YouTube(x, y)
{
    var touchedElement = document.elementFromPoint(x,y);
    if (touchedElement) {
        var WATCH_THUMB = "watch thumb";
        var PAGE_ELEMENT_ID = "page_element_id";
        var elem = touchedElement;
        var mediaControlFound = false;
        while (elem != null && !mediaControlFound) {
            if (elem.nodeName == "DIV") {
                var node =
                    elem.getAttributeNode(PAGE_ELEMENT_ID);
                if (node && (node.value == WATCH_THUMB))
                    mediaControlFound = true;
            }
            elem = elem.offsetParent;
        }
        if (mediaControlFound) {
            window.HTMLOUT.mediaControlClicked( );
        } else {
            window.HTMLOUT.mediaControlNotClicked( );
        }
    } else
        window.HTMLOUT.mediaControlNotClicked( );
}
```

The application 441 may initiate a media action in response to receipt of the user interaction signal 464. For example, the application 441 may play the internet media content corresponding to the control invoked by the user 415 on the mobile device 411. Further, the application 441 may transfer the internet media content corresponding to the control invoked by the user 415 to a rendering device in the local network 412, such as one of the rendering devices 421, 422, 423. Still further, the application 441 may add the internet media content corresponding to the control invoked by the user 415 to a playback queue. The media action may depend on the specific control invoked by the user 415 as determined by the application 441 based on the user interaction signal 464.

Figure 13:
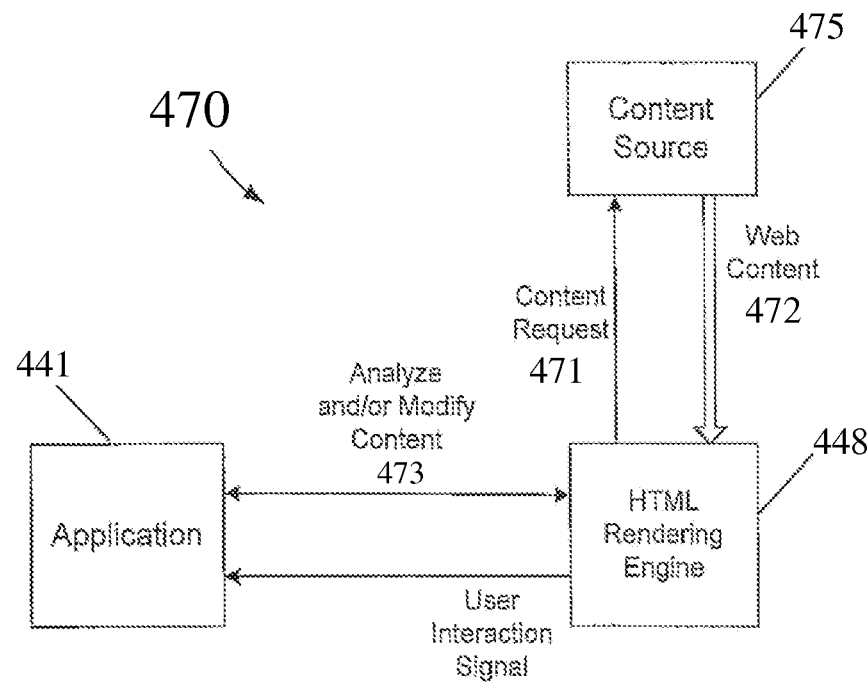

FIG. 13 generally illustrates an embodiment of a system 470 for using the application 441 to retrieve, analyze and/or modify web content for the purpose of transferring internet media content to a rendering device in an embodiment of the present invention. The system 470 may use the structure and connections previously described for FIG. 11.

Referring again to FIG. 13, the HTML rendering engine 448 may request and/or retrieve web content corresponding to a web page. The request and/or the retrieval of the web content may be in response to instructions from the application 441 and/or may be based on user interaction with a previously rendered web page. For example, the user 415 may have selected a link for a new web page, and the HTML rendering engine 448 may attempt to load the new web page in response to the selection of the link by the user 415.

The HTML rendering engine 448 may use a content request transmission 471 to send a content request to a content source 475. The content source 475 may be, for example, one of the content sources 431, 432, 433 and the content source 444. In response, the HTML rendering engine 448 may receive a web content transmission 472 from the content source 475. The web content transmission 472 may provide the web content requested by the HTML rendering engine 448. In this way, the HTML rendering engine 448 may send one or more content requests to one or more content sources to obtain the web content corresponding to a web page. The HTML rendering engine 448 may utilize any of the various techniques for retrieving web content previously described herein.

The HTML rendering engine 448 may construct a structured representation of the web content corresponding to the web page. For example, the HTML rendering engine 448 may construct a DOM model of the web page. The HTML rendering engine 448 may enable the application 441 to access the structured representation of the web page. Such access may be exposed to the application 441 using an API, a class, a function call, and/or another suitable mechanism.

The application 441 may perform an analysis and/or a modification 473 of the web content. For example, the application 441 may access the structured representation of the web page to analyze the web content, to identify the media controls for accessing the internet media content, and/or to modify the web content by inserting additional media controls. The application 441 may access the structured representation of the web page through the HTML rendering engine 448 and may utilize any of the techniques for analyzing and/or modifying the web content previously described for FIG. 12.

Alternatively, the application 441 may provide scripting code to the HTML rendering engine 448 so that the scripting code may use the structured representation to perform the analysis and/or the modification 473 of the web content. For example, the application 441 may provide a JavaScript code fragment to the HTML rendering engine 448. The HTML rendering engine 448 may have a scripting engine to execute the JavaScript code fragment. The Javascript code fragment may access the structured representation of the web page to identify the media controls for accessing the internet media content. The Javascript code fragment may generate a result which identifies the media controls, and/or the HTML rendering engine 448 may forward the result to the application 441.

The HTML rendering engine 448 may use the web content and/or the modified web content to create a rendered web page displayed to the user 415 of the mobile device 411. If the application 441 modified the web content, the rendered web page may have the additional media controls. The user 415 may interact with the rendered web page. For example, the user 415 may select, may point at, may touch, may invoke and/or may click on one of the media controls and/or the additional media controls. In response, the HTML rendering engine 448 may generate a user interaction signal 474 and/or may communicate the user interaction signal 474 to the application 441. The user interaction signal 474 may indicate that the user selected, pointed at, touched, invoked, and/or clicked on an object, an image, a button and/or a link in the rendered web page. The user interaction signal 474 may identify the object, the image, the button and/or the link. The user interaction signal 474 may identify and/or may provide a URL corresponding to the object, the image, the button and/or the link. The application 441 may use the user interaction signal 474 and/or the URL to determine that the user 415 invoked one of the media controls previously identified by the application 441 and/or one of the additional media controls inserted by the application 441.

Alternatively, the user interaction signal 474 may convey a lower level user interaction event. For example, the user interaction signal 474 may indicate that the user 415 selected, pointed at, touched and/or clicked on a particular location within the rendered web page. In this case, the application 441 may compare the particular location to the known locations of the media controls previously identified by the application 441 and/or the additional media controls inserted by the application 441. As a result, the application 441 may use the user interaction signal 474 to determine the particular control invoked by the user 415.

Still further, the user interaction signal 474 may cause a portion of the application 441 to execute. For example, one of the additional media controls may be scripting code capable of interacting with the application 441 in response to user input in the rendered web page. In this case, the scripting code may invoke the application 441 using a particular function, class, API and/or library associated with the application. Therefore, the user interaction signal 474 may be a direct invocation of the application 441 or part of the application 441 by the additional media controls, and/or the application 441 or the part of the application 441 may be in the form of scripting code executed by the HTML rendering engine 448.

The application 441 may initiate a media action in response to receipt of the user interaction signal 474. For example, the application 441 may play the internet media content corresponding to the control invoked by the user 415 on the mobile device 411. Further, the application 441 may transfer the internet media content corresponding to the control invoked by the user 415 to a rendering device in the local network 412, such as one of the rendering devices 421, 422, 423 and/or the rendering device 442. Still further, the application 441 may add the internet media content corresponding to the control invoked by the user 415 to a playback queue. The media action may depend on the specific control invoked by the user 415 as determined by the application 441 based on the user interaction signal 474.

Referring again to FIGS. 12 and 13, the systems 460, 470 may enable the mobile device 411 to receive web content for a web page having original media controls for accessing internet media content. Each original media control may have a corresponding internet media content object. In an embodiment, the application 441 may receive the web content in response to a content request message sent by the application 441. In another embodiment, the HTML rendering engine 448 may receive the web content in response to a content request message sent by the HTML rendering engine 448.

Then, the application 441 on the mobile device 411 may process the web content to identify the original media controls. Then, the application 441 may modify the web content to form modified web content having one or more additional media controls. In an embodiment, the application 441 may modify the web content using a structured representation of the web page created by the HTML rendering engine 448. Each of the additional media controls may correspond to one of the original media controls. One or more of the additional media controls may be an HTML <a> tag which links to a first URL conveyed by the user interaction signal 464, 474 to the application 441. One or more of the additional media controls may be created by a scripting code fragment provided by the application 441 to the HTML rendering engine 448.

One or more of the additional media controls may be created by a scripting code fragment retrieved by the application 441 from a database of scripting code fragments. The database may be remote from the mobile device 411 and/or may be accessible to the mobile device 411 through the internet 413. Each of the scripting code fragments in the database may correspond to a content source. The application 441 may retrieve the scripting code fragment by querying the database using a content source identifier.

Then, the modified web content may be displayed as a rendered web page using the HTML rendering engine 448. The application 441 may receive the user interaction signal 464, 474 which indicates user interaction with the rendered web page. In an embodiment, the HTML rendering engine 448 may generate the user interaction signal 464, 474 in response to user interaction with the rendered web page. The user interaction signal 464, 474 may be generated by a scripting code fragment inserted into the web content by the application 441.

The application 441 may process the user interaction signal 41 to identify one of the additional media controls invoked by the user 415. Then, the application 441 may initiate a media action corresponding to the identified additional media control, and the media action may involve the internet media content object corresponding to the original media control to which the identified additional media control corresponds. The media action may instruct an external rendering device to play back the internet media content object; alternatively, the media action may add the internet media content object to a playback queue.

Figure 14:
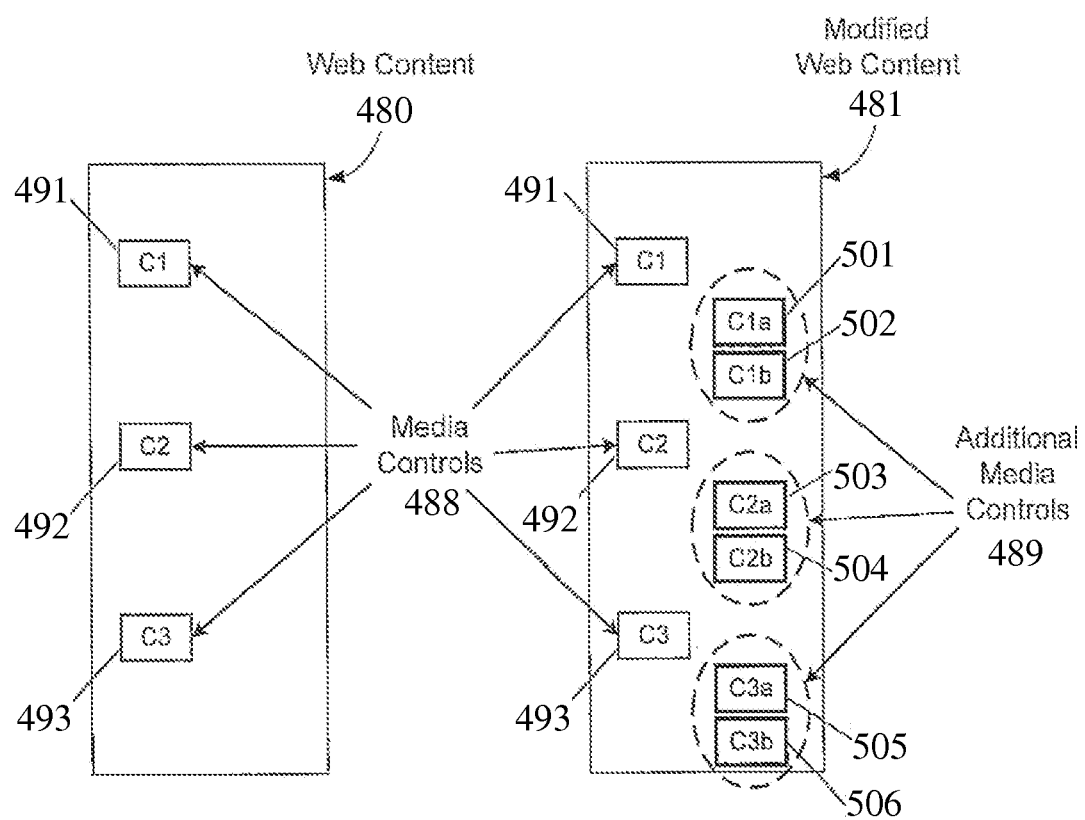
FIG. 14 illustrates a black box diagram of web content and modified web content used in an embodiment of the present invention.

FIG. 14 generally illustrates web content 480 and modified web content 481 used in an embodiment of the present invention. FIG. 14 depicts a conceptual illustration of the web content 480 corresponding to a web page, and FIG. 14 is not intended to represent a web page in rendered form.

The web content 480 may be retrieved by the application 441 and/or the HTML rendering engine 448. The web content 480 may be and/or may have a single element, such as an HTML file, or may be and/or may have multiple files that reference multiple elements, such as graphic images, style sheets, borders, scripting code, media objects, and/or the like. The web content 480 may be stored in a structured representation by the application 441 and/or the HTML rendering engine 448. For example, the web content 480 may be stored in a DOM format.

The application 441 may identify media controls 488. In the example illustrated in FIG. 14, the application 441 may identify a first media control 491, entitled "C1"; a second media control 492, entitled "C2"; and/or a third media control 493, entitled "C3." The media controls 488 may enable the user 415 to access internet media content present in the original web content retrieved from a content source.

The application 441 may insert additional media controls 489 in the web content 480 to form the modified web content 481. For example, in the example illustrated in FIG. 14, the application 441 may insert a first additional media control 501, entitled "C1a"; a second additional media control 502, entitled "C1b"; a third additional media control 503, entitled "C2a"; a fourth additional media control 504, entitled "C2b"; a fifth additional media control 505, entitled "C3a"; and/or a sixth additional media control 506, entitled "C3b." The present invention is not limited to a specific number of media controls or additional media controls, and any number of media controls and additional media controls may be used.

The additional media controls 489 inserted by the application 441 may correspond to the media controls 488 provided by the rendered web page 505. For example, the first additional media control 501 and/or the second additional media control 502 of the modified web content 481 may correspond to the first media control 491 of the web content 480. The third additional media control 503 and/or the fourth additional media control 504 of the modified web content 481 may correspond to the second media control 492 of the web content 480. The fifth additional media control 505 and/or the sixth additional media control 506 of the modified web content 481 may correspond to the third media control 493 of the web content 480.

Therefore, the first additional media control 501 and/or the second additional media control 502 may correspond to enhanced media functions which operate on the internet media content accessible using the first media control 491. In a similar fashion, the third additional media control 503 and/or the fourth additional media control 504 may correspond to enhanced media functions which operate on the internet media content accessible using the second media control 492. The fifth additional media control 505 and/or the sixth additional media control 506 may correspond to enhanced media functions which operate on the internet media content accessible using the third media control 493.

The additional media controls 489 inserted by the application 441 may depend on properties of the internet media content. For example, the application 441 may determine that an additional media control for transferring media content for playback on a DLNA-compatible stereo device may be relevant to a digital music track found in the web content for a web page. However, the additional media control may not be relevant to a digital video clip identified in the web content for the same web page. Therefore, the application 441 may insert a different set of the additional media controls 489 for each of the media controls 488 identified by the application 441, and each set of the additional media controls 489 may be appropriate for the internet media content accessible by the corresponding one of the media controls 488.

Figure 15:
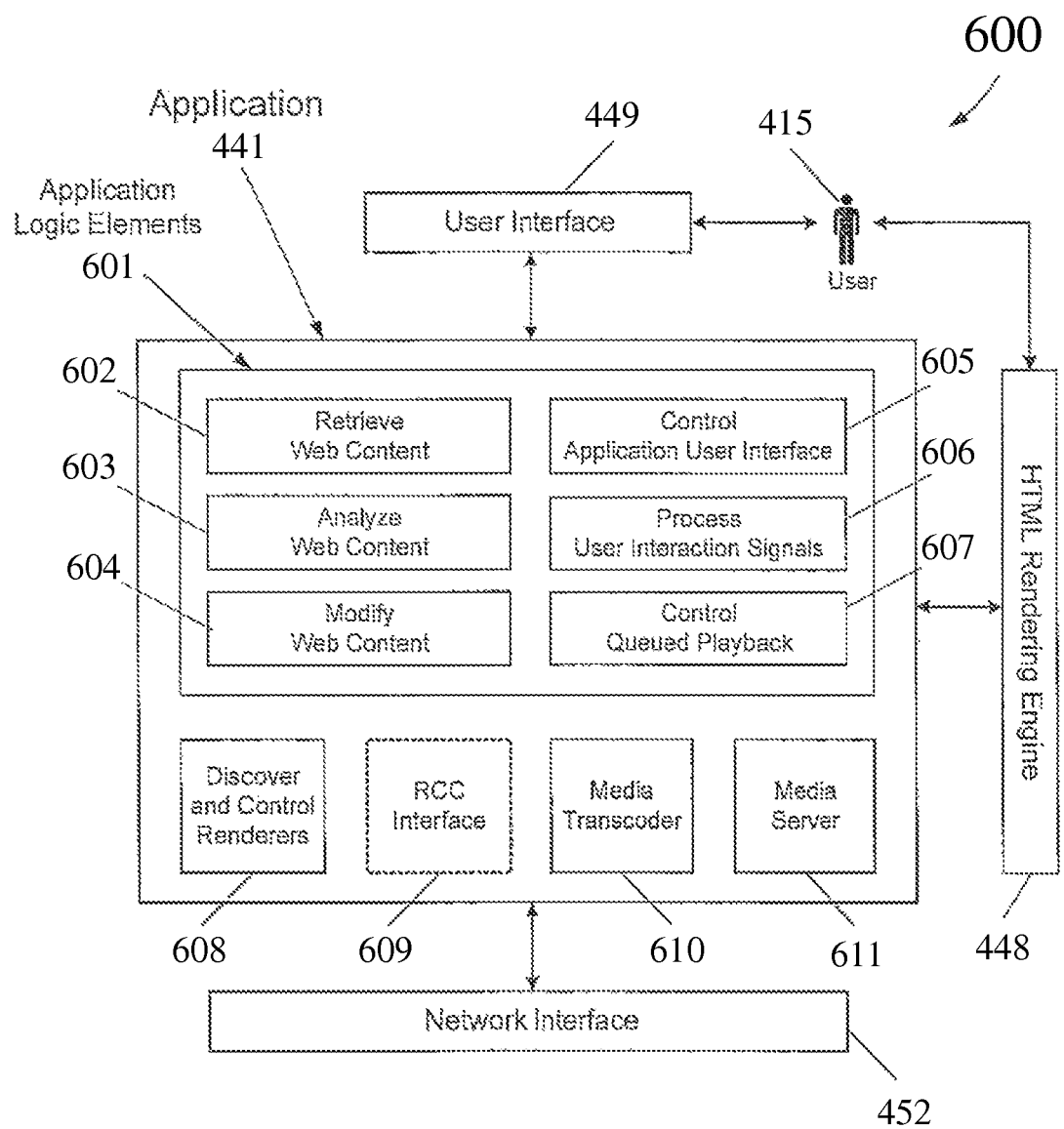

FIG. 15 generally illustrates a system 600 for using the application 441 on the mobile device 411 to transfer internet media content to a rendering device in a home network in an embodiment of the present invention. As previously set forth, the application 441 may communicate with one or more user interface components provided by the mobile device 411 and/or the operating system of the mobile device 411 to display an user interface 449 and/or receive user input. The application 441 may communicate with the network interface 452 provided by the mobile device 411 and/or the operating system of the mobile device 411 to access the local network 412 and/or a wide area network, such as the internet 413. In this way, the application 441 may communicate with other devices, such as rendering devices, rendering control components, content sources, and/or the like. The application 441 may access a remote database through the local network 412 and/or the internet 413 to retrieve content-site specific information for analyzing and/or modifying web content from a content site.

The application 441 may communicate with the HTML rendering engine 448 using one or more classes, functions, API's, and/or the like. The HTML rendering engine 448 may be provided by the operating system of the mobile device 411 and/or may be present on the mobile device 411 for access and use by the application 441. The application 441 may provide the web content 480 and/or the modified web content 481 to the HTML rendering engine 448. The application 441 may communicate with the HTML rendering engine 448 to request the HTML rendering engine 448 to retrieve the web content 480 for a web page, to render the web page, and/or to display the web page. The application 441 may communicate with the HTML rendering engine 448 to analyze and/or modify the web content 480 stored and/or maintained in a structured representation by the HTML rendering engine 448. The application 441 may provide scripting code fragments to the HTML rendering engine 448 for insertion into the web content 480 of a web page and/or for execution in a scripting engine of the HTML rendering engine 448. The application 441 may receive the user interaction signal 464, 474 from the HTML rendering engine 448 and may execute media actions in response to receipt of the user interaction signal 464, 474.

The application 441 may have application logic elements 601 which may perform the various logical functions described herein. The application 441 may have a retrieval element 602 which may retrieve the web content 480, an analysis element 603 which may analyze the web content 480, a modification element 604 which may modify the web content 480 to form the modified web content 481, a UI control element 605 which may control the application user interface, an interaction processing element 606 which may process the user interaction signal 464, 474, and/or a queue control element 607 which may control queued playback. An embodiment of the application 441 may not have one or more of the application logic elements 601. For example, an embodiment of the application 441 may rely on the HTML rendering engine 448 to retrieve the web content; therefore, the application 441 may not have the retrieval element 602. As another example, an embodiment of the application 441 may not modify the web content 480 to insert the additional media controls 489; therefore, the application 441 may not have the modification element 604. As yet another example, an embodiment of the application 441 may not support queued playback; therefore, the application 441 may not have the queue control element 607.

The retrieval element 602 may send one or more content requests to one or more content sources to obtain the web content 480 corresponding to a web page. Each of the content requests may be an HTTP GET request or a similar request as known to one skilled in the art. The retrieval element 602 may generate the content requests to have a requester identification field associated with the mobile device 411 and/or a web browser of the mobile device 411 to obtain the web content 480 in a form suitable for display on the mobile device 411. The content requests may be sent and/or the corresponding responses may be received through the network interface 452.

The analysis element 603 may examine the web content 480 for a web page to identify the media controls 488 for accessing internet media content. The analysis element 603 may examine a representation of the web page created, stored and/or maintained by the application 441 as previously set forth in the description of the embodiment depicted in FIG. 12. Alternatively, the analysis element 603 may examine a representation of the web page created, stored and/or maintained by the HTML rendering engine 448 as previously set forth in the description of the embodiment depicted in FIG. 13. If the analysis element 603 examines a representation of the web page created, stored and/or maintained by the HTML rendering engine 448, the analysis element 603 may communicate with and/or may interact with the HTML rendering engine 448 to perform the analysis of the web content 480.

Analysis of the web content 480 may be performed directly by the analysis element 603 to analyze the web content 480. For example, the application 441 may have executable classes, functions and/or code which may directly examine the web content 480 and/or a structured representation of the web content 480. The executable classes, functions and/or code may identify the media controls 488 for accessing the internet media content. The executable classes, functions and/or code may identify HTML <a> tags which may link to media content objects, scripting code present in the web content 480 for accessing media content, and/or the like.

Alternatively, analysis of the web content 480 may be performed by scripting code provided by and/or generated by the analysis element 603 to analyze the web content 480. The scripting code may be provided to the HTML rendering engine 448 and/or may be embedded in the web content 480 for the web page. The scripting code may be executed by a scripting engine of the HTML rendering engine 448. The scripting code may identify the media controls 488 and/or may communicate information about the media controls 488 to the application 441. The communication may indicate the number of the media controls 488, the type of the media controls 488, the location of the media controls 488 in the web content 480 and/or the rendered web page, information about the internet media content retrievable using the media controls 488, and/or the like. For example, the information may have and/or may be a URL for accessing the media content, a MIME type of the media content, metadata describing the media content, and/or the like.

Analysis of the web content 480 may rely on information retrieved from a database of content-source specific information. The information may specify how a particular content source provides media controls 488 in web pages. The information may specify rules and/or instructions for analyzing the web content 480 from a particular content source to identify the media controls 488. The information may have and/or may be executable code and/or scripting code capable of analyzing the web content 480 from a particular content source to identify the media controls 488. The application 441 and/or the analysis element 603 may query the database using a content source identifier, such as the domain name of the content source. As a result, the application 441 may obtain the information relevant to the content source and/or may use the information to analyze the web content 480 from the content source.

The modification element 604 may modify the web content 480 of a web page to insert the additional media controls 489. The modification element 604 may operate on a representation of the web page created, stored and/or maintained by the application 441 as previously set forth in the description of the embodiment depicted in FIG. 12. Alternatively, the modification element 604 may examine a representation of the web page created, stored and/or maintained by the HTML rendering engine 448 as previously set forth in the description of the embodiment depicted in FIG. 13. If the modification element 604 examines a representation of the web page created, stored and/or maintained by the HTML rendering engine 448, the modification element 604 may communicate with and/or may interact with the HTML rendering engine 448 to modify the web content 480 to generate the modified web content 481.

Modification of the web content 480 may insert HTML code into the web content 480 of the web page. The inserted HTML code may display one or more of the additional media controls 489, such as a text link, an icon, a button, a thumbnail image, and/or the like. The inserted HTML code may provide a link to a URL created by and/or known to the application 441. The application 441 may determine that the user 415 invoked one of the additional media controls 489 based on receipt of a user interaction signal 464, 474 which contains and/or references the URL.

Alternatively, modification of the web content 480 may utilize scripting code. The modification element 604 may embed the scripting code into the web content 480 and/or may provide the scripting code to the HTML rendering engine 448. The scripting code may display the additional media controls 489 in the rendered web page, may interact with the user 415 through the rendered web page, and/or may communicate user interaction signals to the application 441.

The inserted HTML code, graphic images representing the additional media controls 489, information on how to insert the HTML code in the web content 480, and/or the like may be content source-specific and/or may be retrieved by the application 441 from a database of content-source specific information. In a similar fashion, the scripting code, the graphic images referenced by the scripting code, the information on how to insert the scripting code in the web content 480, and/or the like may be content-source specific, and may be retrieved by the application 441 from a database of content-source specific information.

Figure 16:
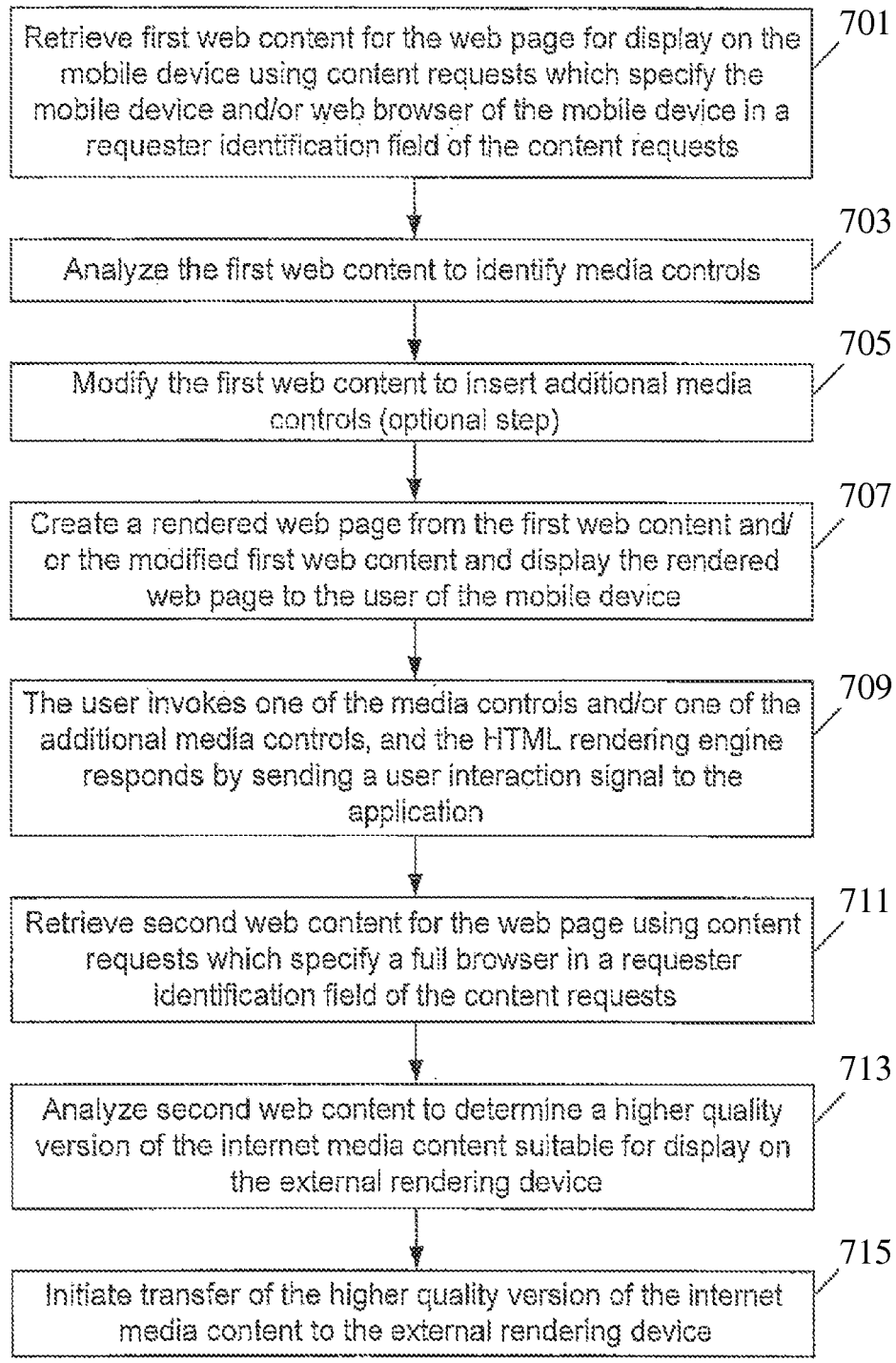
FIG. 16 illustrates a flowchart of a method for using an application on a mobile device to transfer internet media content to a rendering device in a home network in an embodiment of the present invention.
Figure 17:
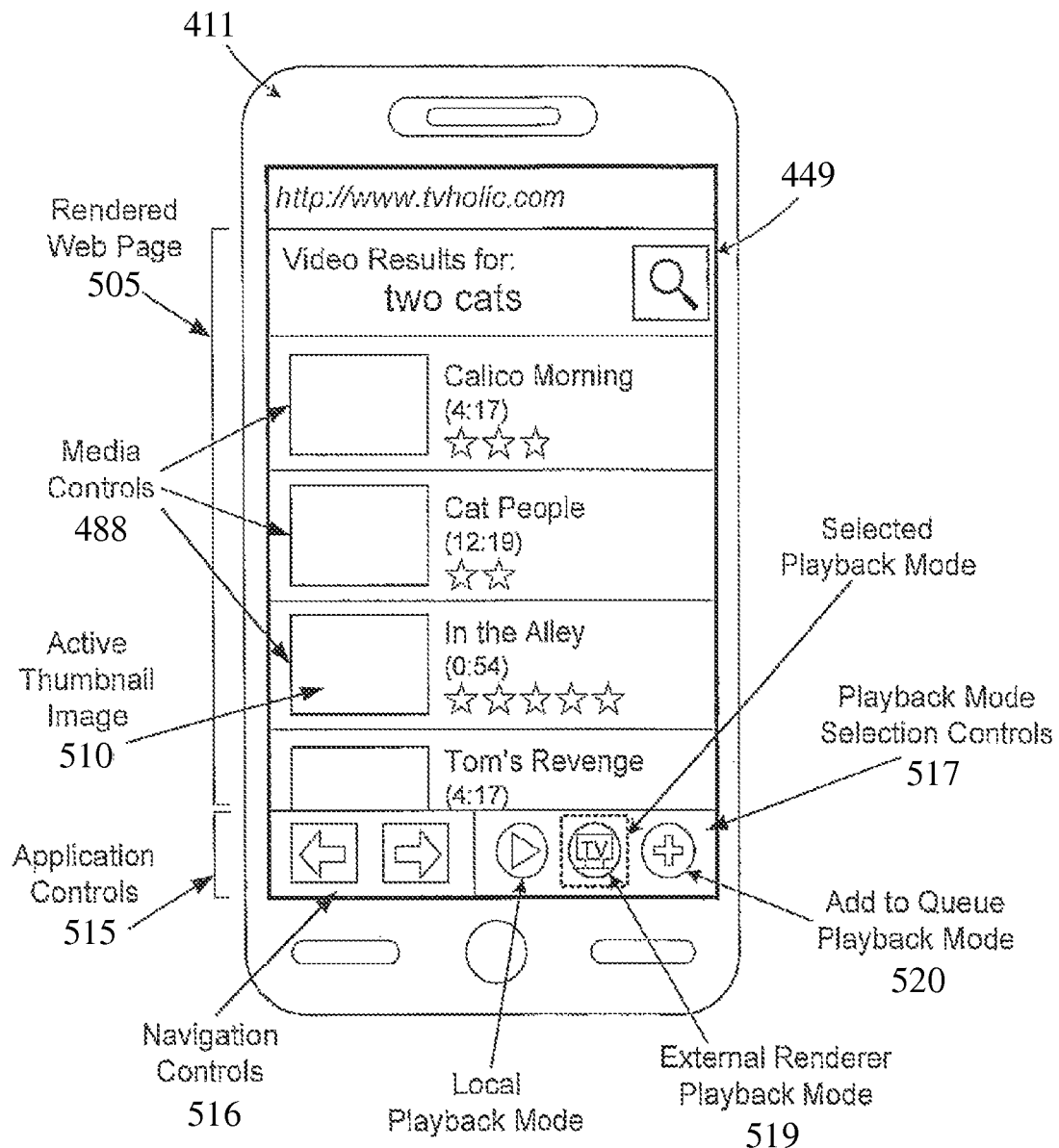
FIGS. 17 and 18 illustrate embodiments of a user interface for using an application on a mobile device to transfer internet media content to a rendering device in a home network in embodiments of the present invention.

The UI control element 605 may communicate with one or more user interface elements of the mobile device 411 and/or the user interface 449 of the mobile device 411 to display the application user interface and/or enable the user 415 to interact with the application user interface. The application user interface which may be presented by the user interface of the mobile device 411 may have application controls, such as buttons, menus, dialog boxes, text entry boxes, and/or other well-known user interface elements, to enable the user 415 to control and/or to interact with the application 441. Such application controls may be separate from and/or in addition to the rendered web page which may have controls, buttons, links, text entry boxes, and/or the like. In FIGS. 16 and 17, application controls presented by the application 441 are distinguished from user interface elements which are part of the rendered web page.

Referring again to FIG. 15, the UI control element 605 may control display of the application controls and/or may accept user input events relevant to the application controls. For example, application controls may have and/or may be a "Back" button and a "Forward" button for web browsing. The UI control element 605 may communicate with one or more user interface components of the operating system of the mobile device 411 to cause the "Back" button and the "Forward" button to be displayed in the user interface 449 on the mobile device 411 and/or to register to receive user input events relevant to these buttons. In a similar fashion, the UI control element 605 may control the presentation of additional application controls, such as a control for managing the visual layout of the screen of the mobile device 411. The UI control element 605 may manage user input events related to the various application controls described herein for the various embodiments.

The application may have a discover and control renderers component 608, a renderer control component interface 609 (hereafter "the RCC interface 609"), a media transcoder component 610, and/or a media server component 611. The discover and control renderers component 608 may discover rendering devices available in the local network 412. Further, the discover and control renderers component 608 may determine rendering capabilities of the rendering devices to determine whether media content may be compatible with the rendering devices. Still further, the discover and control renderers component 608 may track the presence and/or the absence of specific rendering devices available in the network and/or may maintain records tracking the rendering capabilities of the available renderers. Moreover, the discover and control renderers component 608 may communicate with the rendering devices to initiate, maintain and/or control the rendering of media content on the rendering devices. The discover and control renderers component 608 may have any of the functions and/or capabilities described for the "renderer discovery and control component 110" of FIG. 4. In an embodiment, the discover and control renderers component 608 may be and/or may function as a UPnP AV control point.

The RCC interface 609 may communicate with the rendering control component 425 which may be external to the mobile device 411 and/or may provide renderer control functions to other devices. The application 441 may communicate with the rendering control component 425 to control rendering devices and/or to access queued playback functionality provided by the rendering control component 425. The various rendering control functions and interfaces for accessing such functions over a network are disclosed in U.S. Patent Application Pub. No. 2010/0095332, herein incorporated by reference in its entirety.

The media transcoder component 610, if present, may provide transcoding functionality by adapting the internet media content for compatibility with the rendering capabilities of a rendering device. The media transcoder component 610 may perform audio codec transcoding, video codec transcoding, format transcoding, and/or the like. Internet media content selected by the user 415 for playback on an external rendering device may be received through the network interface 452 and/or may be transcoded by the media transcoder component 610. The resulting transcoded media content may be made available to rendering devices in the local network 412 through the media server component 611 as described hereafter. The media transcoder component 610 may have any of the functions and/or behavior described for the transcoding engine 90 of FIG. 4.

The media server component 611, if present, may make the internet media content available to rendering devices in the local network 412. The media server component 611 may function as an HTTP server, a UPnP AV media server, a DLNA compliant media server, a proxy server, and/or the like. The media server component 611 may have any of the functions and/or behavior described for the media server component 100 of FIG. 4.

The media transcoder 610 and/or the media server 611 may be provided in the application 441 as shown in FIG. 15. Alternatively, one or both of the media transcoder 610 and/or the media server 611 may be provided by another component available in the network. For example, the media transcoder 610 and/or the media server 611 may be combined in a stand-alone proxy server and/or may be incorporated into the rendering control component 425 which may be external to the mobile device 411. The application 441 and/or the RCC interface 609 may communicate with the separate component which provides the media transcoder 610 and/or the media server 611. For example, the application 441 and/or the RCC interface 609 may instruct the separate component to request, retrieve, transcode and/or make available a particular internet media content object which must be transferred to a rendering device as the result of a media action requested by the user 415 of the mobile device 411.

The interaction processing element 606 may receive user interaction signals 464, 474 from the HTML rendering engine 448. The interaction processing element 606 may process the user interaction signals 464, 474 to determine and/or to initiate corresponding media actions. As a first example, the HTML rendering engine 448 may provide a user interaction signal 464, 474 indicating that the user 415 invoked a media control 88 corresponding to a particular URL in the rendered web page. The interaction processing element 606 may receive the user interaction signal 464, 474 and/or may resolve the particular URL to determine the relevant media content object and the associated media action. For example, the particular URL may correspond to one of the additional media controls 489 previously inserted into the web content 480 by the modification element 604. The additional media control 89 may correspond to transfer of a first internet media content object to the first rendering device 421 in the local network 412.

As a result, the interaction processing element 606 may initiate the media action. For example, the interaction processing element 606 may direct the discover and control renderers component 608 of the application 441 to instruct the first rendering device 421 to request, retrieve and/or initiate playback of the first internet media content object. Alternatively, the interaction processing element 606 may use the RCC interface 609 of the application 441 to instruct the rendering control component 425 to communicate with the first rendering device 421 to initiate transfer of the first internet media content for playback on the first rendering device 421.

Initiation of a media action may involve one or more of the discover and control renderers component 608, the RCC interface 609, the media transcoder component 610 and/or the media server component 611 of the application 441. The role of each of these components may vary depending on the embodiment and the media action being initiated.

As a second example of the interaction processing element 606 processing the user interaction signals 464, 474, the HTML rendering engine 448 may provide a user interaction signal 464, 474 which may indicate that the user 415 pointed at, selected, touched and/or clicked on a particular location in the rendered web page. The user interaction signal 464, 474 may indicate the location using (x,y) coordinates into the rendered web page. The interaction processing element 606 may determine whether the location matches any of the media controls 488 and/or the additional media controls 489 in the rendered web page. If the location matches one of the media controls 488 or one of the additional media controls 489, the interaction processing element 606 may determine which of the media controls 488 or additional media controls 489 matches the location. Then, the interaction processing element 606 may initiate a corresponding media action. For example, the (x,y) location specified in the user interaction event may match an additional media control 89 which corresponds to adding a second internet media content object to a playback queue. Then, the interaction processing element 606 may cause the second internet media content object to be added to the playback queue.

The interaction processing element 606 may communicate with the queue control element 607 to add the second internet media content object to an internal playback queue. The interaction processing element 606 may use the RCC interface 609 to communicate with the rendering control component 425 to add the second internet media content object to a playback queue created, controlled and/or maintained by the rendering control component 425. The specific steps used to initiate the media action may vary based on the embodiment and/or based on the presence or absence of the rendering control component 425.

As a third example of the interaction processing element 606 processing the user interaction signals 464, 474, the user interaction signal 464, 474 may be a direct invocation of the application 441 or of part of the application 441 by a scripting code fragment. The scripting code fragment may have been inserted into the web content 480 by the application 441 and/or previously provided by the application 441 to the HTML rendering engine 448. The scripting code fragment may have determined that the user 415 invoked an additional media control 89 associated with the scripting code fragment. The scripting code fragment may have determined that the additional media control 89 invoked by the user 415 corresponds to transfer of a third internet media content object to the second rendering device 422 for playback on the second rendering device 422. The scripting code fragment may directly call, invoke and/or communicate with a function of the application 441 designed to respond to user interaction signals 464, 474 from such scripting code fragments. When calling, invoking and/or communicating with the function, the scripting code fragment may provide information which may identity which of the additional media controls 489 the user invoked and/or more specific information which may specify the third internet media content object, the media action, and/or the second rendering device 422.

As a result, the function and/or the application 441 may initiate the media action. For example, the function and/or the application 441 may cause the discover and control renderers component 608 of the application 441 to instruct the second rendering device to request, retrieve and/or initiate playback of the third internet media content object. Alternatively, the function and/or the application 441 may use the RCC interface 609 to instruct the rendering control component 425 to communicate with the second rendering device 422 to initiate the transfer of the third internet media content for playback on the second rendering device.

If initiating transfer of internet media content to an external rendering device, the application 441 may determine an alternate version of the internet media content for display using the external rendering device. Many content sources adapt their web pages and media content based on the client device which receives the web pages and the media content. For example, a content source may have a first web page format optimized for use on mobile devices, and a second web page format optimized for use within full PC web browsers. The first web page format may, for example, provide access to versions of the internet media content having a low quality, bitrate and/or resolution suitable for display on a small mobile device screen. In contrast, the second web page format may provide access to versions of the internet media content which have a higher quality, bitrate and/or resolution suitable for display on a large computer monitor display. Further, the external rendering device may have a high resolution visual display. For example, the external rendering device may be a DLNA-compatible high definition television. Therefore, the version of the internet media content accessible through the second web page format may be more suitable for display on the external rendering device relative to the version of the internet media content accessible through the first web page format.

The content source may provide the first web page format in response to content requests which specify the mobile device 411 and/or a web browser of the mobile device 411 in a requester identification field of the content requests. In a similar fashion, the content source may provide the second web page format in response to content requests which specify a PC and/or a PC web browser in the requester identification field.

Therefore, the application 441 may determine a higher quality version of the internet media content suitable for display using the external rendering device. For example, the application 441 may identify a higher quality version of the internet media content using the method 700 generally illustrated in FIG. 16. The method 700 may be performed by the mobile device 411 executing program instructions provided by a non-transitory computer-readable medium, such as register memory, processor cache and Random Access Memory (RAM).

At step 701, the first web content 480 for the web page may be retrieved for display on the mobile device 411. For example, retrieval may use the content requests specifying the mobile device 411 and/or a web browser of the mobile device 411 in a requester identification field of the content requests. At step 703, the first web content 480 may be analyzed to identify the media controls 488 in the web page as previously set forth. At step 705, the first web content 480 may be modified to insert the additional media controls 489 if such technique is used in the specific embodiment. Step 705 is optional; in some embodiments, the first web content 480 is modified to insert the additional media controls 489, and in other embodiments, the first web content 480 is not modified to insert the additional media controls 489.

At step 707, a rendered web page may be created from the first web content 480 and/or the modified first web content 481. The HTML rendering engine 448 may create the rendered web page for display to the user 415. The application user interface which may be presented by the user interface of the mobile device 449 may display the rendered web page to the user 415. At step 709, the user may invoke one of the media controls 488 and/or one of the additional media controls 489. The media control 88 and/or the additional media control 89 invoked by the user 415 may be associated with internet media content. As a result, the HTML rendering engine 448 may send the user interaction signal 464, 474 to the application 441. At step 711, second web content 480 for the web page may be retrieved using content requests which specify a full web browser in a requester identification field of the content requests. At step 713, the second web content 480 may be analyzed to determine a higher quality version of the internet media content suitable for display on the external rendering device. At step 715, the higher quality version of the internet media content may be transferred to the external rendering device.

For the method 700, retrieval of the second web content 480 at step 711 does not require retrieval of all web content elements necessary for rendering of the web page. The second web content 480 is not used to render a web page on the mobile device 411 or on any other device; the second web content 480 is only used to determine the higher quality version of the internet media content suitable for display on the external rendering device. Consequently, the retrieval of the second web content 480 at step 711 may omit elements of the web page, such as graphics, images, style sheets, and/or other elements which are only used for visual rendering of the web page.

The steps of the method 700 may be carried out in any order, and the present invention is not limited to the order of the steps presented in the preceding text and FIG. 16. For example, step 711 and/or step 713 may occur at any time earlier in the method 700. In an embodiment, the first web content and/or the second web content may be retrieved "up-front" to avoid delay and achieve faster response time between the user input accepted in step 709 and the transfer of the higher quality version of the internet media content to the external rendering device in step 715.

The queue control element 607 may maintain one or more playback queues for media playback. As known to one skilled in the art, a playback queue is typically a first-in, first-out ("FIFO") queue which may track multiple media objects and may enable sequential playback of the multiple media objects. A playback queue may play the multiple media objects using the mobile device 411 and/or an external rendering device.

For example, the user 415 of the mobile device 411 may designate a playback queue for playback of digital music content to an external rendering device which may be a DLNA compatible networked stereo device. Then, the user 415 may add a first digital music track, a second digital music track, and/or a third digital music track to the playback queue. As a result, the playback queue may play the first digital music track on the DLNA-compatible networked stereo device, followed by the second digital music track, and then the third digital music track.

The application 441 may support creation, management and/or use of internal playback queues. Consequently, the queue control element 607 may create one or more playback queue structures to provide playback queue functionality to the user 415 of the mobile device 411. The user 415 may add media objects, such as internet media content objects, to the playback queue. For example, the user 415 may invoke the media controls 488 and/or the additional media controls 489 in a rendered web page to add internet media content objects to a playback queue. Then, the queue control element 607 may instruct an external rendering device to play back the internet media content objects in sequence based on the position of the internet media objects within the playback queue. As a media content object in the playback queue is finished playing on the external rendering device, the queue control element 607 may instruct the external rendering device to begin to request, retrieve and/or play back the next media content object in the playback queue.

The queue control element 607 may use the discover and control renderers component 608 of the application 441 to directly control the external rendering device. Alternatively, the queue control element 607 may use the RCC interface 609 of the application 441 to communicate with the rendering control component 425. The rendering control component 425, if present, may have the ability to create, manage and use playback queues. In this case, the queue control element 607 may use the RCC interface 609 to instruct the rendering control component 425 to create a playback queue which targets a specific external rendering device. Subsequently, the queue control element 607 may use the RCC interface 609 to instruct the rendering control component 425 to add media content objects to the playback queue and/or to control the queued playback of media objects by the external rendering device. As a result, the queue state may be maintained in the rendering control component 425 instead of the application 441. In a similar fashion, the responsibility for maintaining and playing the playback queue may be delegated to the rendering control component 425 which may be external to the mobile device 411. Queue functionality which may be provided by the rendering control component 425 is described in detail in U.S. Patent Application Pub. No. 2010/0095332, herein incorporated by reference in its entirety.

The queue control element 607 may support playback queue management functions which may be exposed to the user 415 through application controls displayed in the user interface 449 by the UI control element 605. For example, the user 415 may be able to view the current contents of a playback queue, edit the playback queue to remove and/or rearrange media content objects, delete a playback queue, create a new playback queue, skip ahead to the next media content object in the playback queue, skip backward to a preceding media content object in the playback queue, and/or the like.

FIG. 17 generally illustrates an embodiment of the application user interface displayed by the user interface 449 provided by the mobile device 411. The application user interface displayed by the user interface 449 of the mobile device 411 may be provided by the application 441 and/or the HTML rendering engine 448. In the example depicted in FIG. 17, the user 415 may have selected, may have specified and/or may have navigated to a specific content site, namely www.tvholic.com. The content site may provide internet video content and/or may provide a search facility for finding video content available through the content site. The user 415 may have used the search facility to execute a search. For example, the user 415 may have used text entry capabilities of the mobile device 411 and/or the HTML rendering engine 448 to enter "two cats" into a search form at the top of a rendered web page.

As a result, the application 441 and/or the HTML rendering engine 448 may have requested and/or retrieved the web content corresponding to the search results web page using techniques previously described. Further, the application 441 may have analyzed the web content using any of the techniques described herein to identify the media controls 488 for accessing internet media content. For example, the application 441 may have identified an active thumbnail image 510 for accessing a video clip entitled "In the Alley" as shown in FIG. 17. The application 441 may have identified other media controls not labeled in FIG. 17, and the present invention is not limited to the specific embodiment of the application user interface depicted in FIG. 17.

The HTML rendering engine 448 may process the web content 480 corresponding to the search results web page to create a rendered web page 505. The rendered web page 505 may be displayed in the application user interface. The rendered web page 505 may have the media controls 488, such as the active thumbnail image 510. The rendered web page 505 may have text, graphics, borders, supplementary information about the internet media content, and/or the like. The rendered web page 505 may have any information specified in the web content retrieved from the content site. The present invention is not limited to the specific embodiment of the rendered web page 505 depicted in FIG. 17.

The application 441 may display application controls 515 in the application user interface. As shown in FIG. 17, the application controls 515 may have and/or may be navigation controls 516 and/or playback mode selection controls 517. The 415 navigation controls 516 may have and/or may be web browser functions, such as, for example, a back button, a forward button, a button to add the current page to a list of favorites, a button to reload and/or refresh the current page, a button to access a list of web browser configuration options, and/or the like.

The playback mode selection controls 517 may enable the user 415 to select a method used to play back media selected in and/or invoked from the rendered web page 505. For example, the playback mode selection controls 517 may have and/or may be a local playback mode control 518, an external renderer playback mode control 519, an add to queue playback mode control 520, and/or the like. The user may select one of the playback mode selection controls 517 to specify a selected playback mode. As a result, the application user interface may identify the selected playback mode. For example, the selected playback mode may be highlighted, may be displayed brightly, may be circled, and/or may be otherwise graphically distinguished from the other playback modes.

The local playback mode control 518 may correspond to playing the internet media content on the mobile device 411. For example, if the local playback mode control 518 is the selected playback mode control, the user 415 may select the active thumbnail image 510 to play the video clip "In the Alley" on the display screen of the mobile device 411. In a similar fashion, the user 415 may select any of the media controls 488 in the rendered web page 505, and the application 441 and/or the HTML rendering engine 448 may respond by using the display screen of the mobile device 411 to play the internet media content corresponding to the selected media control.

The external renderer playback mode control 519 may correspond to playing the internet media content using an external rendering device, such as one of the rendering devices 421, 422, 423 and/or the rendering device 442. For example, if the external renderer playback mode control 519 is the selected playback mode control, the user 415 may select the active thumbnail image 510 to play the video clip "In the Alley" on an external rendering device, such as a DLNA-compliant television. In a similar fashion, the user 415 may select any of the media controls 488 in the rendered web page 505, and the application 441 may respond by using the external rendering device to play the internet media content corresponding to the selected media control. As previously set forth, the application 441 may communicate directly with the external rendering device using the discover and control renderers component 608 of the application 441, and/or the application 441 may instruct the rendering control component 425 which may be external to the mobile device 411 to initiate the transfer of media content to the external rendering device.

The add to queue playback mode control 520 may correspond to adding the internet media content to a queue for queued playback. For example, if add to queue playback mode control 520 is the selected playback mode control, the user 415 may select the active thumbnail image 510 to add the internet video clip "In the Alley" to the queue. In a similar fashion, the user 415 may select any of the media controls 488 in the rendered web page 505, and the application 441 may respond by adding the internet media content corresponding to the selected media control to the queue. As previously set forth, the application 441 may have an internal representation of the playback queue and/or may use a playback queue provided and maintained by the rendering control component 425 which may be accessible through the local network 412.

The application user interface may present the playback mode selection controls 517 adaptively so that the playback mode selection controls 517 may depend on the available rendering devices in the local network 412, on the presence or absence of the rendering control component 425, and/or on the properties of the internet media content corresponding to the media controls 488 identified by the application 441 for the rendered web page 505. For example, the application user interface may not present the external renderer playback mode control 519 if no rendering devices are available in the local network 412. As another example, the application user interface may present multiple external renderer playback mode controls 519 if multiple rendering devices are available in the local network 412, and each of the multiple external renderer playback mode controls 519 may correspond to one of the multiple rendering devices. As yet another example, the application user interface may not present the add to queue playback mode control 520 if the application 441 relies on the presence of the rendering control component 425 to implement queued playback and the rendering control component 425 is unavailable in the local network 412.

The application user interface provided by the user interface 449 of the mobile device 411 may have additional functions not shown in FIG. 17. For example, the application user interface may have a function for selecting a rendering device from the rendering devices in the local network 412. The selected rendering device may be the target rendering device for external renderer playback mode invoked by selection of the external renderer playback mode 519. The application user interface may have a function for accessing rendering controls which control playback on the external rendering device. The application user interface may have a function to view, access, manage and/or control the playback queue.

One or more of the additional functions may be accessible using the playback mode selection controls 517. In an embodiment, the user 415 may "touch" one of the playback mode selection controls 517 to select a playback mode and/or may "long press" one of the playback mode selection controls 517 to configure the playback mode. For example, a "long press" on the external renderer playback mode control 519 may be used to access a screen. The screen may enable the user 415 to select a new target rendering device to use for external renderer playback mode, and/or the screen may enable the user 415 to access rendering controls for controlling rendering on the current target rendering device. In a similar fashion, a "long press" on the add to queue playback mode control 520 may be used to access a screen for viewing the current playback queue and for editing, managing and/or playing back the playback queue.

As a result, the application 441 may override the original functions of the media controls 488 presented within the web page by enabling the media controls 488 to invoke playback methods which may not have been originally supported by the web page. For example, the application 441 may use the playback mode selection controls 517 to provide playback methods which may not have been furnished by the content provider or the designer of the web page.

For example, an embodiment of the application 441 may retrieve a web page having the media controls 488 for accessing internet media content. Then, the web page may be displayed in the user interface 449 of the mobile device 411. Then, the playback mode selection controls 517 may be presented to enable the user 415 to select a playback mode from multiple playback modes. User input may select a playback mode using the playback mode selection controls 517 and/or may select one of the media controls 488 provided by the web page. Then, the internet media content accessed by the selected media control 88 may be played back using the selected playback mode. The internet media content accessed by the selected media control 88 may be played in response to selection of the playback mode using the playback mode selection controls 517 and/or may be played in response to selection of the media control 88 provided by the web page. The internet media content accessed by the selected media control may be played on the mobile device 411 and/or an external rendering device and/or may be added to a playback queue.

In an embodiment, the playback mode selection controls 517 may be implemented independently from other elements disclosed herein. For example, an embodiment of the application 441 may implement the playback mode selection controls 517 without.

Figure 18:
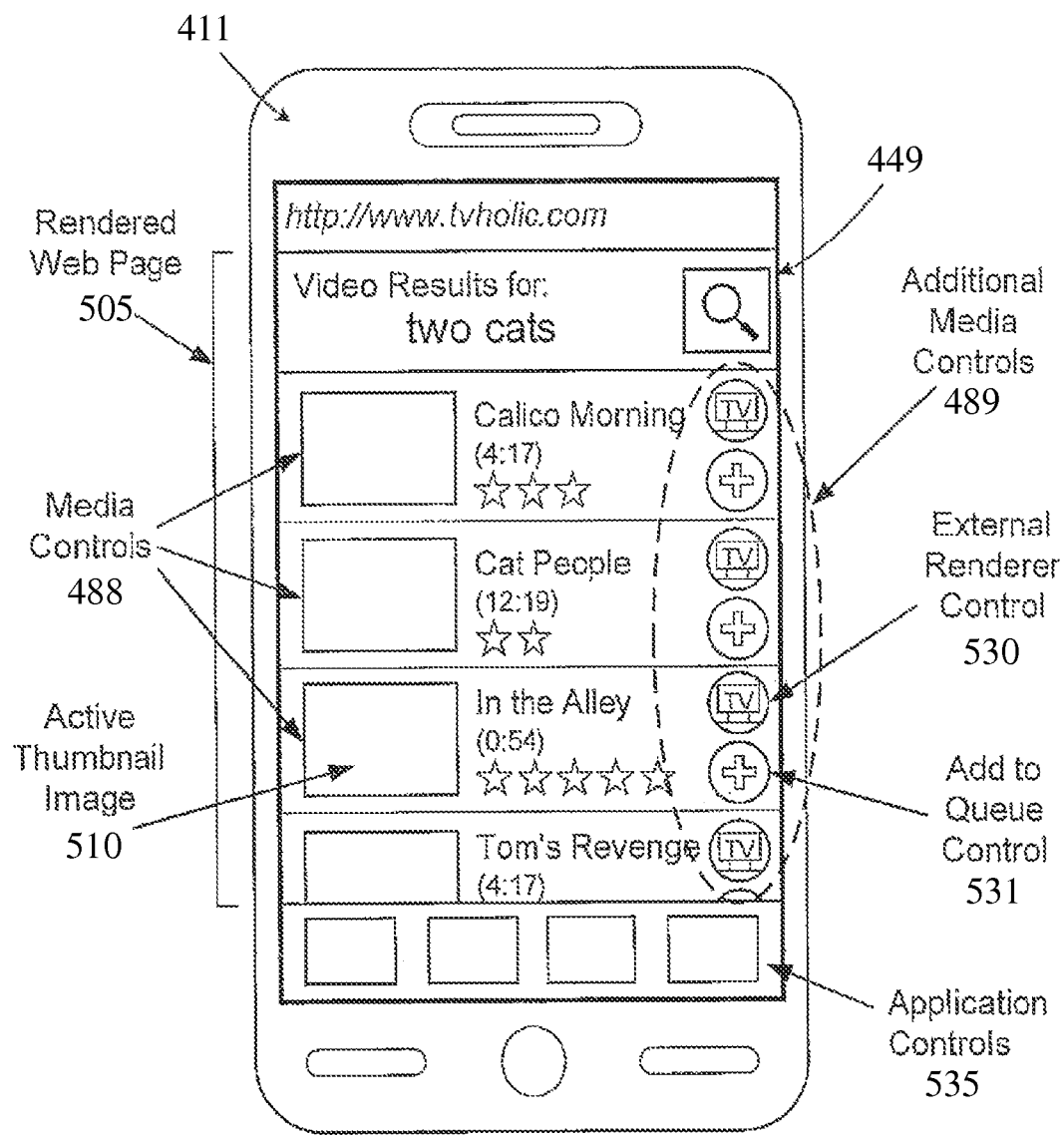

FIG. 18 generally illustrates an embodiment of the application user interface displayed by the user interface 449 of the mobile device 411. The application user interface may be provided by the application 441 and/or the HTML rendering engine 448. The example depicted in FIG. 18 uses the same search results web page described for FIG. 17. However, FIG. 18 illustrates an embodiment in which the application 441 modifies the web content to insert additional media controls.

As previously set forth, the application 441 and/or the HTML rendering engine 448 may have requested and/or retrieved the web content 480 corresponding to the search results web page. The application 441 may have analyzed the web content 480 to identify the media controls 488 for accessing internet media content. Further, the application 441 may have modified the web content 480 to insert the additional media controls 489 corresponding to the media controls 488. The steps of analyzing the web content 480 and forming the modified web content 481 may have used any of the techniques previously described.

The HTML rendering engine 448 may have processed the modified web content 481 to create the rendered web page 505. The rendered web page 505 may be displayed in the application user interface. The rendered web page 505 may have the media controls 488, such as the active thumbnail image 510, and/or the additional media controls 489 inserted by the application 441. The rendered web page 505 may have text, graphics, borders, supplementary information about the internet media content, and/or the like. The rendered web page 505 may have any information specified in the web content retrieved from the content site.

The additional media controls 489 may have and/or may be an external renderer control 530 and/or an add to queue control 531 as shown in FIG. 18. The external renderer control 530 may correspond to playback of the associated internet media content on an external rendering device. The add to queue control 531 may correspond to addition of the associated internet media content to a queue for queued playback. Each of the media controls 488 identified by the application 441 may have corresponding additional media controls 489. Therefore, each of the additional media controls 489 may correspond to a particular internet media content object, namely the internet media content object accessible using the corresponding media control 88.

For example, the user 415 may touch the active thumbnail image 510 for the "In the Alley" video clip to play the video clip on the mobile device 411. In addition, the user 415 may touch the external renderer control 530 corresponding to the "In the Alley" video clip to initiate playback of the video clip using the external rendering device. In a similar fashion, the user 415 may touch the add to queue control 531 corresponding to the "In the Alley" video clip to add the video clip to a playback queue.

The application user interface may display application controls 535. For example, the application controls 535 may have and/or may be the navigation controls 516 which may have web browser functions, such as a back button, a forward button, a button to add the current page to a list of favorites, a button to reload and/or refresh the current page, a button to access a list of web browser configuration options, and/or the like; controls for selecting a new target rendering device; playback controls for the target rendering device; playback queue controls; and/or the like. The present invention is not limited to these examples, and the application user interface may have additional application controls not listed herein.

In an embodiment, the application 441 may insert the additional media controls 489 adaptively based on the rendering devices available in the local network 412, the presence or absence of the rendering control component 425, and/or properties of the internet media content corresponding to the media controls 488 identified by the application 441 for the rendered web page 505. For example, the application 441 may insert a separate external renderer control 530 for each available rendering device capable of playing the internet media content. As a result, a particular internet media content may have zero, one or multiple external renderer controls 530 inserted by the application 441, depending on the number of compatible rendering devices available at that time. As another example, an embodiment of the application 441 may support queued playback of music content but not of video content. As a result, the application 441 may only insert the add to queue control 531 for music content objects.

The embodiments of the application user interface illustrated in the preceding examples do not limit the present invention. Variations of the preceding examples may be used in an embodiment of the present invention. For example, a modified user interface based on the preceding examples may present the rendered web page 505 corresponding to the original web content as illustrated in FIG. 17, but the modified user interface may not present the playback mode selection controls 517 shown in FIG. 17. The rendered web page 505 may have the media controls 488, such as the active thumbnail image 510, and the user 415 may select, may touch, may invoke and/or may click on one of the media controls 488 in the rendered web page 505. As a result, the HTML rendering engine 448 may generate the user interaction signal 464, 474 and/or may communicate the user interaction signal 464, 474 to the application 441.

In response to receipt of the user interaction signal 464/474, the application 441 may display controls to select a media action for the internet media content corresponding to the one of the media controls 488 selected by the user 415. For example, the application 441 may display a dialog window and/or a similar user input mechanism. The dialog window may prompt the user 415 to select local playback of the internet media content on the mobile device 411, playback of the internet media content on an external rendering device, or addition of the internet media content to a queue for queued playback. The user 415 may select one of these playback options using the dialog window, and, as a result, the application 441 may initiate a media action corresponding to the selected playback option.

FIGS. 17 and 18 depicts a search results web page as an example. The techniques disclosed herein are not limited to a search results web page and may be applied to any web page having controls for accessing internet media content. The application 441 may retrieve, may analyze, may modify, may present and/or may utilize any web page renderable using the HTML rendering engine 448.

As a result of the system and method described herein, the application 441 executed by a mobile device 411 may transfer internet media content to a rendering device in a home network. The application 441 may use the HTML rendering engine 448 to display a web page to the user 415 of the mobile device 411, and the web page may have the media controls 488 for accessing the internet media content. The web page may be based on web content 480 retrieved from a content source. The application 441 may analyze the web content 480 to identify the media controls 488 for accessing the internet media content, and/or the application 441 may form the modified web content 89 having the additional media controls 489. The application 441 may receive the user interaction signal 464, 474 which may indicate that the user 415 invoked one of the media controls 488 and/or one of the additional media controls 489. In response, the application 441 may initiate transfer of the internet media content to the rendering device in the home network and/or may queue the internet media content for later playback using the rendering device.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A method for transferring internet media content using an application on a mobile device to transfer internet media content, the method comprising the steps of:

retrieving first web content for a web page for display on the mobile device using a first content request having a first requester identification field which specifies one of the mobile device and a mobile device web browser;

creating a rendered web page from the first web content wherein a Hypertext Markup Language (HTML) rendering engine creates the rendered web page and further wherein the rendered web page is displayed to a user of the mobile device;

receiving a user interaction signal generated in response to user input on the mobile device wherein the user input is accepted after display of the rendered web page and further wherein the application receives the user interaction signal;

retrieving second web content for the web page using a second content request having a second requester identification field which is different than the first requester identification field;

analyzing the second web content to determine an alternate version of the internet media content for display on an external rendering device in communication with the mobile device; and initiating transfer of the alternate version of the internet media content to the external rendering device.

2. The method of claim 1, further comprising the steps of:
analyzing the first web content to identify media controls; and modifying the first web content to insert additional media controls displayed on the mobile device.

3. The method of claim 1, wherein the HTML rendering engine generates the user interaction signal.

4. The method of claim 1, wherein the second web content is not used to display a web page on the mobile device.

5. The method of claim 1, wherein the second web content has a set of visual elements necessary for display of the second web content as a web page and further wherein retrieval of the second web content does not retrieve the visual elements.

6. The method of claim 1, wherein the application initiates the transfer of the alternate version of the internet media content in response to receiving the user interaction signal.

7. The method of claim 1, wherein the second requester identification field specifies a full web browser which the mobile device is not capable of running.

8. The method of claim 1, wherein the alternate version of the internet media content has a higher quality, bitrate, and/or or resolution than the internet media content.

9. The method of claim 1, wherein analyzing the second web content comprises analyzing the second web content to determine a higher quality version of the internet media content suitable for display on the external rendering device.

* * * * *